(12) United States Patent
Roever et al.

(10) Patent No.: US 10,467,606 B2
(45) Date of Patent: Nov. 5, 2019

(54) ENHANCED TITLE PROCESSING ARRANGEMENT

(75) Inventors: Stefan Roever, Los Altos Hills, CA (US); Kevin Collins, Cupertino, CA (US)

(73) Assignee: API Market, Inc., San Mateo, CA (US)

( * ) Notice: Subject to any disclaimer, the term of this patent is extended or adjusted under 35 U.S.C. 154(b) by 1645 days.

(21) Appl. No.: 11/742,253

(22) Filed: Apr. 30, 2007

(65) Prior Publication Data

US 2007/0286076 A1    Dec. 13, 2007

Related U.S. Application Data

(60) Provisional application No. 60/746,032, filed on Apr. 29, 2006.

(51) Int. Cl.
G06Q 20/12 (2012.01)
H04L 12/28 (2006.01)
H04L 29/06 (2006.01)

(52) U.S. Cl.
CPC ..... *G06Q 20/1235* (2013.01); *H04L 12/2856* (2013.01); *H04L 63/10* (2013.01); *G06Q 2220/127* (2013.01); *G06Q 2220/18* (2013.01)

(58) Field of Classification Search
None
See application file for complete search history.

(56) References Cited

U.S. PATENT DOCUMENTS

| | | |
|---|---|---|
| 5,063,507 A | 11/1991 | Lindsey |
| 5,455,407 A | 10/1995 | Rosen |
| 5,606,609 A | 2/1997 | Houser et al. |
| 5,629,980 A | 5/1997 | Stefik |
| 5,752,020 A | 5/1998 | Ando |
| 5,778,182 A | 7/1998 | Cathey |
| 5,794,217 A | 8/1998 | Allen |

(Continued)

FOREIGN PATENT DOCUMENTS

| | | |
|---|---|---|
| JP | 02-245970 | 1/1990 |
| JP | 2001338242 A | 12/2001 |

(Continued)

OTHER PUBLICATIONS

Office Action dated Aug. 24, 2009, U.S. Appl. No. 11/155,010.

(Continued)

*Primary Examiner* — Jamie R Kucab
(74) *Attorney, Agent, or Firm* — Waver Austin Villeneuve & Sampson LLP

(57) ABSTRACT

Methods, apparatus, and data structures embodied in computer-readable media are provided for facilitating access to a service in a network. Title materials are received which include one or more of a first title object, a component of the first title object, or a reference to the first title object. The first title object is a first digital bearer instrument representing at least one right relating to the service, the first title object including a reference to the service. A second title object is identified with reference to a service registry and the reference to the service included in the first title object. The second title object is a second digital bearer instrument with which redemption of the at least one right relating to the service and represented by the first title object may be effected.

27 Claims, 19 Drawing Sheets

(56) References Cited

U.S. PATENT DOCUMENTS

| | | |
|---|---|---|
| 5,812,670 A | 9/1998 | Micali |
| 5,828,751 A | 10/1998 | Walker |
| 5,857,023 A | 1/1999 | Demers et al. |
| 5,892,900 A | 4/1999 | Ginter |
| 5,903,880 A | 5/1999 | Biffar |
| 5,905,976 A | 5/1999 | Mjolsnes et al. |
| 5,941,947 A | 8/1999 | Brown et al. |
| 5,956,736 A | 9/1999 | Hanson et al. |
| 6,065,117 A | 5/2000 | White |
| 6,070,171 A | 5/2000 | Snyder et al. |
| 6,078,909 A | 6/2000 | Knutson |
| 6,098,056 A | 8/2000 | Rusnak et al. |
| 6,119,229 A | 9/2000 | Martinez |
| 6,141,006 A | 10/2000 | Knowlton |
| 6,154,214 A | 11/2000 | Uyehara |
| 6,170,744 B1 | 1/2001 | Lee et al. |
| 6,189,097 B1 | 2/2001 | Tycksen, Jr. |
| 6,205,436 B1 | 3/2001 | Rosen et al. |
| 6,212,504 B1 | 4/2001 | Hayosh |
| 6,292,788 B1 | 9/2001 | Roberts et al. |
| 6,327,578 B1 | 12/2001 | Linehan |
| 6,330,544 B1 | 12/2001 | Walker et al. |
| 6,341,353 B1 | 1/2002 | Herman et al. |
| 6,360,254 B1 | 3/2002 | Linden et al. |
| 6,372,974 B1 | 4/2002 | Gross et al. |
| 6,378,075 B1 | 4/2002 | Goldstein |
| 6,389,541 B1 | 5/2002 | Patterson |
| 6,519,573 B1 | 2/2003 | Shade et al. |
| 6,574,609 B1 | 6/2003 | Downs |
| 6,578,078 B1 | 6/2003 | Smith |
| 6,587,867 B1 | 7/2003 | Miller et al. |
| 6,591,260 B1 | 7/2003 | Schwarzhoff et al. |
| 6,600,823 B1 | 7/2003 | Hayosh |
| 6,629,081 B1 | 9/2003 | Cornelius |
| 6,640,304 B2 | 10/2003 | Ginter et al. |
| 6,662,340 B2 | 12/2003 | Rawat |
| 6,675,153 B1 | 1/2004 | Cook |
| 6,751,670 B1 | 6/2004 | Patterson |
| 6,772,341 B1 | 8/2004 | Shrader et al. |
| 6,820,204 B1 | 11/2004 | Desai et al. |
| 6,842,741 B1 | 1/2005 | Fujimura |
| 6,868,392 B1 | 3/2005 | Ogasawara |
| 6,871,220 B1 | 3/2005 | Rajan et al. |
| 6,895,392 B2 | 5/2005 | Stefik et al. |
| 6,898,576 B2 | 5/2005 | Stefik et al. |
| 6,910,179 B1 | 6/2005 | Pennell |
| 6,913,193 B1 | 7/2005 | Kawan |
| 6,920,567 B1 | 7/2005 | Doherty et al. |
| 6,925,439 B1 | 8/2005 | Pitroda |
| 6,938,021 B2 | 8/2005 | Shear et al. |
| 6,941,291 B1 | 9/2005 | Zoller et al. |
| 6,944,776 B1 | 9/2005 | Lockhart et al. |
| 6,947,556 B1 | 9/2005 | Matyas et al. |
| 6,947,571 B1 | 9/2005 | Rhoads |
| 7,003,670 B2 | 2/2006 | Heaven et al. |
| 7,010,512 B1 | 3/2006 | Gillin |
| 7,016,877 B1 | 3/2006 | Steele et al. |
| 7,020,626 B1 | 3/2006 | Eng et al. |
| 7,028,009 B2 * | 4/2006 | Wang .................... G06F 21/10 380/201 |
| 7,069,234 B1 | 6/2006 | Cornelius |
| 7,069,310 B1 | 6/2006 | Bartholomew |
| 7,099,849 B1 | 8/2006 | Reeder et al. |
| 7,103,574 B1 | 9/2006 | Peinado et al. |
| 7,120,606 B1 | 10/2006 | Ranzini et al. |
| 7,130,829 B2 | 10/2006 | Banerjee et al. |
| 7,191,332 B1 | 3/2007 | Pankajakshan et al. |
| 7,249,107 B2 | 7/2007 | Yaacovi |
| 7,275,260 B2 | 9/2007 | de Jong et al. |
| 7,318,049 B2 | 1/2008 | Iannacci |
| 7,346,923 B2 | 3/2008 | Atkins |
| 7,392,226 B1 | 6/2008 | Sasaki et al. |
| 7,401,221 B2 | 7/2008 | Adent et al. |
| 7,424,747 B2 | 9/2008 | DeTreville |
| 7,426,492 B1 | 9/2008 | Bishop et al. |
| 7,444,519 B2 | 10/2008 | Laferriere et al. |
| 7,454,622 B2 | 11/2008 | Laidlaw et al. |
| 7,580,877 B1 | 8/2009 | Argenbright |
| 7,614,078 B1 | 11/2009 | Stieglitz |
| 7,680,819 B1 | 3/2010 | Mellmer et al. |
| 7,707,066 B2 | 4/2010 | Roever |
| 7,707,121 B1 | 4/2010 | Roever et al. |
| 7,725,260 B2 | 5/2010 | Vos et al. |
| 7,774,499 B1 | 8/2010 | Popek et al. |
| 7,814,025 B2 | 10/2010 | Roever |
| 8,170,929 B1 | 5/2012 | Mallon et al. |
| 8,566,461 B1 | 10/2013 | Jun et al. |
| 8,571,992 B2 | 10/2013 | Roever et al. |
| 8,738,457 B2 | 5/2014 | Roever et al. |
| 9,177,338 B2 | 11/2015 | Collins et al. |
| 9,509,704 B2 | 11/2016 | Roever et al. |
| 9,621,372 B2 | 4/2017 | Roever et al. |
| 10,073,984 B2 | 9/2018 | Roever et al. |
| 10,192,234 B2 | 1/2019 | Collins et al. |
| 2001/0008557 A1 | 7/2001 | Stefik et al. |
| 2001/0026287 A1 | 10/2001 | Watanabe |
| 2001/0032312 A1 | 10/2001 | Runje et al. |
| 2002/0004847 A1 | 1/2002 | Tanno |
| 2002/0026445 A1 | 2/2002 | Chica et al. |
| 2002/0029183 A1 | 3/2002 | Vlahoplus et al. |
| 2002/0032646 A1 | 3/2002 | Sweeney et al. |
| 2002/0038278 A1 | 3/2002 | Himmelstein |
| 2002/0040346 A1 | 4/2002 | Kwan |
| 2002/0048369 A1 | 4/2002 | Ginter et al. |
| 2002/0062249 A1 | 5/2002 | Iannaci |
| 2002/0082961 A1 | 6/2002 | Abrahm et al. |
| 2002/0091643 A1 | 7/2002 | Okamoto et al. |
| 2002/0091646 A1 | 7/2002 | Lake et al. |
| 2002/0099564 A1 | 7/2002 | Kim |
| 2002/0106081 A1 | 8/2002 | Yang |
| 2002/0116471 A1 | 8/2002 | Shteyn |
| 2002/0128940 A1 | 9/2002 | Orrin et al. |
| 2002/0129140 A1 | 9/2002 | Peled et al. |
| 2002/0143703 A1 | 10/2002 | Razvan et al. |
| 2002/0147929 A1 | 10/2002 | Rose |
| 2002/0152126 A1 | 10/2002 | Lieu et al. |
| 2002/0152173 A1 | 10/2002 | Rudd |
| 2002/0152262 A1 | 10/2002 | Arkin et al. |
| 2002/0156743 A1 | 10/2002 | DeTreville |
| 2002/0178082 A1 | 11/2002 | Krause |
| 2002/0184504 A1 | 12/2002 | Hughes |
| 2002/0198843 A1 | 12/2002 | Wang et al. |
| 2003/0004885 A1 | 1/2003 | Banerjee et al. |
| 2003/0023561 A1 | 1/2003 | Stefik et al. |
| 2003/0023564 A1 | 1/2003 | Padhye et al. |
| 2003/0028489 A1 | 2/2003 | Williamson |
| 2003/0046093 A1 | 3/2003 | Erickson et al. |
| 2003/0061566 A1 | 3/2003 | Rubstein et al. |
| 2003/0079122 A1 | 4/2003 | Asokan et al. |
| 2003/0084171 A1 | 5/2003 | de Jong |
| 2003/0084302 A1 | 5/2003 | de Jong |
| 2003/0093695 A1 | 5/2003 | Dutta |
| 2003/0125965 A1 | 7/2003 | Falso |
| 2003/0131048 A1 | 7/2003 | Najork |
| 2003/0140003 A1 | 7/2003 | Wang et al. |
| 2003/0140034 A1 | 7/2003 | Probst et al. |
| 2003/0159043 A1 | 8/2003 | Epstein |
| 2003/0182142 A1 | 9/2003 | Valenzuela et al. |
| 2003/0196087 A1 | 10/2003 | Stringer et al. |
| 2003/0200439 A1 | 10/2003 | Moskowitz |
| 2003/0208406 A1 | 11/2003 | Okamoto et al. |
| 2003/0217006 A1 * | 11/2003 | Roever .................. G06Q 20/12 705/50 |
| 2003/0220881 A1 | 11/2003 | Pirhonen et al. |
| 2003/0229593 A1 | 12/2003 | Raley |
| 2004/0034601 A1 | 2/2004 | Kreuzer |
| 2004/0039916 A1 | 2/2004 | Aldis et al. |
| 2004/0044627 A1 | 3/2004 | Russell |
| 2004/0044779 A1 | 3/2004 | Lambert |
| 2004/0054630 A1 | 3/2004 | Ginter et al. |
| 2004/0054915 A1 | 3/2004 | Jong et al. |
| 2004/0059678 A1 | 3/2004 | Stefik et al. |
| 2004/0083391 A1 | 4/2004 | de Jong |
| 2004/0113792 A1 | 6/2004 | Ireland et al. |

(56) References Cited

U.S. PATENT DOCUMENTS

| | | |
|---|---|---|
| 2004/0128546 A1 | 7/2004 | Blakeley |
| 2004/0133548 A1 | 7/2004 | Fielding et al. |
| 2004/0139207 A1 | 7/2004 | De Jong |
| 2004/0153552 A1 | 8/2004 | Trossen et al. |
| 2004/0177039 A1* | 9/2004 | Pincus et al. ............... 705/40 |
| 2004/0196981 A1 | 10/2004 | Nakano et al. |
| 2004/0199577 A1 | 10/2004 | Burd et al. |
| 2004/0221045 A1 | 11/2004 | Joosten et al. |
| 2004/0243517 A1 | 12/2004 | Hansen |
| 2004/0243819 A1* | 12/2004 | Bourne ............... G06F 21/10 713/193 |
| 2004/0267671 A1 | 12/2004 | Nonaka et al. |
| 2004/0267673 A1 | 12/2004 | Ballard et al. |
| 2005/0004875 A1 | 1/2005 | Kontio et al. |
| 2005/0010486 A1 | 1/2005 | Pandhe |
| 2005/0027804 A1 | 2/2005 | Cahill et al. |
| 2005/0033700 A1 | 2/2005 | Vogler |
| 2005/0038707 A1 | 2/2005 | Roever et al. |
| 2005/0038724 A1 | 2/2005 | Roever et al. |
| 2005/0091268 A1 | 4/2005 | Meyer |
| 2005/0091545 A1 | 4/2005 | Soppera |
| 2005/0096938 A1* | 5/2005 | Slomkowski et al. ............ 705/1 |
| 2005/0138374 A1 | 6/2005 | Zheng et al. |
| 2005/0177716 A1 | 8/2005 | Ginter et al. |
| 2005/0204168 A1 | 9/2005 | Johnston et al. |
| 2005/0234860 A1 | 10/2005 | Roever et al. |
| 2005/0246193 A1 | 11/2005 | Roever et al. |
| 2005/0247777 A1 | 11/2005 | Pitroda |
| 2005/0251452 A1 | 11/2005 | Roever et al. |
| 2005/0268115 A1 | 12/2005 | Barde et al. |
| 2005/0273805 A1 | 12/2005 | Roever et al. |
| 2005/0276413 A1 | 12/2005 | Neogi |
| 2006/0036447 A1 | 2/2006 | Roever et al. |
| 2006/0036548 A1 | 2/2006 | Roever et al. |
| 2006/0059070 A1 | 3/2006 | Petruck |
| 2006/0064373 A1 | 3/2006 | Kelley |
| 2006/0080592 A1 | 4/2006 | Alves de Moura et al. |
| 2006/0136987 A1 | 6/2006 | Okuda |
| 2006/0167815 A1 | 7/2006 | Peinado et al. |
| 2006/0170759 A1 | 8/2006 | Roever et al. |
| 2006/0174350 A1 | 8/2006 | Roever et al. |
| 2006/0179003 A1 | 8/2006 | Steele et al. |
| 2006/0259422 A1 | 11/2006 | Sutton et al. |
| 2007/0016533 A1 | 1/2007 | Fujimura |
| 2007/0087840 A1 | 4/2007 | Fayter et al. |
| 2007/0136694 A1 | 6/2007 | Friedman et al. |
| 2007/0157320 A1 | 7/2007 | Collins et al. |
| 2007/0162300 A1 | 7/2007 | Roever et al. |
| 2007/0208720 A1* | 9/2007 | Probst et al. ............... 707/3 |
| 2007/0233602 A1 | 10/2007 | Zweig et al. |
| 2007/0250453 A1 | 10/2007 | Sako et al. |
| 2007/0255965 A1 | 11/2007 | McGucken |
| 2007/0286393 A1 | 12/2007 | Roever et al. |
| 2008/0067230 A1 | 3/2008 | Silverbrook et al. |
| 2008/0148056 A1 | 6/2008 | Ginter et al. |
| 2008/0205850 A1 | 8/2008 | Collins et al. |
| 2008/0235043 A1 | 9/2008 | Goulandris et al. |
| 2008/0243693 A1 | 10/2008 | Thrasher et al. |
| 2009/0070218 A1 | 3/2009 | Farmanfarmaian |
| 2009/0119500 A1 | 5/2009 | Roth et al. |
| 2009/0193249 A1 | 7/2009 | Conrado et al. |
| 2009/0193526 A1 | 7/2009 | Sweazey |
| 2009/0275402 A1 | 11/2009 | Backover et al. |
| 2009/0288012 A1 | 11/2009 | Hertel et al. |
| 2010/0161444 A1 | 6/2010 | Roever et al. |
| 2010/0162408 A1 | 6/2010 | Roever et al. |
| 2010/0257111 A1 | 10/2010 | Veugen et al. |
| 2010/0299718 A1 | 11/2010 | Roever et al. |
| 2011/0178861 A1 | 7/2011 | Georgi |
| 2011/0197285 A1 | 8/2011 | Ginter et al. |
| 2011/0296515 A1 | 12/2011 | Krstic et al. |
| 2012/0090018 A1 | 4/2012 | Padhye et al. |
| 2012/0198513 A1 | 8/2012 | Maida-Smith et al. |
| 2013/0036476 A1 | 2/2013 | Roever et al. |
| 2014/0019372 A1 | 1/2014 | Roever et al. |
| 2014/0236746 A1 | 8/2014 | Roever et al. |
| 2015/0026080 A1 | 1/2015 | Roever et al. |
| 2016/0048812 A1 | 2/2016 | Collins et al. |
| 2017/0083720 A1 | 3/2017 | Roever et al. |
| 2018/0019891 A1 | 1/2018 | Roever et al. |

FOREIGN PATENT DOCUMENTS

| | | |
|---|---|---|
| JP | 2002-140631 | 5/2002 |
| WO | WO 98/43211 | 10/1998 |
| WO | WO 01/11452 | 2/2001 |
| WO | WO 01/84906 | 11/2001 |
| WO | WO 2002/011033 | 2/2002 |
| WO | WO 03098398 | 11/2003 |
| WO | WO 2004/038567 | 5/2004 |
| WO | WO 2005/116841 | 12/2005 |
| WO | WO 07/033005 | 3/2007 |
| WO | WO 2007/033055 | 3/2007 |
| WO | WO 07/078987 | 7/2007 |
| WO | WO 07/130416 | 11/2007 |
| WO | WO 07/130502 | 11/2007 |
| WO | WO 13/019519 | 2/2013 |

OTHER PUBLICATIONS

Office Action dated May 26, 2010 U.S. Appl. No. 11/155,010.
Office Action dated Jul. 12, 2010, U.S. Appl. No. 11/940,753.
Office Action dated Jun. 24, 2009 from U.S. Appl. No. 10/232,861.
Office Action dated Dec. 14, 2009 from U.S. Appl. No. 10/232,861.
Notice of Allowance U.S. Appl. No. 10/414,817 dated Jan. 27, 2010.
Notice of Allowance and Issue Fee Due dated Dec. 24, 2009 from U.S. Appl. No. 10/440,286.
Notice of Allowance dated May 10, 2010, U.S. Appl. No. 10/439,629.
G. Ahn and J. Lam, "Managing Privacy Preferences for Federated Identity Management," in Proc. DIM ' 05: *Proceedings of the 2005 workshop on Digital Identity Management*, Fairfax, VA. ISA 2005, pp. 28-36.
Alladin/Preview Systems, "HASP SL," Alladin/Preview Systems, 2004.
K. Bohrer and B. Holland, "Customer Profile Exchange (CPExchange) Specification," International Digital Enterprise Alliance, Inc., Version 1.0, Oct. 20, 2000.
D. Burdett. RFC 2801: Internet Open Trading Protocol. [Online]. Apr. 2000. Available: http://www.faqs.org/rfcs/rfc2801.html.
Business.com. Preview Systems, Inc. Profile. [Online]. 2006. Available: http://www.business.com/directory/telecommunications/preview_systems_inc/profile/.
Cover Pages. Internet Open Trading Protocol. [Online]. Dec. 2002. Available: http://xml.coverpages.org/otp.html.
Cover Pages. IETF Internet Open Trading Protocol Working Group Publishes RFC for Voucher Trading System . [Online]. May 2003. Available: http://xml.coverpages.org/ni2003-05-15-a.html.
Cover Pages. XML Voucher: Generic Voucher Language. [Online]. May 2003. Available: http://xml.coverpages.org/xmlVoucher.html.
B. Cox, J. Tygar, and M. Sirbu, "Netbill Security and Transaction Protocol," *First USENIX Workshop on Electronic Commerce*, Jul. 1995.
FlexTicket. [Online]. Available: http://info.isl.ntt.co.jp/flexticket/index.html.
K. Fujumura et al., "Requirements and Design for Voucher Trading System (VTS)", Mar. 2003, RFC3506, http://rfc.net/rfc3506.html.
K. Fujimura, Y. Nakajima, and J. Sekine, *XML Ticket: Generalized Digital Ticket Definition Language*. 1999.
K. Fujimura and Y. Nakajima, *General Purpose Digital Ticket Framework*. Boston, Mass.: 3rd USENIX Workshop on Electronic Commerce, 1998.
K. Fujimura, H. Kuno, M. Terada, K. Matsuyama, Y. Mizuno, and J. Sekine, *Digital ticket controlled digital ticket circulation*. USENIX, 1999.
K. Fujimura, M. Terada, and J. Sekine, "A World Wide Supermarket Scheme Using Rights Trading System," in *Proc. ICPADS '00: Proceedings of the Seventh International Conference on Parallel and Distributed Systems: Workshops*, Washington, DC, USA, 2000, p. 289.

(56) References Cited

OTHER PUBLICATIONS

M. Iguchi et al. Voucher Integrated C2B and C2C Trading Model. May 2002. [Online]. Available: hitp://wwwconf.ecs.soton.ac.uk/archive/00000272/01/index.html.

T. Hardjono and J. Seberry, *Strongboxes for Electronic Commerce.* Oakland, Calif.: 2nd USENIX Workshop on Electronic Commerce, 1996.

A Jøsang, J. Fabre, B. Hay, J. Dalziel and S. Pope. "Trust Requirements in Identity Management." Australasian Information Security Workshop 2005.

M. Kumar, A. Rangachari, A. Jhingran, and R. Mohan, *Sales Promotions on the Internet.* Boston, Mass.: $3^{rd}$ USENIX Workshop on Electronic Commerce, 1998.

K. Matsuyama and K. Fujimura, "Distributed Digital-Ticket Management for Rights Trading System", Nov. 1999, $1^{st}$ ACM Conferences on Electronic Commerce.

G. Medvinksy and B. C. Neuman, *NetCash: A design for practical electronic currency on the Internet.* Proceedings of the First ACM Conference on Computer and Communications Security, Nov. 1993.

M. Mont, S. Pearson, P Bramhall "Towards Accountable Management of Identity and Privacy: Sticky Policies and Enforceable Tracing Services," Hewlett Packard, 2003.

OECD. (Jan. 27, 2006) OECD Guidelines on the Protection of Privacy and Transborder Flows of Personal Data [br] . [Online]. Available: http://www.oecd.org/document/18/0,2340,en_2649_201185_1815186_1_1_1_1,00.

G. Skinner, S. Han, and E. Chang, "A framework of privacy shield in organizational information systems," *Proceedings of Int'l Conference on Mobile Business,* 2005.

D. Stewart. The Future of Digital Cash on the Internet. [Online]. Available: http://www.arraydev.com/commerce/JIBC/9703-02.html.

M. Terada, H. Kuno, M. Hanadate, and K. Fujimura, *Copy Prevention Scheme for Rights Trading Infrastructure,* 2000.

M. Terada and K. Fujimura, RFC 4153: "XML Voucher: Generic Voucher Language," Network Working Group, Sep. 2005.

M. Terada. RFC 4154: Voucher Trading System Application Programming Interface. Sep. 2005. [Online]. Available: http://www.rfc-archive.org/getrfc.php?rfc=4154.

D. Weitzel "Liberty ID-WSF Implementation Guide" Draft Version 1.0-1.2, Liberty Alliance Project. 2004-2005.

"US Military exchanges now offer best-price guarentees," M2 Presswire. Conventry: Jun. 4, 1998. p. 1.

http://legalminds.lp.findlaw.com/list/cyberia-1/msg31650.html), Robert A. Hettinga, May 29, 2001.

http://www.nettime.org/Lists-Archives/nettime-1-0009/msg00214.html, Dr. Richard W. Rahn, Sep. 19, 2000.

Menezes et al., "Handbook of Applied Cryptography", 1997 CRC Press LLC, Section 1.7.

N. Szabo, "Contracts with Bearer" http://szabo.best.vwh.net/bearer_contracts.html, 12 pages (1997).

Kuno et al., "A Digital Ticket Circulation Architecture, 58th Conference Collected Papers (4)", Information Processing Society of Japan, Japan, Mar. 11, 1999, pp. 4-295-4-296.

Office Action dated Oct. 3, 2008 from U.S. Appl. No. 11/094,784.
Office Action dated Sep. 15, 2009 from U.S. Appl. No. 10/873,841.
Office Action dated Mar. 27, 2009 from U.S. Appl. No. 11/096,284.
Office Action dated Feb. 25, 2008 from U.S. Appl. No. 10/873,840.
Final Office Action dated Dec. 3, 2008 from U.S. Appl. No. 10/873,840.
Office Action dated May 28, 2009 from U.S. Appl. No. 10/873,840.
JP Office Action dated Mar. 24, 2009 from JP Application No. 2004-505848.
Office Action dated Feb. 9, 2005 from U.S. Appl. No. 10/232,861.
Office Action dated Jul. 27, 2005 from U.S. Appl. No. 10/232,861.
Office Action dated Dec. 2, 2005 from U.S. Appl. No. 10/232,861.
Office Action dated Jun. 21, 2006 from U.S. Appl. No. 10/232,861.
Office Action dated Nov. 30, 2006 from U.S. Appl. No. 10/232,861.
Office Action dated Jun. 14, 2007 from U.S. Appl. No. 10/232,861.
Office Action dated May 15, 2008 from U.S. Appl. No. 10/232,861.
Final Office Action dated Dec. 5, 2008 from U.S. Appl. No. 10/232,861.
Office Action dated May 22, 2006 from U.S. Appl. No. 10/414,817.
Office Action dated Nov. 28, 2006 from U.S. Appl. No. 10/414,817.
Office Action dated Apr. 30, 2007 from U.S. Appl. No. 10/414,817.
Office Action dated Oct. 3, 2007 from U.S. Appl. No. 0/414,817.
Office Action dated Jun. 11, 2008 from U.S. Appl. No. 10/414,817.
Office Action dated Dec. 24, 2008 from U.S. Appl. No. 10/414,817.
Final Office Action dated Jun. 12, 2009 from U.S. Appl. No. 10/414,817.
Office Action dated Dec. 22, 2005 from U.S. Appl. No. 10/414,830.
Office Action dated Feb. 7, 2007 from U.S. Appl. No. 10/414,830.
Office Action dated Dec. 20, 2005 from U.S. Appl. No. 10/440,286.
Office Action dated Jul. 13, 2006 from U.S. Appl. No. 10/440,286.
Office Action dated Jan. 30, 2007 from U.S. Appl. No. 10/440,286.
Office Action dated Jun. 28, 2007 from U.S. Appl. No. 10/440,286.
Office Action dated Dec. 27, 2007 from U.S. Appl. No. 10/440,286.
Office Action dated Aug. 6, 2008 from U.S. Appl. No. 10/440,286.
Office Action dated Nov. 18, 2008 from U.S. Appl. No. 10/440,286.
Office Action dated Feb. 11, 2009 from U.S. Appl. No. 10/440,286.
Office Action dated Jan. 14, 2008 from U.S. Appl. No. 10/439,629.
Office Action dated Oct. 23, 2008 from U.S. Appl. No. 10/439,629.
Office Action dated Jan. 28, 2009 from U.S. Appl. No. 10/439,629.
Office Action dated Sep. 26, 2007 from U.S. Appl. No. 11/118,608.
Office Action dated May 14, 2008 from U.S. Appl. No. 11/118,608.
Office Action dated Nov. 10, 2008 from U.S. Appl. No. 11/118,608.
Final Office Action dated Apr. 16, 2009 from U.S. Appl. No. 11/118,608.
Office Action dated Mar. 16, 2009 from U.S. Appl. No. 11/146,399.
International Search Report and Written Opinion dated Feb. 16, 2006 from PCT Application No. PCT/US2005/021057.
Notification Concerning Transmittal of International Preliminary Report on Patentability dated Jan. 11, 2007 from PCT Application No. PCT/US2005/021057.
International Search Report dated Nov. 25, 2003 from PCT Application No. PCT/US03/15614.
European Office Action dated Oct. 27, 2008 from EP Application No. 03726905.7.
Chinese Office Action dated Dec. 26, 2008 from CN Application No. 03816746.8.
International Search Report and Written Opinion dated Sep. 16, 2008 from PCT Application No. PCT/US07/10560.
International Search Report & Written Opinion dated Dec. 7, 2007 from PCT Application No. PCT/US07/010708.
Notification Concerning Transmittal of International Preliminary Report on Patentability dated Nov. 13, 2008 from PCT Application No. PCT/US2007/010708.
International Search Report & Written Opinion dated Feb. 20, 2008 from PCT Application No. PCT/US06/48776.
Notification Concerning Transmittal of International Preliminary Report on Patentability dated Jul. 10, 2008 from PCT Application No. PCT/US2006/048776.
Wikipedia—Hash Chain: http://en.wikipedia.org/wiki/Hash_chain, downloaded Feb. 27, 2011.
Lamport, "Password Authentication with Insecure Communication", Communications of the ACM, Nov. 1981, vol. 24, No. 11, pp. 770-772.
The UNIX Operating System: Mature, Standardized and State-of-the-Art, a white paper from Aug. 1997 downloaded from www.unix.org.
Software Requirements Specification template, 2002, section 2.4, Operating Environments, downloaded from www.processimpact.com.
Office Action dated Oct. 1, 2010, U.S. Appl. No. 12/716,089.
Office Action dated May 18, 2011, U.S. Appl. No. 12/716,089.
Office Action dated Oct. 4, 2010, U.S. Appl. No. 11/679,760.
Final Office Action dated May 27, 2011, U.S. Appl. No. 11/679,760.
Office Action dated Jan. 5, 2012, U.S. Appl. No. 11/679,760.
Office Action dated Jul. 13, 2011, U.S. Appl. No. 12/717,007.
Office Action dated Oct. 4, 2011, U.S. Appl. No. 12/717,007.
Office Action dated Sep. 30, 2011, U.S. Appl. No. 12/850,454.
Office Action dated Mar. 22, 2011, U.S. Appl. No. 11/741,952.
Office Action dated Sep. 27, 2011, U.S. Appl. No. 11/741,952.

(56) References Cited

OTHER PUBLICATIONS

Office Action dated Sep. 21, 2010, U.S. Appl. No. 11/645,139.
Final Office Action dated May 5, 2011, U.S. Appl. No. 11/645,139.
Office Action dated Nov. 29, 2010, U.S. Appl. No. 11/940,747.
Final Office Action dated Aug. 23, 2011, U.S. Appl. No. 11/940,474.
U.S. Appl. No. 14/339,325, filed Jul. 23, 2014, Roever et al.
U.S. Office Action dated Apr. 5, 2013 issued in U.S. Appl. No. 11/155,010.
U.S. Office Action dated Dec. 18, 2013 issued in U.S. Appl. No. 11/155,010.
U.S. Final Office Action dated Jul. 23, 2014 issued in U.S. Appl. No. 11/155,010.
U.S. Office Action dated Jul. 1, 2013 issued in U.S. Appl. No. 12/716,089.
U.S. Notice of Allowance dated Feb. 5, 2014 issued in U.S. Appl. No. 12/716,089.
U.S. Office Action dated May 20, 2013 issued in U.S. Appl. No. 11/679,760.
U.S. Final Office Action dated Feb. 26, 2014 issued in U.S. Appl. No. 11/679,760.
U.S. Notice of Allowance dated Jul. 8, 2013 issued in U.S. Appl. No. 12/717,007.
U.S. Office Action dated Sep. 23, 2014 issued in U.S. Appl. No. 12/850,454.
U.S. Office Action dated Oct. 18, 2013 issued in U.S. Appl. No. 11/741,952.
U.S. Final Office Action dated May 20, 2014 issued in U.S. Appl. No. 11/741,952.
U.S. Office Action dated Sep. 5, 2014 issued in U.S. Appl. No. 11/741,952.
U.S. Office Action dated May 22, 2013 issued in U.S. Appl. No. 13/558,238.
U.S. Final Office Action dated Feb. 28, 2014 issued in U.S. Appl. No. 13/558,238.
European Extended Search Report dated Nov. 28, 2013 issued in EP 06 847 910.4.
PCT International Preliminary Report on Patentability and Written Opinion dated Feb. 13, 2014 issued in PCT/US2012/048182.
Manasse ("Why Rights Management is Wrong (and What to Do Instead)", SRC Technical Note, Compaq System Research Center, Jan. 21, 2001, 7 pages).
U.S. Appl. No. 11/830,717, filed Jul. 30, 2007, Roever et al.
U.S. Miscellaneous Communication dated Jun. 11, 2010 issued in U.S. Appl. No. 11/155,010.
U.S. Final Office Action dated Sep. 27, 2012 issued in U.S. Appl. No. 11/679,760.
U.S. Advisory Action Before the Filing of an Appeal Brief dated May 28, 2009 issued in U.S. Appl. No. 10/440,286.
U.S. Final Office Action dated May 2, 2012 issued in U.S. Appl. No. 12/717,007.
U.S. Final Office Action dated Aug. 31, 2012 issued in U.S. Appl. No. 12/850,454.
U.S. Restriction Requirement dated Sep. 24, 2008 issued in U.S. Appl. No. 11/146,399.
U.S. Final Office Action dated Jan. 24, 2011 issued in U.S. Appl. No. 11/940,753.
European Communication dated Oct. 19, 2006 issued in EP Application No. 03 72 6905.7.
European Office Action dated Nov. 6, 2008 issued in EP Application No. 03 72 6905.7.
European Office Action dated Apr. 9, 2010 issued in EP Application No. 03 72 6905.7.
JP Office Action dated Mar. 24, 2009 issued in JP Application No. 2004-505848.
PCT International Preliminary Report on Patentability and Written Opinion dated Nov. 4, 2008 issued in PCT/US07/10560.
PCT International Search Report and Written Opinion dated Jan. 17, 2013 issued in PCT/US2012/048182.

"The OAuth 2.0 Authorization Protocol", (Abstract) draft-ietf-oauth-v2-28, *Network Working Group*, E. Hammer, Ed., Jun. 19, 2012, 48 pages.
Cobèna, (2003) "Thèse d'Informatique, spècialitè Algorithmique, Change Management of Semi-Structure Data on the Web", soutenue le Jun. 26, 2003 par, *Ecole Doctorate de l'Ecole Polytechnique*, 228 pages.
Fielding, "Architectural Styles and the Design of Network-based Software Architectures", University of California, Irvine, Dissertation 2000, 90 pages.
Tilkov, Stefan, "A Brief Introduction to REST", posted on Dec. 10, 2007 at http://www.infoq.com/articles/rest-introduction, 10 pages.
U.S. Appl. No. 14/831,713, filed Aug. 20, 2015, Collins et al.
U.S. Office Action dated Jan. 5, 2015 issued in U.S. Appl. No. 11/679,760.
U.S. Office Action dated Jun. 9, 2015 issued in U.S. Appl. No. 11/679,760.
U.S. Final Office Action dated Mar. 6, 2015 issued in U.S. Appl. No. 12/850,454.
U.S. Final Office Action dated Feb. 18, 2015 issued in U.S. Appl. No. 11/741,952.
U.S. Office Action dated Aug. 11, 2015 issued in U.S. Appl. No. 11/741,952.
U.S. Office Action dated Nov. 7, 2014 issued in U.S. Appl. No. 11/645,139.
U.S. Notice of Allowance dated Jul. 10, 2015 issued in U.S. Appl. No. 11/645,139.
U.S. Office Action dated Mar. 26, 2015 issued in U.S. Appl. No. 11/940,747.
U.S. Office Action dated Nov. 7, 2014 issued in U.S. Appl. No. 11/940,753.
U.S. Final Office Action dated May 22, 2015 issued in U.S. Appl. No. 11/940,753.
U.S. Office Action dated Nov. 5, 2014 issued in U.S. Appl. No. 13/558,238.
U.S. Final Office Action dated Feb. 24, 2015 issued in U.S. Appl. No. 13/558,238.
U.S. Office Action dated Jul. 2, 2015 issued in U.S. Appl. No. 13/558,238.
Haller et al., (May 1996) "A One-Time Password System", *Kaman Sciences Corporation, Network Working Group*, Request for Comments 1938, Category: Standards Track, 18 pp.
U.S. Office Action dated Apr. 6, 2016 issued in U.S. Appl. No. 14/245,885.
U.S. Final Office Action dated Jan. 11, 2016 issued in U.S. Appl. No. 11/679,760.
U.S. Office Action dated Mar. 9, 2016 issued in U.S. Appl. No. 14/031,908.
U.S. Final Office Action dated Dec. 21, 2015 issued in U.S. Appl. No. 11/741,952.
U.S. Final Office Action dated Feb. 1, 2016 issued in U.S. Appl. No. 11/940,747.
U.S. Office Action dated Dec. 4, 2015 issued in U.S. Appl. No. 11/940,753.
U.S. Final Office Action dated Apr. 13, 2016 issued in U.S. Appl. No. 11/940,753.
U.S. Final Office Action dated Mar. 9, 2016 issued in U.S. Appl. No. 13/558,238.
U.S. Office Action dated Jul. 1, 2016 issued in U.S. Appl. No. 11/155,010.
U.S. Final Office Action dated Feb. 22, 2017 issued in U.S. Appl. No. 11/155,010.
U.S. Final Office Action dated Nov. 17, 2016 issued in U.S. Appl. No. 14/245,885.
U.S. Office Action dated Jan. 10, 2018 issued in U.S. Appl. No. 14/245,885.
U.S. Final Office Action dated Aug. 29, 2016 issued in U.S. Appl. No. 14/031,908.
U.S. Office Action dated Feb. 9, 2017 issued in U.S. Appl. No. 14/031,908.
U.S. Office Action dated Oct. 12, 2016 issued in U.S. Appl. No. 12/850,454.

(56) References Cited

OTHER PUBLICATIONS

U.S. Final Office Action dated Jun. 19, 2017 issued in U.S. Appl. No. 12/850,454.
U.S. Notice of Allowance dated Jan. 20, 2017 issued in U.S. Appl. No. 11/741,952.
U.S. Office Action dated Oct. 27, 2017 issued in U.S. Appl. No. 15/448,473.
U.S. Final Office Action dated Jun. 5, 2018 issued in U.S. Appl. No. 15/448,473.
U.S. Office Action dated Dec. 29, 2016 issued in U.S. Appl. No. 14/831,713.
U.S. Final Office Action dated Jun. 15, 2017 issued in U.S. Appl. No. 14/831,713.
U.S. Office Action dated Dec. 29, 2016 issued in U.S. Appl. No. 11/940,747.
U.S. Final Office Action dated Oct. 6, 2017 issued in U.S. Appl. No. 11/940,747.
U.S. Office Action dated Apr. 18, 2017 issued in U.S. Appl. No. 11/940,753.
U.S. Notice of Allowance dated Sep. 19, 2016 issued in U.S. Appl. No. 13/558,238.
U.S. Office Action dated May 19, 2017 issued in U.S. Appl. No. 15/298,103.
Miller, Mark S. and Shapiro, Jonathan S. (2003) "Paradigm Regained: Abstraction Mechanisms for Access Control," HP Laboratories, Palo Alto, HPL-2003-222, 22 pages; to be published in and presented at ASIAN'03, Dec. 10-13, 2003, Mumbai, India [Downloaded on Jul. 12, 2017 from http://www.hpl.hp.com/techreports/2003/HPL-2003-222].
U.S. Office Action dated Sep. 13, 2018 issued in U.S. Appl. No. 12/850,454.
U.S. Office Action dated Jan. 2, 2019 issued in U.S. Appl. No. 12/850,454.
U.S. Notice of Allowance dated Sep. 12, 2018 issued in U.S. Appl. No. 14/831,713.
U.S. Notice of Allowance dated Sep. 11, 2018 issued in U.S. Appl. No. 11/940,747.
U.S. Corrected Notice of Allowance dated Sep. 25, 2018 issued in U.S. Appl. No. 11/940,747.
U.S. Office Action dated Sep. 21, 2018 issued in U.S. Appl. No. 11/940,753.
U.S.Notice of Allowance dated Jul. 2, 2018 issued in U.S. Appl. No. 15/298,103.
U.S. Appl. No. 16/100,658, filed Aug. 10, 2018, Roever et al.
U.S. Appl. No. 16/206,925, filed Nov. 30, 2018, Collins et al.
U.S. Appl. No. 16/216,523, filed Dec. 11, 2018, Collins et al.

* cited by examiner

ENHANCED TITLE PROCESSING ARRANGEMENT

1 CROSS REFERENCE TO RELATED U.S. PATENT APPLICATIONS

This application claims priority under 35 U.S.C 119(e) to U.S. Provisional Patent Application No. 60/746,032 filed Apr. 29, 2006, the entire disclosure of which is incorporated herein by reference for all purposes.

The present application also relates to subject matter described in the following applications, each of which is incorporated herein by reference in its entirety for all purposes.

U.S. patent application Ser. No. 10/439,629 filed May 15, 2003, which continuation in part of U.S. patent application Ser. No. 10/232,861 filed Aug. 30, 2002 and claims priority to U.S. Provisional Patent Application No. 60/380,787 filed May 15, 2002, U.S. Provisional Patent Application No. 60/407,466 filed Aug. 30, 2002, and U.S. Provisional Patent Application No. 60/407,382 filed Aug. 30, 2002.

U.S. patent application Ser. No. 11/146,399 filed Apr. 29, 2005, and claims priority to U.S. Provisional Patent Application No. 60/649,929 filed Feb. 3, 2005.

U.S. patent application Ser. No. 11/118,608 filed Jun. 3, 2005, and claims priority to U.S. Provisional Patent Application No. 60/649,928 filed Feb. 3, 2005.

U.S. patent application Ser. No. 11/096,284 filed on Mar. 30, 2005, a continuation in part of U.S. patent application Ser. No. 10/873,841 filed on Jun. 21, 2004, which is a continuation-in-part of each of U.S. patent application Ser. No. 10/439,629 filed on May 15, 2003, U.S. patent application Ser. No. 10/440,286 filed on May 15, 2003, U.S. patent application Ser. No. 10/414,830 filed on Apr. 15, 2003, U.S. patent application Ser. No. 10/414,817 filed on Apr. 15, 2003, and U.S. patent application Ser. No. 10/232,861 filed on Aug. 30, 2002.

U.S. patent application Ser. No. 11/645,139 filed on Dec. 22, 2006, which claims priority to U.S. Provisional Patent Application No. 60/755,750 filed Dec. 29, 2005, and U.S. Provisional Patent Application No. 60/765,388 filed Feb. 2, 2006.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007, Navio Systems Inc.

3 BACKGROUND OF THE INVENTION

3.1 Field of the Invention

The present invention provides architectures, systems, methods, and software for providing and managing rights using digital bearer instruments that express at least one right. The invention has applications in the fields of computer science and electronic business methods.

3.2 The Related Art

The Internet has become an efficient mechanism for globally distributing digital content, such as documents, pictures, music, and other types of digital content. Information can now be transmitted directly and instantly across the Internet from the content owner to the content buyer, without having to first convert it into physical form, such as paper documents, compact disks, photographs, etc.

However, the advantage of easy digital communication has also allowed digital content to be easily pirated by just about anyone with a computer and Internet access. The combination of high-speed broadband Internet access, digital content compression software (which reduces the size of digital content files), peer-to-peer file trading networks (which allows users to post content files), and lack of a viable digital rights standard, has caused content owners to lose control of their content. Consequently, content owners are experiencing a loss of potential revenue.

Existing systems that attempt to provide confidence between buyers include escrow agreements, third party confirmations, third party appraisals and other similar techniques. These systems are slow and complex, and they do not provide the content user with sufficient confidence that the buyers and sellers are not illegally replicating the content or otherwise attempting to sell pirated copies of works.

4 SUMMARY OF THE INVENTION

According to a first class of embodiments, methods, apparatus, and data structures embodied in computer-readable media are provided for implementing a workflow in a network. The workflow is a sequence of operations relating to a set of services deployed in the network. Title materials are received which include one or more of a title object, a component of the title object, or a reference to the title object. The title object is a digital bearer instrument specifying the workflow and representing at least one right relating to implementation of the workflow in the network which may be redeemed by presentation of the title object to a title-enabled device or process operating in the network. Upon validation of the title object, the workflow is implemented in accordance with the at least one right represented by the title object.

According to another class of embodiments, methods, apparatus, and data structures embodied in computer-readable media are provided for facilitating access to a service in a network. Title materials are received which include one or more of a first title object, a component of the first title object, or a reference to the first title object. The first title object is a first digital bearer instrument representing at least one right relating to the service, the first title object including a reference to the service. A second title object is identified with reference to a service registry and the reference to the service included in the first title object. The second title object is a second digital bearer instrument with which redemption of the at least one right relating to the service and represented by the first title object may be effected.

According to yet another class of embodiments, methods, apparatus, and data structures embodied in computer-readable media are provided for facilitating redemption of rights. Title materials are received which include one or more of a first title object, a component of the first title object, or a reference to the first title object. The title materials represent at least one right. A title object template is identified from among a plurality of title object templates with reference to the title materials. A second title object is dynamically assembled using the identified title object template and at least some of the title materials. The second title object is a digital bearer instrument with which redemption of the at least one right represented by the title materials may be effected.

A further understanding of the nature and advantages of the present invention may be realized by reference to the remaining portions of the specification and the drawings.

5 BRIEF DESCRIPTION OF THE DRAWINGS

Figure 3:
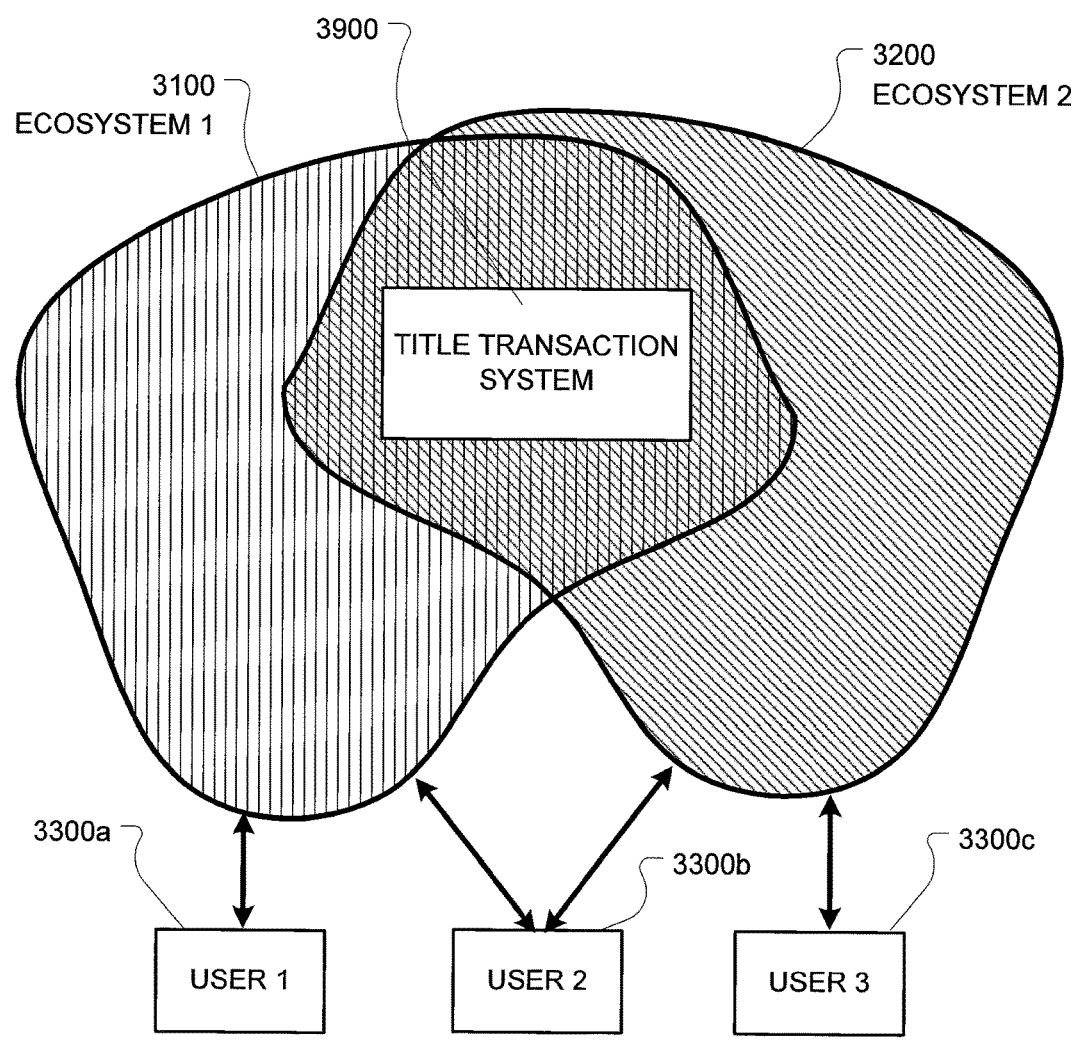
FIG. 3 is an example of a logical representation of two ecosystems sharing a common component.
Figure 4:
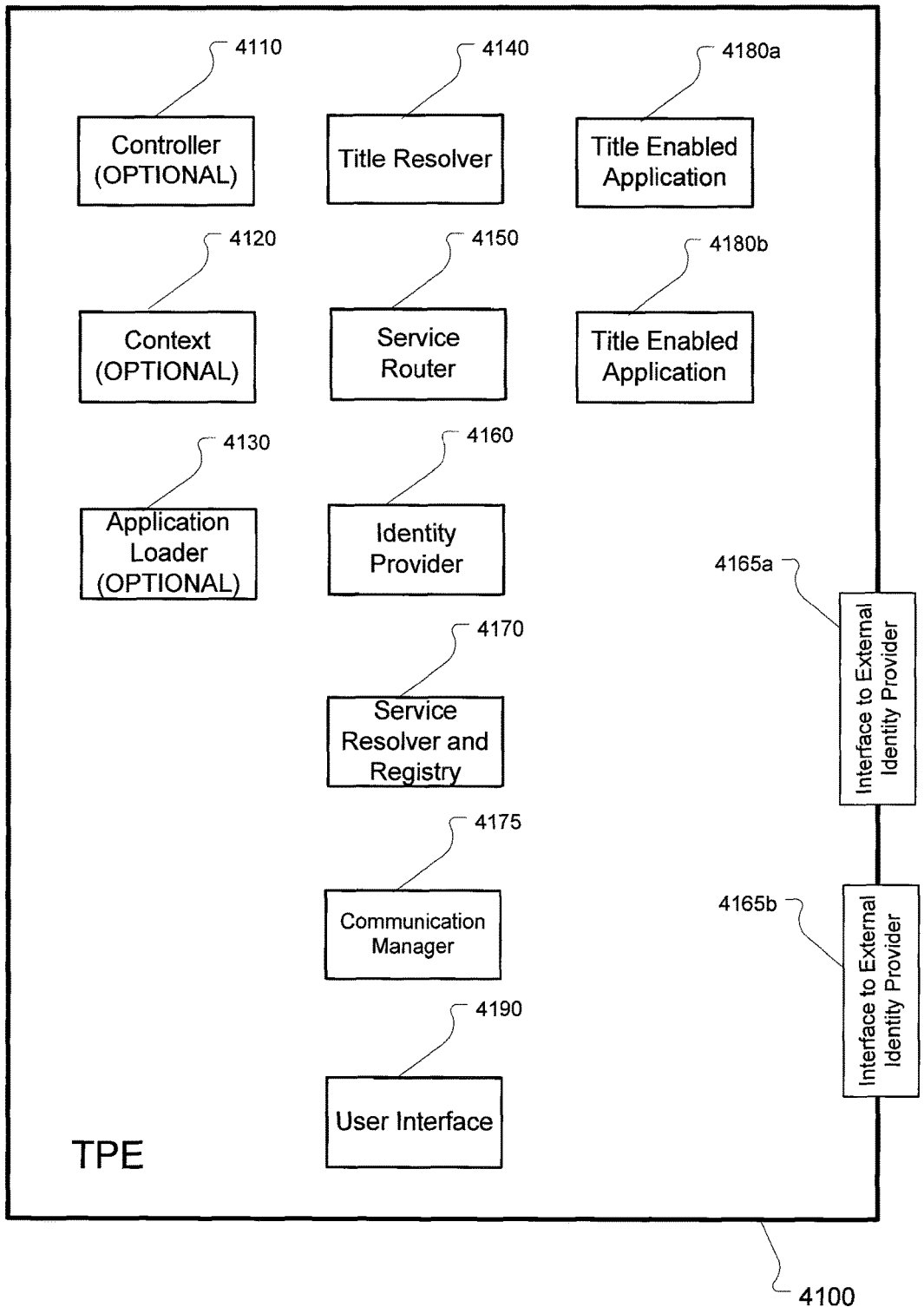

FIG. 4 extends the example shown in FIG. 3 to illustrate three users.

Figure 5:
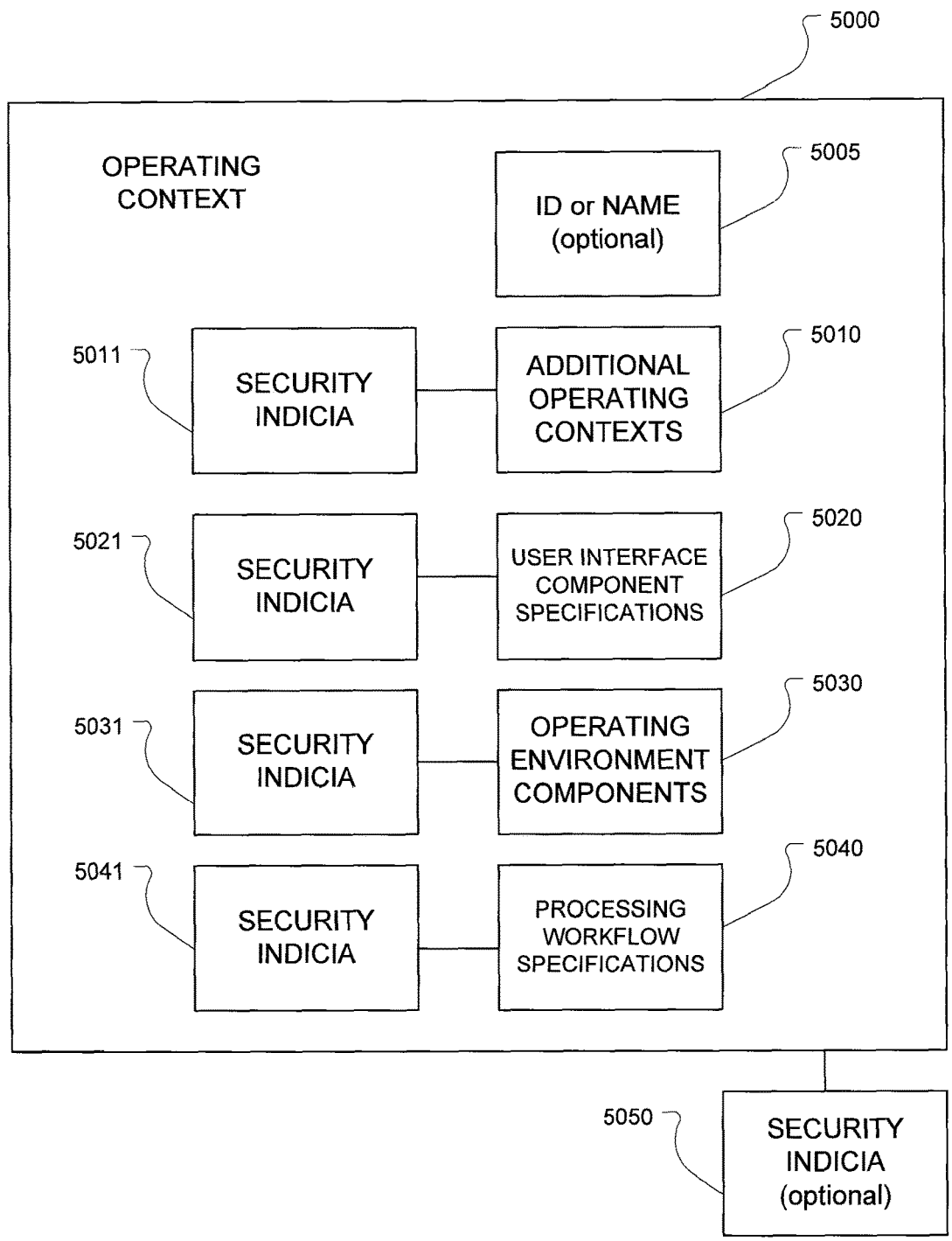

FIG. 5 is an illustration of an operating context implemented according to a specific embodiment of the invention.

Figure 6:
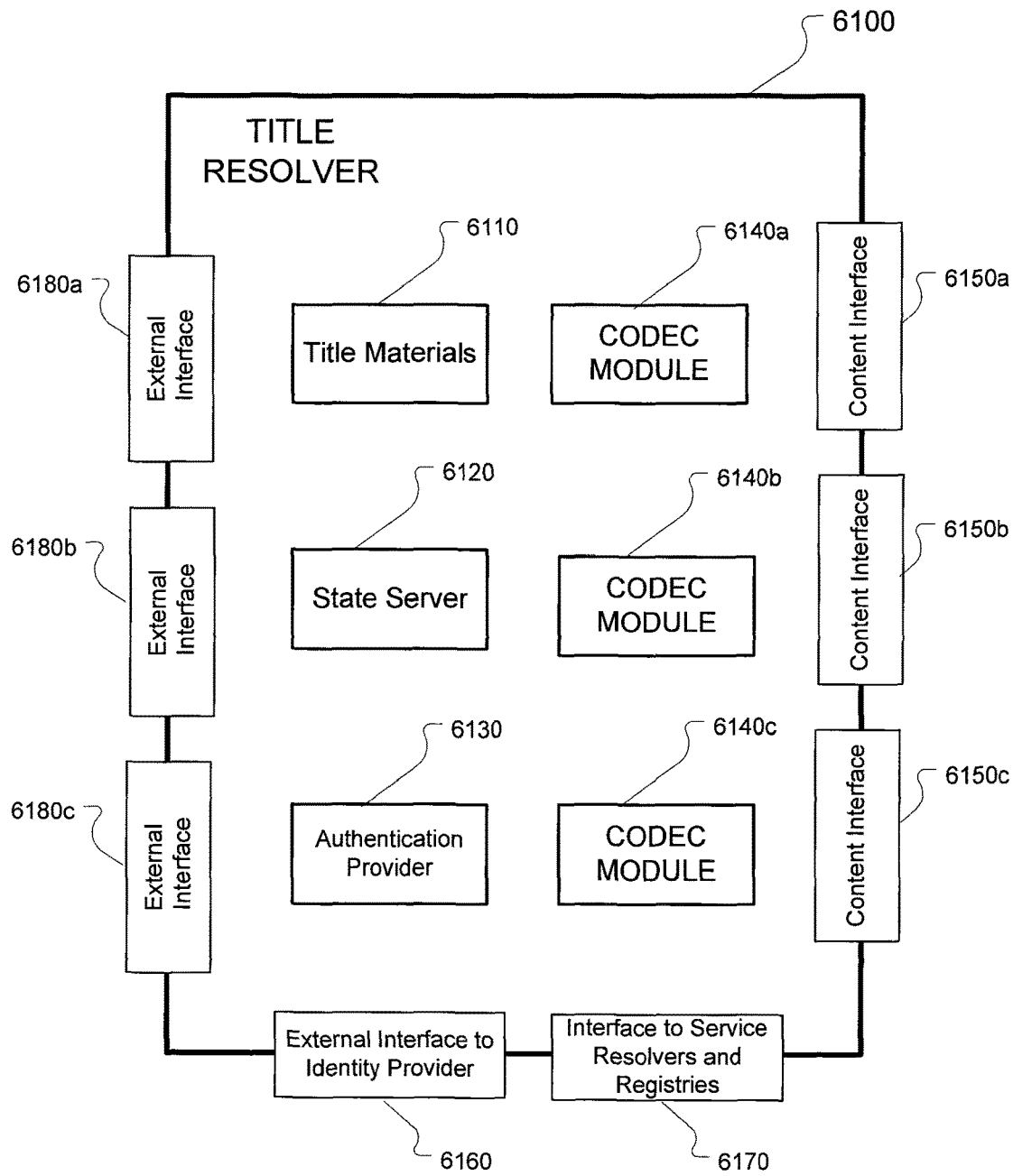

FIG. 6 depicts an example of a Title Resolver and its components.

Figure 7:
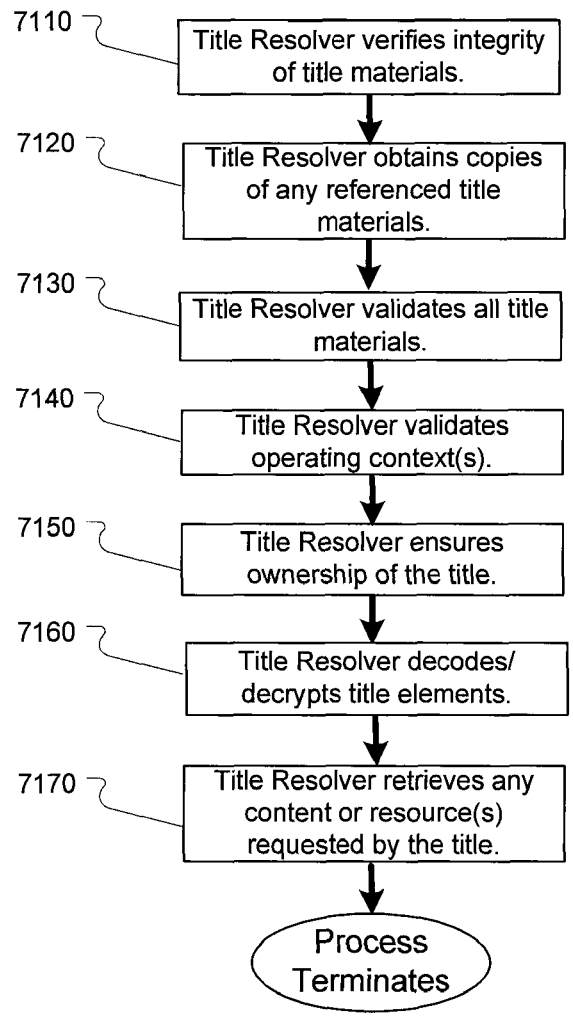

FIG. 7 is a flowchart illustrating a process for resolving title materials according to a specific embodiment of the invention.

Figure 8A:
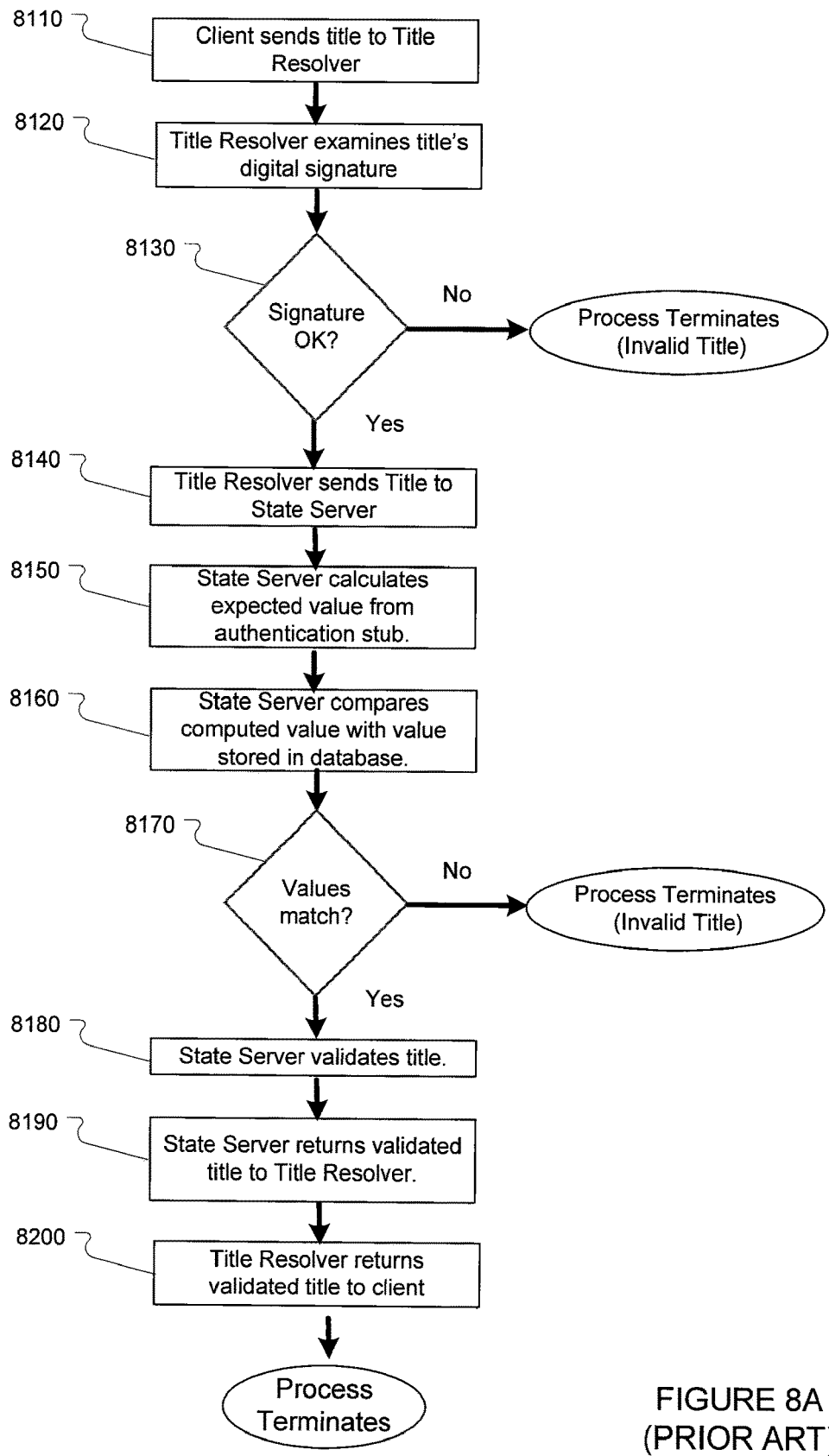
Figure 8B:
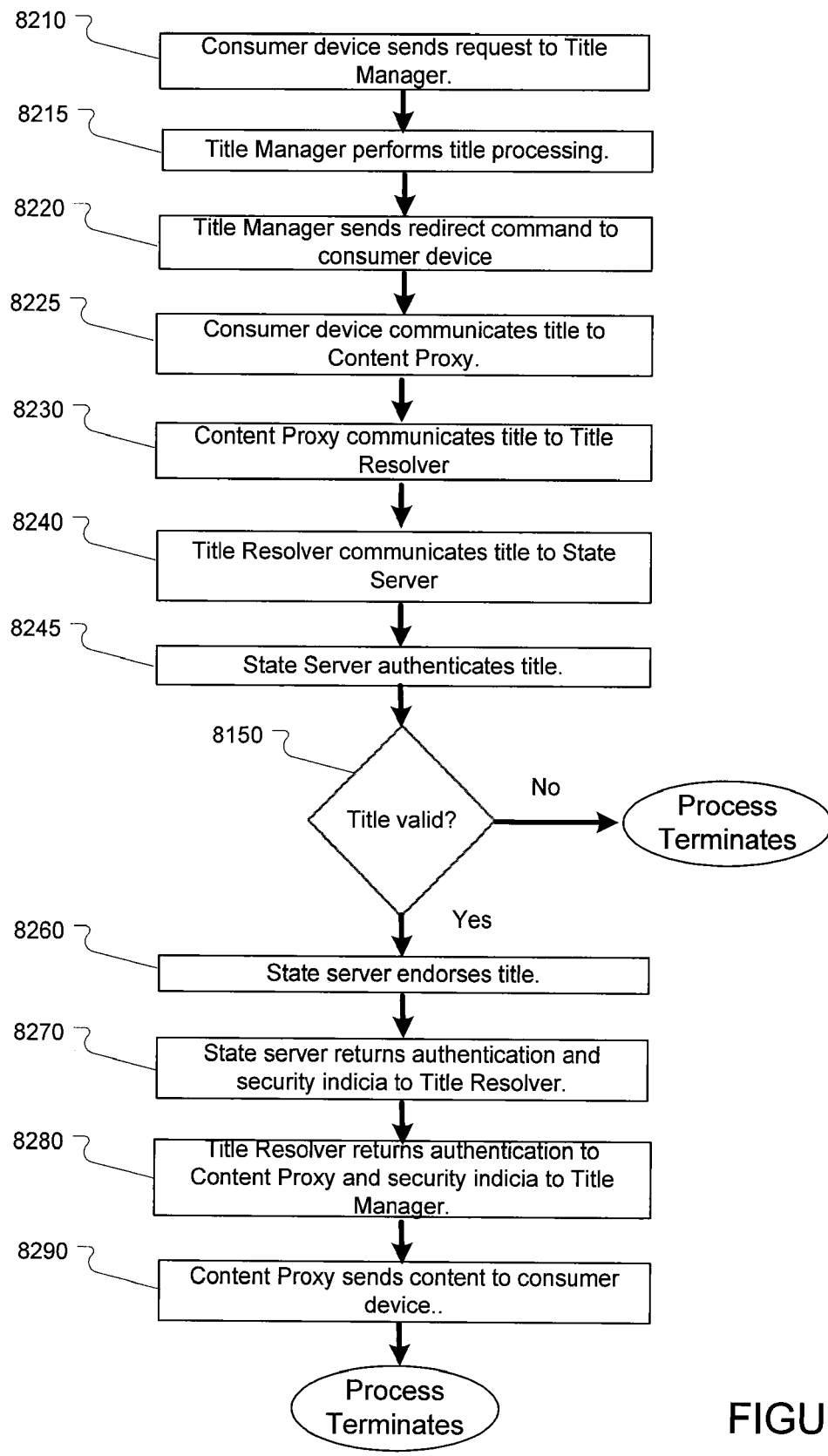

FIGS. 8A and 8B are flowcharts showing two alternative title validation processes according to specific embodiments of the invention.

Figure 9:
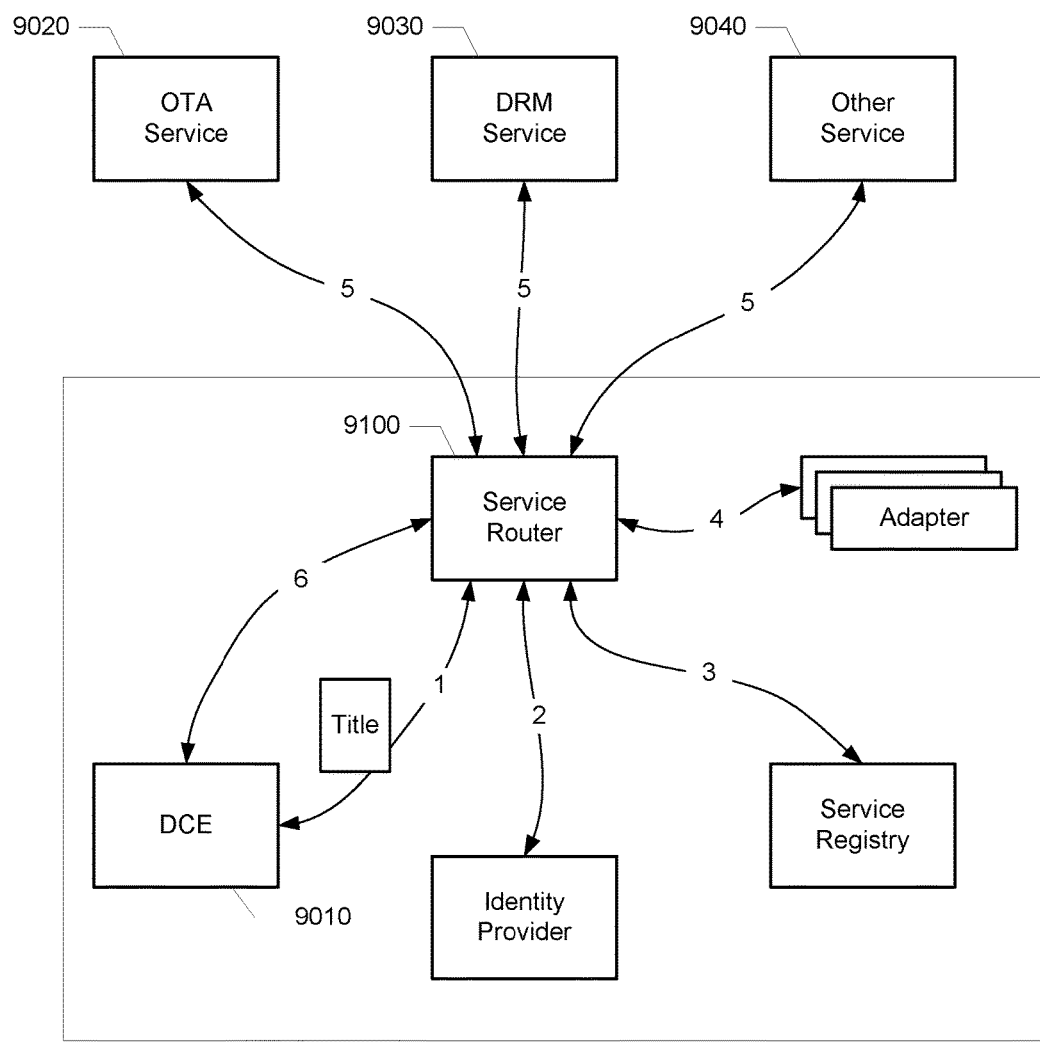

FIG. 9 is a schematic diagram of an example of a Service Router and its connections to services and applications in accordance with one embodiment of the present invention.

Figure 10:
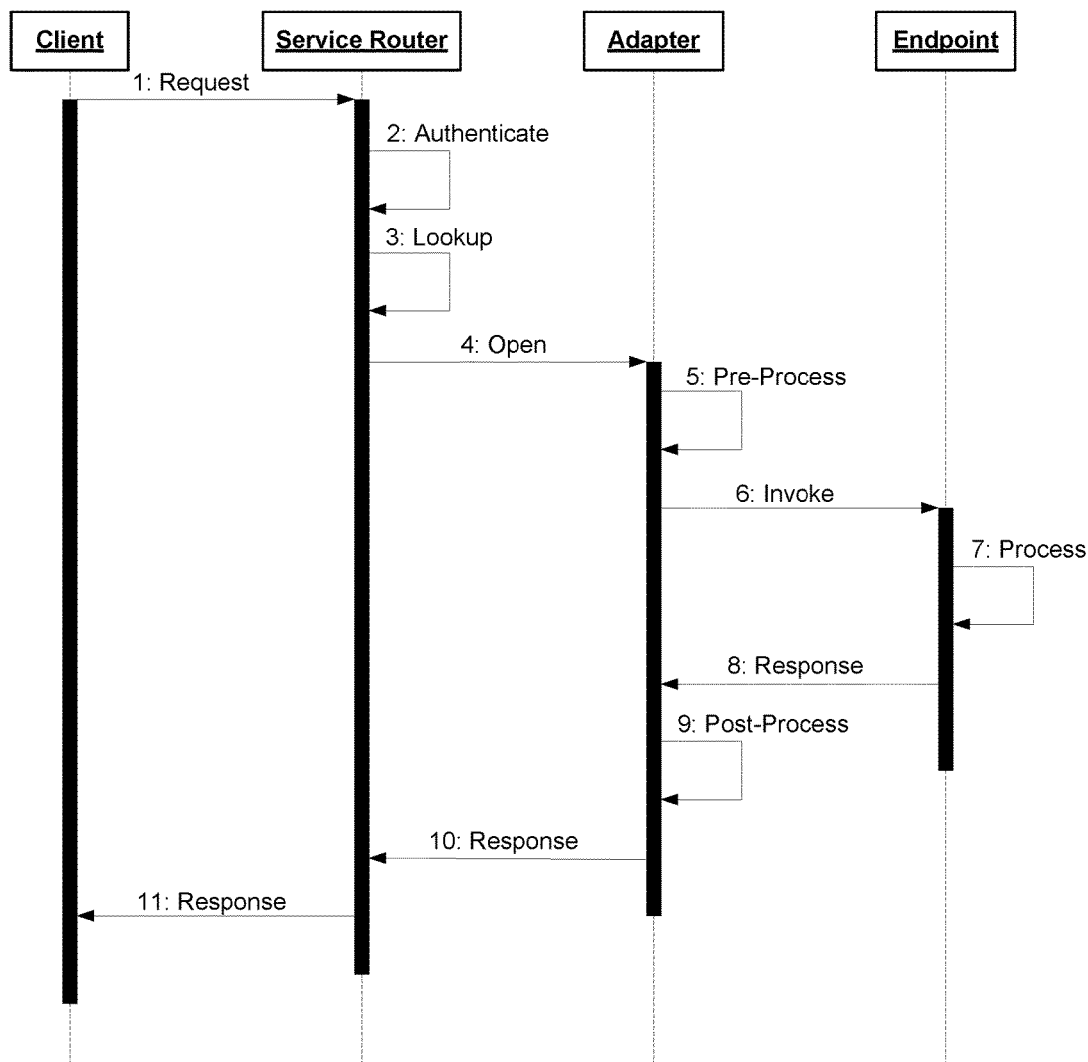

FIG. 10 is a message flow diagram that illustrates a simple flow example intermediated by a Service Router in accordance with one embodiment of the invention.

Figure 11:
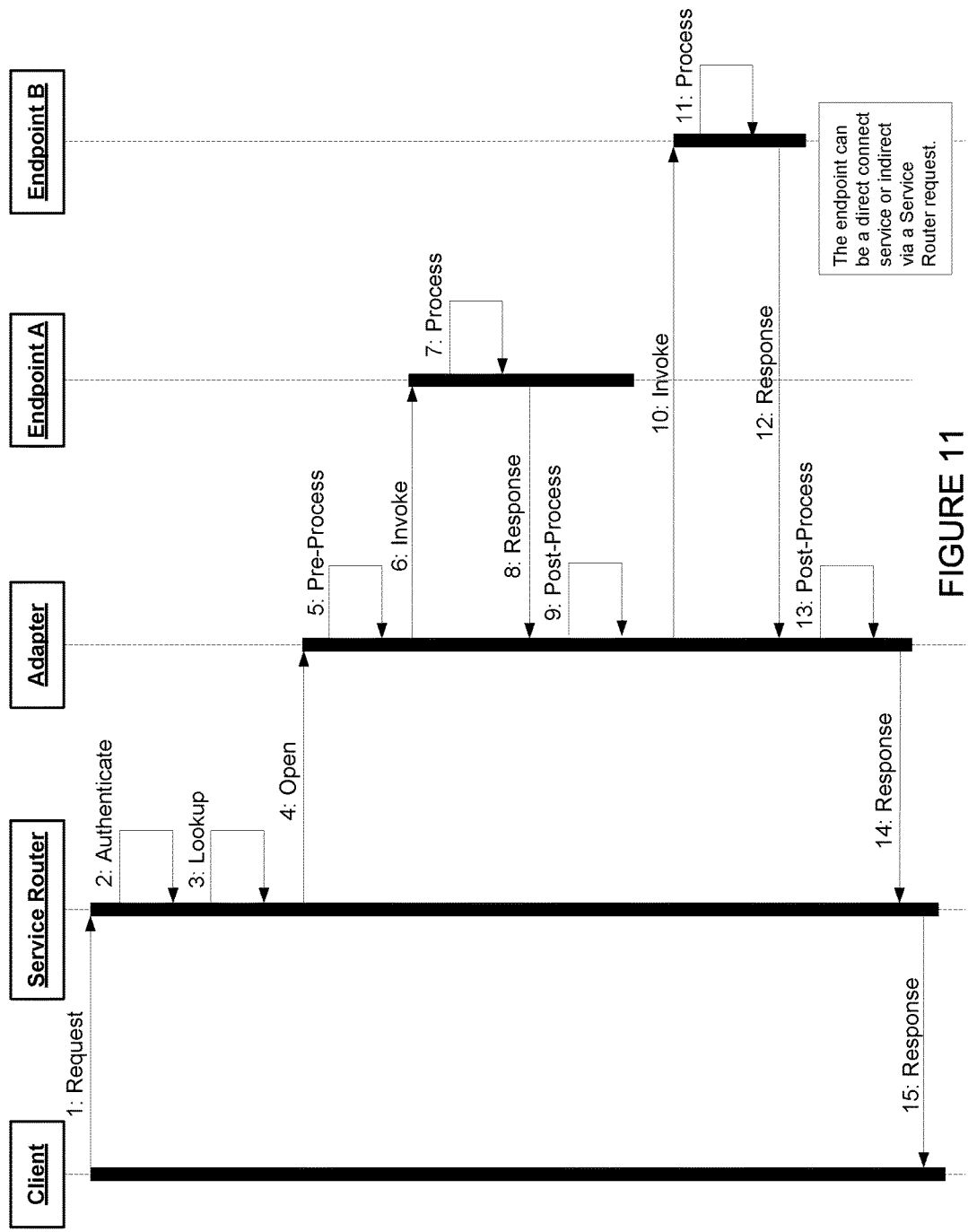

FIG. 11 is a message flow diagram that illustrates a more complex flow example with a plurality of endpoints in accordance with one embodiment of the invention.

Figure 12:
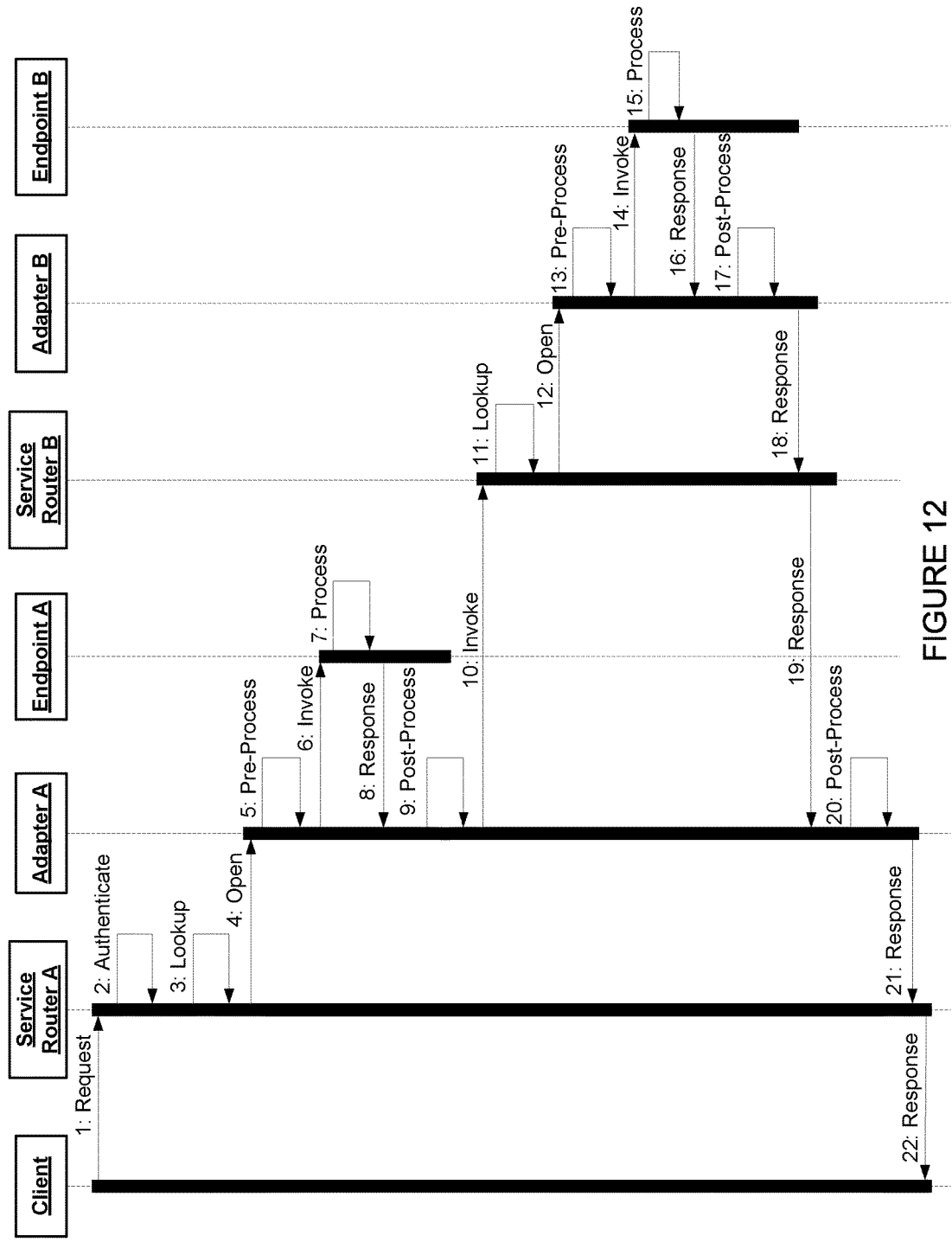

FIG. 12 is a message flow diagram that illustrates a complex flow example utilizing a plurality of endpoints and Service Routers in accordance with one embodiment of the present invention.

Figure 13:
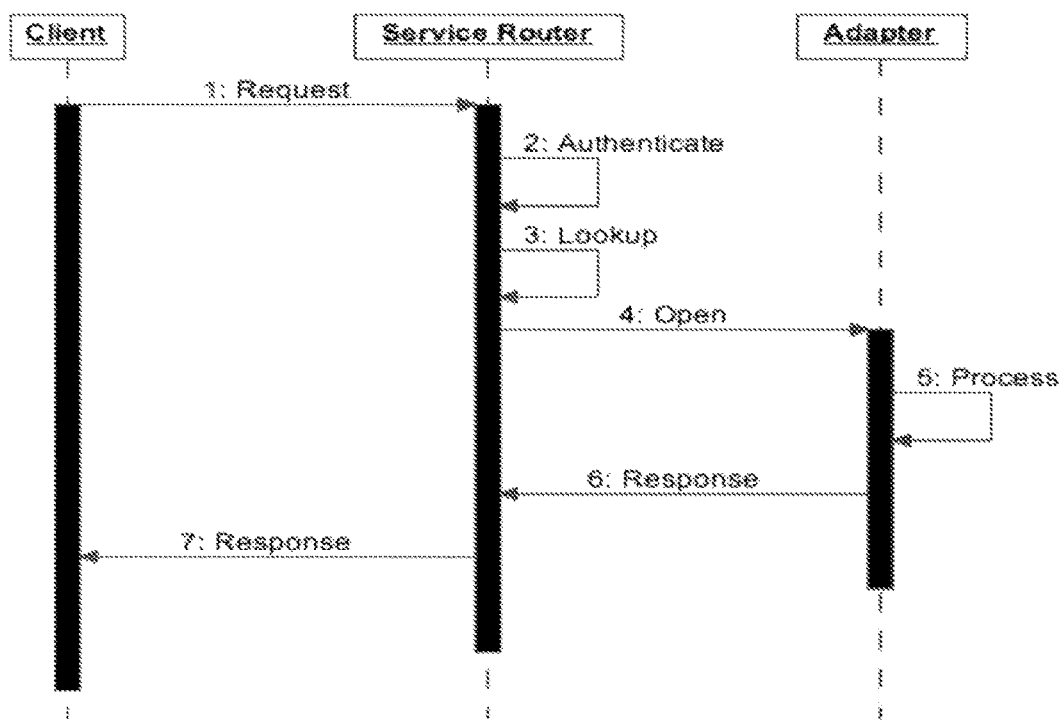

FIG. 13 is a message flow diagram that illustrates a flow utilizing an adapter as an endpoint in accordance with one embodiment of the present invention.

Figure 14:
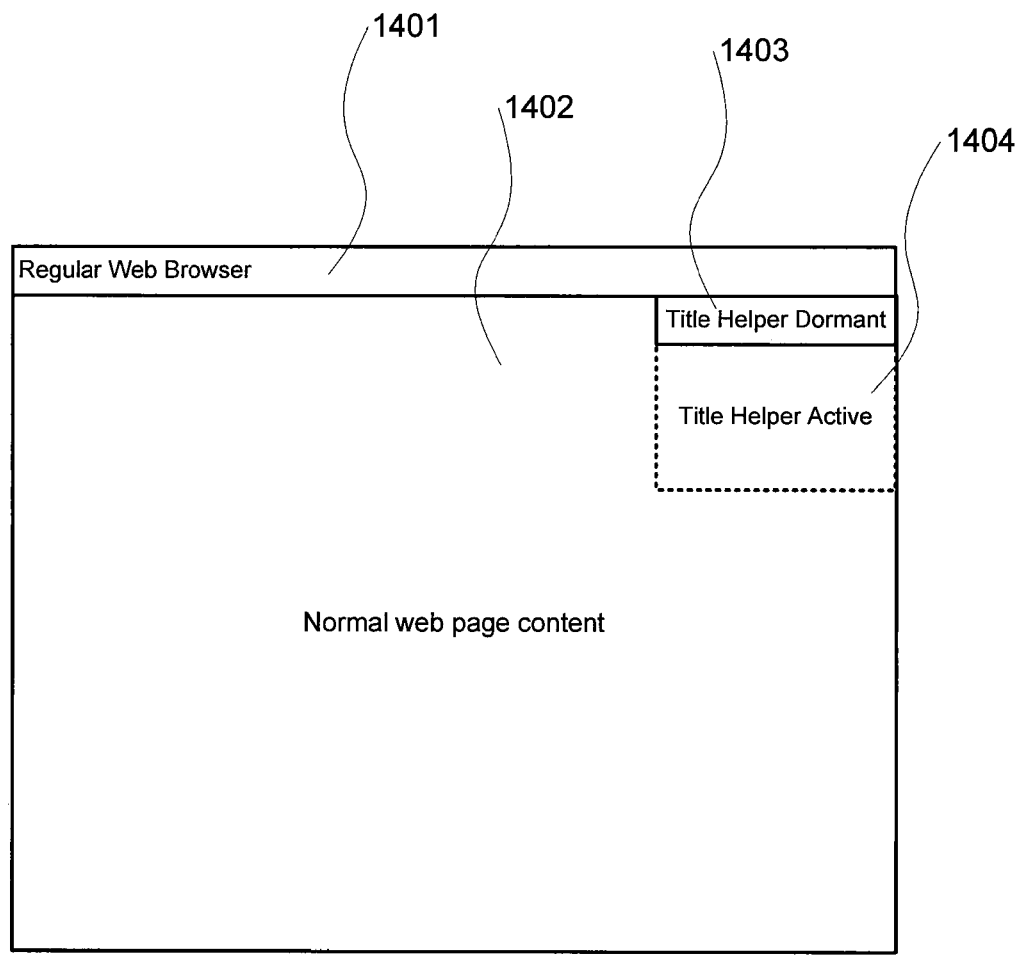

FIG. 14 depicts a simplified user interface to a title manager, shown as an independent overlay window, according to one embodiment of the invention.

FIGS. 15a-d illustrate examples of a user interface which facilitates interaction with title objects according to a specific embodiment of the invention.

6 DESCRIPTION OF SPECIFIC EMBODIMENTS OF THE INVENTION

6.1 Definitions

The following definitions are used throughout, unless specifically indicated otherwise:

| | |
|---|---|
| Authorization materials | A class of materials that are used to provide authentication and authorization when validated by an Identity provider. In embodiments where SAML is used, a SAML artifact is an example of authorization materials. |
| DCE | Digital Commerce Engine, a product of Navio Systems, Inc., of Cupertino, California. |
| Embedded | A software representation that is stored within a software container, in such a manner that the software representation may be uniquely identified and optionally removed. |
| SAML artifact | A small, fixed-size, structured data object pointing to a typically larger, variably-sized SAML protocol message. |
| Security indicia | An encoding of information that is used to convey one or more of identity, authenticity, or authorization. Examples of security indicia include SAML artifacts, id/passwords, digital hashes, Kerberos tickets. |
| Service | A service is an application program associated with at least one network address and port, which receives and processes request messages and optionally generates response messages. A general service description language may be provided, for example, by WSDL. |
| Service Identifier | Document ID, service definition name, or service alias |
| Service endpoint | A network service |
| Title or title object | Bearer-based rights representation such as, for example, titles implemented by Navio Systems, Inc., of Cupertino, California. |

6.2 Overview

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well-known features may not have been described in detail to avoid unnecessarily obscuring the invention.

Aspects of the invention are directed to the creation, ownership, exchange, management, reselling, marketing, bartering, and auctioning of titles. In this context, a title is an object that may have a number of elements and attributes including embedded digital content, ownership attributes, copy permissions, and others as described herein. A title can represent the rights to a single piece of digital content or a single resource, or it can represent the rights to a plurality of digital content and resources and in a variety of formats.

One aspect of the invention is the providing of an integrated title processing environment that provides seamless title processing services across a plurality of system and deployment models.

Embodiments of the invention are described with reference to specific apparatus and embodiments. Those skilled in the art will recognize that the description is for illustration and to provide the best mode of practicing the invention. For example, references are made to computer servers and clients, but in a peer-to-peer network, any computer is capable of acting in either role. Likewise, reference is made to Internet protocols while any substantially comparable data transmission protocols can be used.

6.3 Title Materials

A title object is a digital bearer instrument that expresses at least one right. Title materials include title objects, portions of title objects, for example, such as a specific right definition, a reference to specific title materials, such as reference to a specific title object, a specific right specified by a title object, or a reference to other independently validatable portions of title objects. A stub is one example of an independently validatable portion of a title object. A template is an additional example of an independently validatable portion of a title object.

Title materials may include workflow and service specifications, including service interface specifications. In some embodiments, a service definition is sometimes stored in a tf:Title/Content/Detail element, or it can be stored in a tf:Stub element.

Titles may express specific operating contexts required to redeem specific rights expressed by the title. In a first embodiment, there may be no operating context provided by the title. In an alternate embodiment, a single operating context can be provided by the title which applies to all rights expressed by the title. In still additional alternative embodiments, there may be a plurality of specific operating contexts, each associated with one or more rights or sets of rights. Alternatively, a combination of these approaches may be utilized.

Title materials may also include specific instances of digital bearer instruments that may not include a specific right. Title materials are presented to title-enabled processes, computers, and devices, which use the presented title materials to operate on and/or facilitate redemption of rights expressed by a title. Titles employed by specific embodiments of the present invention are related to the title technologies provided by Navio Systems, Inc., of Cupertino Calif.

The creation and use of titles and rights in accordance with embodiments of the invention can be achieved by those having skill in the art with reference to specific examples which can be found in the above-referenced International and U.S. patent applications.

6.4 Title Processing Environment

A title expressed right processing environment is a substantially complete environment for the processing of title objects and the rights expresses thereby. A title expressed right processing environment comprises one or more operating contexts, components, and services that are combined to produce a customizable method of processing at least one right expressed by title materials.

A title processing environment (TPE) is an instance of a title expressed right processing environment that defines various computer systems, components, configurations, and/or processing methods necessary to process at least one aspect of a title. A specific arrangement of computer systems, components, configurations, and/or processing methods may comprise a complete instance of a TPE. Alternatively, a specific arrangement of computer systems, configurations, and/or processing methods may comprise a specific functional subset of a TPE. Sometimes this functional subset provides a set of functionality and is called a TPE application.

All required functionality for providing a complete title materials processing system may be provided by a single TPE, by a collection of TPEs that interoperate, or one or more TPEs that interact with existing systems and services (collectively called external services).

A specific arrangement of components, configurations, and methods is typically specified using one or more operating context(s). Alternatively, an arrangement of components, configurations, and methods may be specified and managed using other means such as static configuration files, lookup tables, and service registry entries. A plurality of operating contexts may share one or more components, modules, configurations, or method instances. Each arrangement of components and optional context specifications describes a TPE instance. Optionally, TPEs may be disjoint and have no components or configurations in common. Furthermore, a TPE can be integrated with and coordinate the use of external services. Such TPE implementations can be provided using the techniques described herein and methods known to those having skill in the art.

Examples of specified components include core system functionality required to implement the TPE itself, and those components that implement features required to make the use and processing of title materials commercially successful. Specified components may be provided by one or more TPEs, and may include user interface, application, and title processing functions. For example, TPE applications include Wallet(s), My Stuff, and Shopping Cart functions, as well as title processing functions provided by a title transaction system (TTS).

In a typical embodiment, each instance of a TPE combines user interface, service, and workflow specifications with implementation components in the form of services, components, and user interface elements to produce a seamless, repeatable, and secure title processing environment. In more specific embodiments, a TPE may be deployed using servers, desktop and portable (laptop) computers, mobile devices (including, but not limited to, cell phones, PDAs, and music players), and embedded devices such as set top boxes, DVRs, and home entertainment controllers such as Microsoft's Media Center. Portions of a TPE may be deployed on different systems in differing ways as determined by the implementation requirements. In some embodiments, portions of a TPE may be deployed on disparate systems that cooperate to provide the functions of the TPE. For example, a user interface component and related user-centric title handling functions such as Wallet(s), My Stuff, and Shopping Cart applications may be provided on a user's desktop or handheld, and backend processing such as title transaction servers and DCEs can be provided on a logically separate server. In most embodiments, the TPE architecture includes a user interface operating on the currently in-use device (the device the user is currently using). Alternate embodiments are envisioned where the TPE operates upon a device other than the currently in-use device and communicates the user interface components to the currently in-use device using a protocol such as RDP or HTTP. More specifically, the TPE architecture extends title expressed right processing operations to an arbitrary user interface presented upon a user interface device of a user's choice. Implementations of TPE architectures, including distributed TPEs can be provided using the techniques described herein and methods known to those having skill in the art.

In some deployments, the TPE architecture may be deployed as one or more application programs that operate within an extant processing environment such as Windows XP or Java Runtime Environment. In some deployments, one or more components or functions of the TPE architecture may be embedded within third party applications present in these environments. Alternatively, portions of the TPE architecture may directly embedded within said extant operating system and may be used, in part, to fulfill title expressed right processing requests at the operating system level. In other embodiments, portions of the TPE architecture may serve as the underlying operating system when implemented upon specific devices. Such TPEs can be provided using the techniques described herein and methods known to those having skill in the art.

In an example embodiment, the TPE is implemented as a desktop application. In such an embodiment, the TPE's user interface may be implemented using a development platform such as Macromedia's Flash MX 7, although it may be developed using any commercially available application development platform, including alternative versions of Macromedia's Flash such as Flash Lite, or alternative development platforms such as J2ME and BREW. In other embodiments, one or more aspects of a TPE may be configured as a server application. Additional alternative versions of the TPE may also be developed for specific deployments. Each of these versions of the TPE architecture may be developed using the techniques described herein, platform specific development tools such as Windows .NET, commercially available from Microsoft, Java from Sun Microsystems, or other development environments, and methods known to those having skill in the art.

An instance of a TPE may be invoked in several ways. In a first embodiment, a specific TPE instance is invoked by the user when they select a user interface-enabled indicator on a web site or as part of an application. In other embodiments, a specific TPE may be invoked when the user selects an application link that identifies an instance of a user interface to be run. Alternatively, a specific TPE may be directly called by an external applications program or web site, or may be started based upon recognition of specific received content. Examples of the latter may include starting a specific TPE on the basis of a file type association, MIME type, or upon receipt and recognition of a title, upon receipt an out-of-band communications media such as e-mail or instant messaging containing a title. Another example is distribution of content on a network such as P2P in a format that can be recognized and invoked by client applications such as P2P applications. These files are distributed in a format recognized by the application. Alternatively, a specific TPE instance may be started at device startup and may be always running. In implementations where TPE functionality is embedded in other applications or operating system components, the TPE and its components may be directly called by the applications (such as a media player licensing interface) or by operating system components within which the TPE components are embedded. For example, a TPE may be invoked by the Microsoft Media Player license acquisition page. Alternatively, a specific TPE may be involved by a file browser such as Windows Explorer. Such TPE invocation methods can be provided using the techniques described herein and methods known to those having skill in the art.

Still other embodiments include embodiments in which the operating environment is further configured to review an operating context upon presentation of a title. In more specific embodiments, an operating environment is configured with a title resolver, and service registry, or controller, or other component capable of determining whether the operating environment can process said at least one right expressed by the title materials. In still more specific embodiments, the operating environment is configured to determine whether one or more additional objects require configuration or instantiation to enable the operating environment to process said at least one right. In yet more specific embodiments, the operating environment is further configured to configure or instantiate one or more additional objects required to enable said operating environment to process said at least one right. As described below, this component is called a Controller or a Service Manager. In some embodiments, the functions of Controller and Title Resolver and Service Registry are combined into a single component.

According to various embodiments, the present invention provides an architecture that enables provision of an extensible applications framework that flexibly supports a variety of features and functionality supporting title-based rights processing operations. Specifically, the present invention provides additional methods of defining and assuring rights processing operating environments to extend the capabilities of rights processing operating environments in a variety of novel ways. Environments for processing titles and the rights expressed therein have been established using systems and methods as described in the above-referenced International and U.S. patent applications. These environments are statically defined rights operating environments that operate in controlled server environments; the environments are established by configuring an arrangement of rights processing systems, and then providing titles that are processed by these systems.

According to some embodiments, additional capabilities have been created for rights operating environments. These capabilities permit rights processing environments to be used outside of controlled server-based environments, including operating rights processing environments in which one or more portions are formally defined or in which configurations are formally assured against tampering, spoofing, and other Internet ills. Formally defining title processing environments permits a title processing environment to determine if it is able to properly process a redeemed right expressed by at least one title prior to starting the processing of that right. It also eases the burden of provisioning title processing environments by system administrators responsible for keeping these environments operating. The formal definition of an operating environment is sometimes called an operating context. Assurance of title processing environments are technical means by which the components and configurations which comprise a title processing environment may be determined to be free from tampering or changes from a known, defined standard. In many cases, assurance is provided using cryptographic means, such as digital signatures and hashes. Application of these cryptographic means for assurance of processing environments is well understood to those skilled in the art. Some title processing environments may be both defined and assured, meaning that they are formally defined and their components are assured to be free from tampering or unauthorized changes. Defined, assured, and defined+assured title processing environments significantly extend the capabilities of title processing environments by:

supporting the seamless deployment of distributed title processing capabilities to untrusted host computing platforms, by permitting efficient identification of whether a specific title or right being presented for redemption is being processed by an authentic title processing environment, by permitting efficient determination by the title processing environment as to whether the specific instance of a title processing environment is able to process the presented title in accordance with the specifications of the right, and by providing instructions to the instance of a title processing environments as to the components required in order to process the title.

According to some embodiments, portions of a TPE may be cryptographically protected against tampering, and are validated and verified using techniques and processes similar to those described herein prior to use.

Furthermore, in accordance with specific embodiments of the present invention, the user interaction with a title processing environment may be specified and defined in order to assure content providers and merchant sellers of the user interaction provided during title processing.

6.4.1 Title Processing Ecosystems

Instances of TPEs of the present invention may be operably combined, either within one or more applications, servers, and systems as understood by those skilled in the art to form a title processing arrangement. Each arrangement is typically defined as described above. Each title processing arrangement may have one or more users, vendors, and/or customers who interact with one or more aspects of the title processing arrangement to effect business transactions using title materials. The set of TPEs, combined with the set of users, vendors, and customers who use a particular title processing arrangement to conduct title-enabled commerce is called an ecosystem. Ecosystems may share one or more TPEs, users, customers, and vendors.

Figure 1:
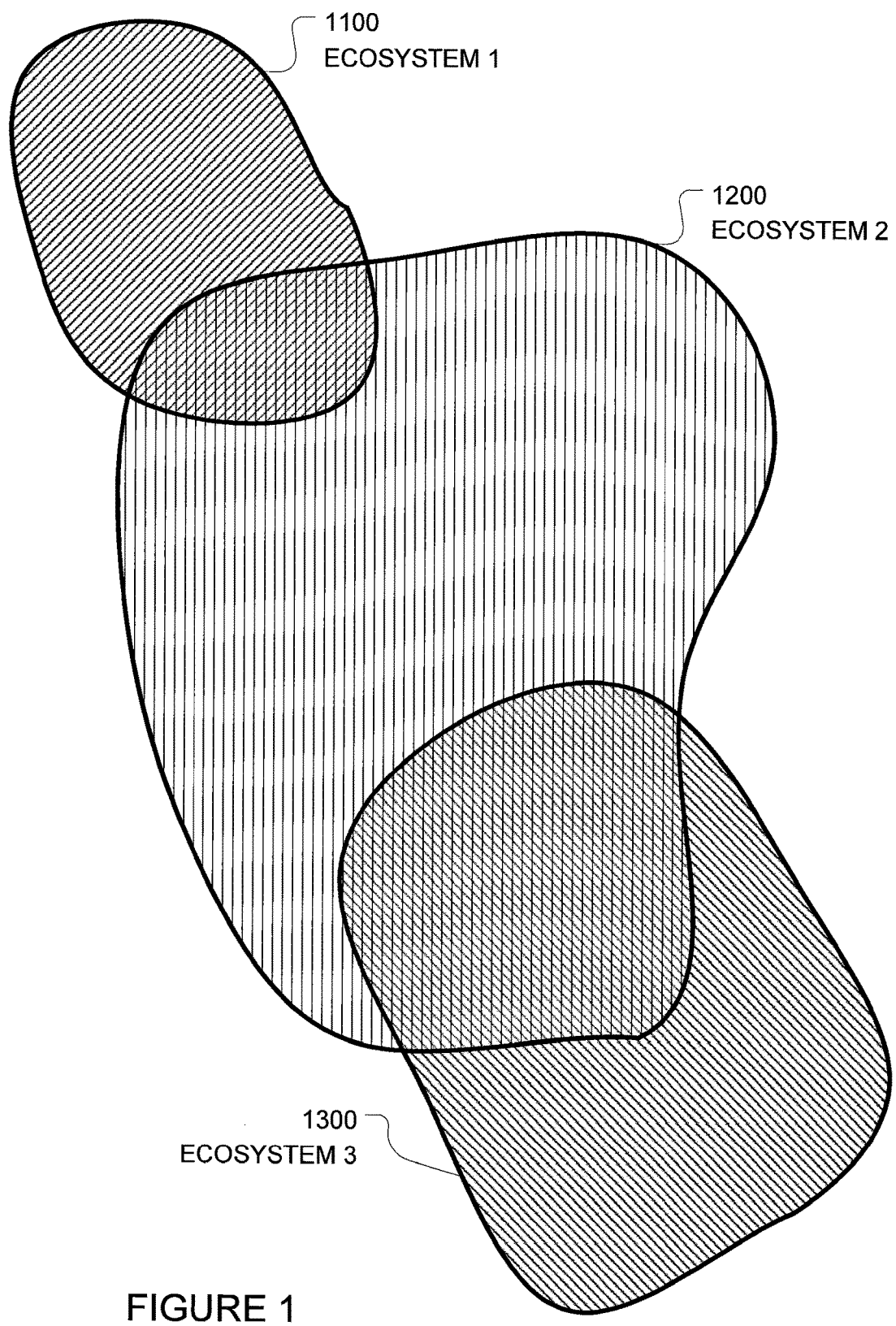
FIG. 1 depicts an example of a Title Processing Environment (TPE) and its components.
Figure 2:
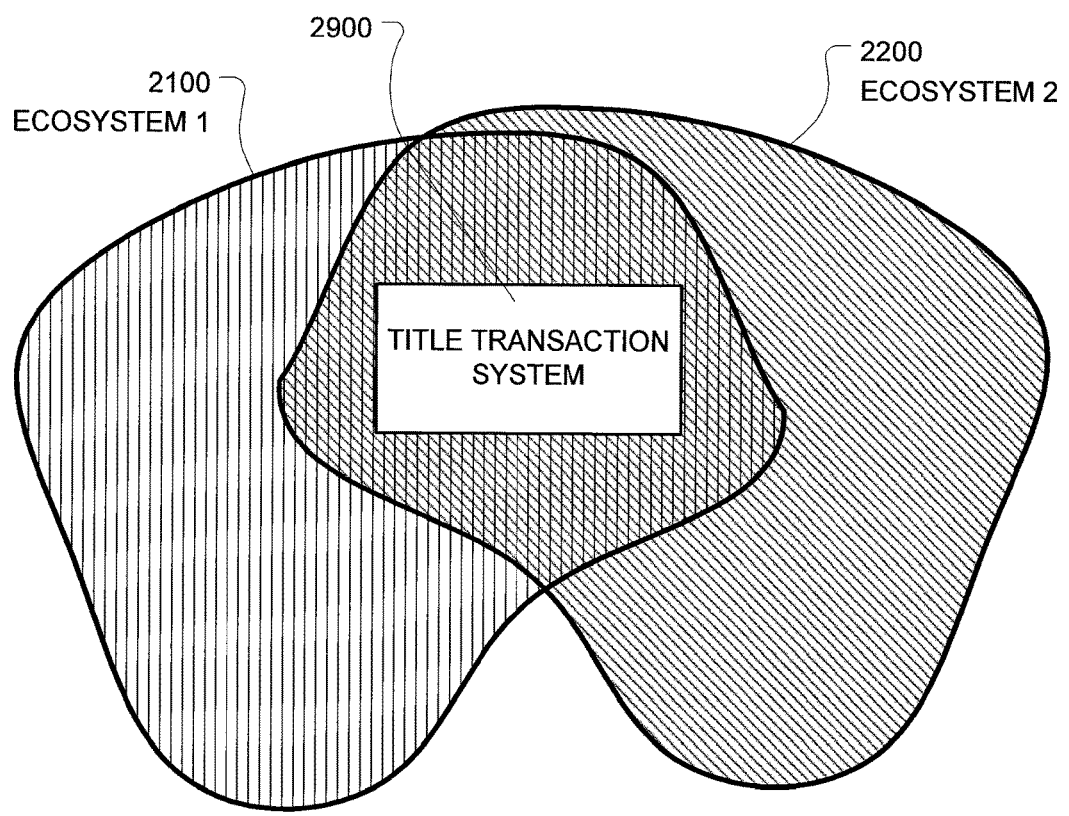
FIG. 2 depicts three overlapping ecosystems according to an embodiment of the invention.

FIG. 1 depicts three overlapping ecosystems according to an embodiment of the invention. Ecosystems illustrate the logical separation between processing domains. FIG. 1 illustrates three partially overlapping ecosystems (1100, 1200, 1300). The logical separation of processing domains enables the construction of provider-specific title processing environments based upon a set of common components while maintaining an appropriate logical and/or physical separation between the information being processed within each title processing environment. For example, a first set of ecosystems can be constructed to support the business of music and ring-tone distribution and have as customers the music industry, mobile telephony carriers, and their respective customer bases. These ecosystems have common components including applications such as title transactions systems, customer and user applications including wallets, shopping carts, etc, and have a disparate components applications such as an OTA server (for ringtones) and a music player plug-ins and applications (for music). This is illustrated in FIG. 2, in which two ecosystems (2100, 2200) are shown sharing a common component (2900) of a title transaction system (TTS) application. A second set of disparate ecosystems may include a set of public networking companies providing title enabled networks, and using title technologies to provision and provide specific network services. This second set of ecosystems also include common applications, such as a title transaction system, and may include additional operating system components such as a title enabled network stack. The set of users and vendors for these second ecosystems may be disjointed between the networking provider ecosystems, and may or may not overlap with the music and ringtone provider ecosystems. This is illustrated using FIG. 3, in which two ecosystems (as shown in FIG. 2) support a plurality of users. A first user (3300a) is a participant in ecosystem 3100. A third user (3300c) is a participant in ecosystem 3200, while a second user (3300b) is a participant in both ecosystems. Vendors and customers may be shared between ecosystems in similar ways.

As shown above, each ecosystems may have one or more instances of the same or similar components, may share components, and may have the same or differing users, customers, and vendors. Each ecosystem may have separate instances of a common component. In some embodiments, sets of instances of a common component may operate together (e.g., in one or more clusters) to provide redundancy and performance improvements. The specification of specific application component instances and the definition of their membership in particular ecosystems is provided using environments and contexts as described herein. The interoperability between ecosystems is described herein and is definable using the components and techniques described herein.

6.4.2 Architecture and Logical Configuration

Referring to FIG. 4, a specific embodiment of a TPE (4100) comprises optional one or more operating context(s) (4120), an optional context, application, and component loader component (4130), an optional service manager or controller component (4110), an identity provider component (4160), title resolver component(s) (4140), a service resolver and registry component (4170), a service router component (4150), an optional communications manager component (4175), optional TPE applications (e.g. 4180a/b) such as a title transaction system (TTS) and Wallet applications, at least one user interface (4190), and optional interfaces to external services (e.g. 4165a/b).

Operating contexts (4120) are used to define the arrangement of TPE components, the arrangement being managed and made operational by components such as the context, application and component loader (4130) and the service manager or controller (4110). In some embodiments, the context, application and component loader, and service manager and controller components may be omitted and the configuration of the TPE components statically defined. Various embodiments may combine the features and functions of the context, application, and component loader, the service manager, and controller components.

A TPE (4100) additionally provides an identity provider (1160) and/or an interface to one or more external identity providers (e.g. 4165a/b). The TPE uses the identity provider in numerous ways as described herein.

A TPE further provides one or more title resolver component(s) (4140), service resolver and registry component (4170), and service router component(s) (4150), and an optional communications manager component (4175), which provide infrastructure support for title processing within the TPE. In some embodiments, the communications manager functionality is embodied in a service router, service manager, or other TPE component that provides service orchestration, marshalling, and related services to the TPE. In other embodiments, the communications/session management component of the TPE manages the communications between the TPE components. This component is sometimes called a connection manager. Different connection managers may be provided to support different protocols, for example, a TPE may simultaneously support a connection manager that supports the SOAP protocol, one that supports an RPC over HTTP protocol, and yet another that supports SHTTP. The connection manager is preferably implemented as discrete components, but may be implemented as a single component in some implementations. The communications management component optionally includes the capability to orchestrate the completion of one or more services on behalf of the TPE.

The TPE further provides one or more optional TPE applications, such as a previously described TSS and Wallet title-based applications (e.g., 4180*a/b*) that provide business functionality, and one or more user interface components (4190) effective to provide an interface between TPE applications and users, customers, and vendors. The user interface components may also provide user interfaces to other TPE components as required.

Specialized implementations of a TPE may be constructed that omit one or more the above described components, and the functionality of any of the described TPE components may be integrated together with, or deployed separately from, any other TPE component. For example, an integrated Service Resolver and Registry may be combined with a Service Router as part of a particular TPE application.

6.4.2.1 Base TPE Components and Modules.

6.4.2.1.1 Operating Context

According to some embodiments, the present invention provides systems, methods, and software for processing digital bearer instruments in accordance with configurations specified in at least one operating context. The operating content(s) required may be provided within an existing operating environment, as part of a title for which a right is being redeemed, or as part of an external service to one or more operating environments.

In a particular embodiment, the system further comprises at least one operating context corresponding to one or more right(s) expressed by a title. The operating context is configured to describe and/or provide components of an operating environment that is effective to process the right(s). The operating context may define or reference a specific TPE, or may provide a specification for a TPE that is created "on-demand" to process one or more rights.

Additional embodiments include those in which the title includes at least one right that is associated with the operating context. Alternative additional embodiments include those for which the title includes at least one operating context that is associated with at least one right. If a plurality of operating contexts are provided, the title resolver component in the operating environment is responsible for determining the effective operating context to use in processing each redeemed right.

Furthermore, each operating context, whether expressed as part of an operating environment or by a title, may be provided in a plurality of ways. In a first embodiment, the operating context may be "embedded," in which case, the operating context is present within the operating environment or title. In a second embodiment, an operating context may be "named" by the operating environment or title using a name or description suitable for the purpose. For example, a name might be a globally unique ID, a textual name, or a combination of a plurality of elements such as a textual name and a version number. A named operating context may be located and made available to the operating environment by use of a directory service, a name service, a database, or equivalent service in the operating environment such as a service router. In particular, an operating context may be obtained from a service resolver and registry to which it has been published. Alternatively, an operating context may be referenced from an operating environment or a title using any supported referencing technology. Some well known technologies include an XPointer and a URI. If a plurality of operating contexts are expressed within a title, each operating context may be expressed using a similar or different means. The provisions of such operating contexts can be provided by those having ordinary skill in the art using this disclosure.

An operating context is a data structure that specifies one or more aspects of an operating environment. FIG. 5 illustrates an example of a representation of an operating context. Each operating context may be represented in any common format used for representing information. One such representation is an XML data structure such as is commonly used by those skilled in the art. Other representations, such as ASN.1, database tables, tag-value pairs, etc. may also be used without loss of generality.

Each operating context (5000) comprises zero or more instances of its component elements, each of which may be named, referenced, or included by embedding within the operating context. These component elements include an optional name or ID (5005), additional operating contexts (5010), user interface component specifications (5020), operating environment components (5030), and processing workflow specifications (5040). Each element reference may be accompanied by security indicia that may be used to verify its integrity (5011, 5021, 5031, 5041). Optional security indicia (5050) may be included for the operating context itself to permit the verification of the operating context itself.

An optional name or unique identifier may be included within each operating context in order to make the operating context uniquely identified. A preferred identification mechanism is to use a globally unique identifier such as a Microsoft GUID or a UUID as specified by DCE. Alternatively, a textual name may also be used, either in conjunction with the unique ID, or on a stand-alone basis.

Zero or more additional operating context specification(s) (5010) may be included within an operating context. In some embodiments, these additional operating context specifications are embedded within the first operating context. In other embodiments, the additional operating context specifications may be named by the first operating context instead of being embedded within it. Alternatively, the additional operating context specifications may be named by the first operating context using any of the common referencing schemes mentioned herein. If a plurality of additional operating context specifications are included within a first operating context, each may use the same or different method selected from embedding, naming, or referencing. Each additional operating context specification included within an operating context may be accompanied by security indicia (e.g. 5041) useful in determining its authenticity and integrity.

Zero or more user interface component specifications (5020) may be included within an operating context. In some embodiments, these user interface component specifications are embedded within the first operating context. In other embodiments, the user interface component specifications may be named by the first operating context instead of being embedded within it. Alternatively, the user interface component specifications may be named by the first operating context using any of the common referencing schemes mentioned herein. If a plurality of user interface component specifications is included within a first operating context, each may use the same or different method selected from embedding, naming, or referencing. Each user interface component specification included within an operating context may be accompanied by security indicia (e.g. 5021) useful in determining its authenticity and integrity.

Zero or more operating environment components (5030) may be included within an operating context. In some embodiments, these operating environment components are embedded within the first operating context. In other embodiments, the operating environment components may be named by the first operating context instead of being embedded within it. Alternatively, the operating environment components may be named by the first operating context using any of the common referencing schemes mentioned herein. If a plurality of operating environment components is included within a first operating context, each may use the same or different method selected from embedding, naming, or referencing. Each operating environment component included within an operating context may be accompanied by security indicia (e.g. 5031) useful in determining its authenticity and integrity.

Zero or more processing workflow specifications (5040) may be included within an operating context. In some embodiments, these processing workflow specifications are embedded within the first operating context. In other embodiments, the processing workflow specifications may be named by the first operating context instead of being embedded within it. Alternatively, the processing workflow specifications may be named by the first operating context using any of the common referencing schemes mentioned herein. If a plurality of processing workflow specifications is included within a first operating context, each may use the same or different method selected from embedding, naming, or referencing. Each processing workflow specification included within an operating context may be accompanied by security indicia (e.g. 5041) useful in determining its authenticity and integrity.

Optional security indicia (5050) may be included for the operating context itself to permit the verification of the authenticity and integrity of the operating context itself. Security indicia in an operating context may be any indicia that may be used to verify the integrity of the referenced component, e.g., a checksum, digital hash, or digital signature.

An operating environment constructed in accordance with an operating context as described above is said to be "defined". Operating environments may be check-summed or digitally signed using well known methods, and these security indicia may be checked when an operating environment is assembled. If the environment is assembled without the use of an operating context, but the security indicia associated with the operating components are checked to assure their integrity, the operating environment is said to be "assured". In some embodiments, the security indicia of one or more operating contexts may be used to verify each component as the operating environment is provided to ensure that the operating environment provided has not been tampered with or otherwise corrupted. Operating environments that are defined using an operating context and are constructed using the security indicia of an operating context to verify their integrity are said to be "defined+assured".

In more specific embodiments, any one of the operating contexts described above is combined with any one of the operating environments just described, i.e., one of each operating context (embedded, named, and referenced) is combined with one of each operating environment (assured, defined, and assured and defined) to provide an embodiment of the present invention for each of the 3×3=9 different combinations. In still more specific embodiments, the operating environment is both assured and defined by an operating context. Again, the provision of such operating environments can be accomplished by those having ordinary skill in the art using this disclosure.

Each operating environment may be statically configured, in which the configuration of the components is not changed using an operating context. This implementation model is straightforward and provides title processing within fixed operational constraints. Some business models require different configurations, and these configurations may be accommodated using a plurality of operating environments, each statically configured in a different manner. As is clear to the reader, this deployment model scales poorly. A second deployment option is to use operating environments that are dynamically configured using an operating context. In this model, the operating components are all instantiated, but are only referenced and used on an as needed basis. This model, while more flexible, also scales poorly across a plurality of devices and device types. Dynamic configuration often requires a priori knowledge of workloads and system performance dynamics that are often not precomputable. Similarly, dynamic configuration mechanisms introduce issues of component distribution and whether all needed components are available at the time they are needed. A third alternative, the dynamic loading and unloading of components based upon an operating context is also provided. In this alternative model, operating environment components need not be instantiated until they are actually needed by a specific operating environment. Each operating environment may be constructed using components which are not running prior to the creation of the operating environment, which are instantiated as they are needed, and are unloaded as soon as they are used. When coupled with the ability of an operating context to embed one or more components, this provides for a portable, assured, and defined system for the processing of titles. This technology thus permits the digital bearer nature of titles to be fully expressed to the point that they can be processed immediately by a bearer. Again, the provision of such operating environments can be accomplished by those having ordinary skill in the art using this disclosure.

According to specific embodiments, the present invention provides methods for processing digital bearer instruments and computer-readable program code devices that are configured to implement such methods (i.e., software). The context is configured to provide an operating environment effective to process at least one right, and is further selected from the group consisting of: embedded, named, and referenced operating contexts; and said operating environment being selected from the group consisting of: assured, defined, and assured+defined operating environments.

6.4.2.1.1.1 TaskMap

As described herein, each operating environment supports the capability to dynamically reference, locate, and instantiate application components. In some embodiments, processing an operating context specification causes an operating environment to load or cause to be loaded the identified required components, including application components, built-in components, and external services, and user interface components including screen, panes, fonts, skins, and related user interface components. Component specifications may be defined within the operating context specification, or alternatively, the operating context specification may specify one or more task maps that perform the specification of one or more desired components. An operating context specification may also define distributed workflow parameters, and associate specific components with portions of the workflow. The operating environment implements the desired security model and session handling, including session isolation in accordance with a specification provided within an operating context.

In some embodiments, a task map is used within an operational context to provide a map between specific distributed workflow operations and specific services or application components (either plug-in or built-in). For example, a task map may identify the shopping cart application component to be used in a specific implementation, and may further identify the application components, layouts, and styles to be used when working with this component.

A task map may include one or the following elements:
a. Property/attributes
b. Identification
c. View identification
d. Package identification
e. Task name
f. View specification.
g. Optional localization/internationalization specification,
h. Application specifications
i. Application component specifications
j. Task definitions
k. Default package path
l. Error handling A task map identifier may comprise a unique ID or name, consistent with other unique ID and name descriptions within the Active User interface architecture.

A task map may comprise one or more task specifications. Each task specification may include optional specifications for task names, view specifications, package specifications, skin specifications, style sheet specifications, and locale specifications. A task name provides a descriptive name for the task, such as "Accountless checkout." A task may be associated with a specific title expressed right action, a group of title expressed right actions, or an entire operating context.

A view specification provides a specification for the look and feel for the task and may be provided, for example, in the form of an XML specification as described above. The view specification may be identified with a view identification. A view identification may comprise a unique ID or name, consistent with other unique ID and name descriptions within the User interface architecture.

A package identification may comprise a unique ID or name, consistent with other unique ID and name descriptions within the User interface architecture.

An optional localization/internationalization specification specifies the localization parameters to be used for this task. This specification may be expressly specified, or may reference a style sheet specification. In embodiments where the localization/internationalization specification is provided, there are several mechanisms available. In one embodiment, the application may follow ISO conventions for specifying various sets of localization parameters. For example, the language code may use the ISO default for "US English".

An application component specification specifies names or describes a user interface component (either built-in, plug-in, or external service) that provides application services for this task. User interface component references may take the forms described herein, or may take other forms appropriate to the implementation system or platform. In various embodiments, the application component specification may be a DLL or COM object, a Java class, an application operating context such as a JAR, a CORBA object ID, a service identifier or specification, or other implementation dependant method of identifying the specific application component desired. Optionally, the application component specification may specify the calling and response interface for the application component. In some embodiments, the application component specification comprises a reference to an external service enabled for the processing of title-based rights.

The task class specifications may define alternate application components or methods of specific application components that should be associated with specific distributed workflow components. For example, the task class specification may define a specific "Thank You" screen for the "Accountless checkout" task. It defines a specific application component, view, and other presentation information with a specific "Thank You Screen" as a distributed workflow event within the task manager. Upon receipt of the "Thank You Screen" distributed workflow event, the User interface causes the application component to be executed within the specified operating context.

A title (or other application component may, indirectly through its view) may specify an operating context it requires in order to provide a title expressed right processing environment. If the User interface, operating on behalf of the title is unable to locate and successfully load a specified operating context, component, or remote service, the error handler UI is invoked in accordance with the current error handler UI specification. The error handler used is the error handler associated with the current operating context, or if an error handler is not specified for the current operating context, the error handler of a parent task map or operating context, or the error handle for the default operating context is used (if defined).

In one example embodiment, a user has rights to both child and adult content. If the user is operating within a branded (for adult content) title expressed right processing environment, the operating context specification for a piece of child content may require a change in context to a different operating context (either within the same title expressed right processing environment, in a different title expressed right processing environment, or in an operating context) before permitting the user interaction to continue.

An example task map is provided below:

```
<Taskmap>
<CarrierBilling_Confirm
        view="[TaskPath]Cart/CarrierBilling/CarrierBilling_Confirm.xml"
        confirm="[TaskPath]Cart/CarrierBilling/CarrierBilling_Confirm.xml"
        gsmNumber="[TaskPath]Cart/CarrierBilling/CarrierBilling_gsmNumber.xml"
        thankyou_actless="[TaskPath]Cart/CarrierBilling/CarrierBilling_ThankYou
        _actless.xml"
        thankyou="[TaskPath]Cart/CarrierBilling/CarrierBilling_ThankYou.xml"
        package="[TaskPath]Cart/Cart.swf"
        actless="[TaskPath]Cart/CarrierBilling/CarrierBilling_Confirm_actless.x
        ml"
        sprint_actless="[TaskPath]Cart/CarrierBilling/CarrierBilling_Confirm_ac
        tless_sprint.xml"
        sprint="[TaskPath]Cart/CarrierBilling/CarrierBilling_Confirm_sprint.xml
        " />
 - <!-- Mobile Input -->
```

```
<Input_Mobile
      package="[TaskPath]Cart/Cart.swf" />
   <GsmNumber
      view="[TaskPath]Cart/CarrierBilling/CarrierBilling_gsmNumber.xml"
      package="[TaskPath]Cart/Cart.swf" />
   <PhoneSelector
      package="[TaskPath]Cart/cart.swf"
      view="[TaskPath]Cart/PhoneSelector.xml" />
<MyStuff
      view="[TaskPath]/MyStuff/MyStuff.xml"
      package="[TaskPath]roots.swf" />
<QuickFlow
      package="[TaskPath]QuickFlow/QuickFlow.swf" />
      <WalletCreditCardAddress
         view="[TaskPath]Wallet/WalletCreditCardAddress.xml"
         package="[TaskPath]Wallet/wallet.swf"
         locals="[TaskPath]Wallet/AccountDetail" />
      <WalletCreditCard
         view="[TaskPath]Wallet/CreditCard.xml"
         package="[TaskPath]Wallet/wallet.swf"
         locals="[TaskPath]Wallet/CreditCard" />
      <WalletDelete_Confirm
         view="[TaskPath]Wallet/Delete_Confirm.xml"
         package="[TaskPath]Wallet/wallet.swf"
         locals="[TaskPath]Wallet/Delete_Confirm" />
      <WalletCash
         view="[TaskPath]Wallet/Cash.xml"
         package="[TaskPath]Wallet/wallet.swf"
         locals="[TaskPath]Wallet/Cash" />
      <WalletAddCash
         view="[TaskPath]Wallet/AddCash.xml"
         package="[TaskPath]Wallet/wallet.swf" locals="[TaskPath]Wallet/AddCash"
         />
</Taskmap>
```

6.4.2.1.2 Service Manager/Controller

According to various embodiments, a title processing system implements one or more components called a Controller and/or Service Manager. In some embodiments, the functions of a Service Manager and Controller may be implemented as a stand-alone service, as part of another component, as a loadable component, or as an external service. In some embodiments, a Service Manager and Controller may be implemented as separate components. Alternatively, they may be combined as a single component. A Service Manager and Controller is part of a TPE that manages the TPE's components and provides the interface and "glue" logic between at various title-enabled services. These interface and glue logic services may include parameter marshalling, ensuring specific services are loaded and running, and the like.

The service manager's functionality may be implemented as part of the TPE itself, or may be implemented as a plug-in, or as an external service within a TPE. A service manager supports, in conjunction with other components such as a context, application, and component loader (described below), the demand loading and unloading of components, including any verification and validation requirements. The service manager defines and controls the operation of the context, application, and component loader in accordance with defined method of managing services and components for a TPE. In some embodiments, the service manager functionality is contained within other TPE components. Optionally, a service manager coordinates with an underlying operating system component to ensure these functions are performed as required to enable a TPE.

A Controller interacts with other services, such as those described below, to facilitate the user and service interactions to implement the specified interface and service calls necessary for the specified execution within a TPE.

In more specific embodiments, a Controller is used to control flows, views, validation, and similar interface functions. In some embodiments, the controller component is used to transform data flows from one format to another so they may be used within an existing specification. Part of the Controller specification may define views, languages, and protocols for communicating between user interfaces and service components and between service components on behalf of a user interface. A view specification defines, in part, the layout, styles, user interface components, and the like to be used when displaying the output from a TPE, operating context, or external service. For example, when an output of one service is received, the controller may transform or change the format of the output to better fit within the display pane of a user interface to which it is mapped. Part of the definition may include a "form" definition, that optionally specifies how the elements of the "form" may be validated. In a first embodiment, a user interface component may perform direct validation of entry fields using the form specification rather than rely on the Controller or other services for validation. In some embodiments, a Controller specifies how the form and the form elements can be validated, for example, using a regular expression (e.g. regex) or indication of a remote service to be used (such as phone number validation, location validation, etc.). This capability provides improved response times to the user and offline operation capabilities. This can be accomplished using methods known to those having skill in the art.

In other embodiments, a Service Manager and Controller specifies, collects from the user or other location in the system, or otherwise manages the authentication and authorization information to be used when accessing specific services or components within a TPE. This can be accomplished using methods known to those having skill in the art.

6.4.2.1.3 Context, Application, and Component Loader

According to some embodiments, a context, application and component loader provides context, application and component loading services, including downloading services to retrieve remotely stored application components, validation and verification services that ensure a component has not been tampered with and is authorized to execute. Optionally, a context, application and component loader provides task management services to control and/or coordinate the execution of running components and applications components.

In some embodiments, each instance of a TPE may cause the demand-load and unload of portions of its contexts, applications, components and configurations on an as-needed basis. In other embodiments, an operating context loader component instantiates a complete TPE on the basis of a operating context specification, as outlined herein.

In some instances, portions of the TPE and of other architectures that the TPE relies upon, may be distributed to alternate systems or devices. Similarly, service requests may be mediated by a service router or service resolver and registry and directed to a local instance of a service provider, may be passed to a remote service instance, or a combination of both approaches may be performed. For example, a TPE may rely on an internal identity management component, may distribute the identity management component to another system, or may use a combination of both methods. Such TPEs can be provided using the techniques described herein and methods known to those having skill in the art.

In order to ensure the proper functioning of the processing environment, a TPE may perform validation and verification of demand-loaded and/or distributed components. Demand-loaded components are also referred to herein as plug-ins. In some cases, the validation and verification may be performed by the application loader itself using well-known cryptographic means such as crypto-hashes such as those generated by MD5, a checksum or CRC, or by using methods such as self-validating packaging such as Microsoft's CAB or Java's signed JAR files. In alternate embodiments, TPE components may be validated using SAML assertion(s) in accordance with SAML specifications. Such TPE implementations can be provided using the techniques described herein and methods known to those having skill in the art.

In other embodiments, the validation and verification functions may be performed by underlying operating system functions. For example, the validation and verification of signed applications is provided by the underlying task loader in the Windows XP and Windows CE operating systems, and in the Java runtime environment. The processing environment may be configured to rely on these services when executing upon these operating systems that provide this functionality.

6.4.2.1.4 Communications Manager

In some embodiments, a communications manager component of the TPE manages the communications between TPE components. This component is sometimes called a connection manager. Different communications managers may be provided to support different protocols, for example, a TPE may simultaneously support a first communications manager that supports the SOAP protocol, a second communications manager that supports an RPC over HTTP protocol, and yet a third communications manager that supports SHTTP. Each aspect of a communications manager is preferably implemented as discrete components, but may be implemented as one or more components in some implementations. The communications management component optionally includes the capability to orchestrate the completion of one or more services on behalf of the TPE.

Communications manager components may also utilize directory services by calling a Service Resolver and Registry component to resolve service locations and interface specifications.

In yet other embodiments, a communications manager component implements communications between the User interface and one or more TPE services. In some embodiments, the communications manager provides SOAP formatting, transmission, and retransmission services between the User interface and one or more services. Alternatively, a communications manager may provide XML-RPC, CORBA, or other remote procedure call services to a TPE. In some embodiments, a communications manager may provide more than one type of RPC service, and may either select the RPC format to use when communicating with a specific service, or translate between RPC formats in order to facilitate communications between services. These services may be provided on the same device as the communications manager, or may be provided on a different device.

In one embodiment, the communications manager component maintains connectivity and state for connections. An instance of a communications manager may communicate with more than one service at a time. Specifically, a communications manager may simultaneously manage the communication with multiple components, services, and TPEs, including maintaining simultaneous communication with similar or different versions of services hosted on different servers.

6.4.2.1.5 Identity Provider

In some cases, a TPE provides, or causes to be provided, an identity management service, sometimes called an identify provider. The identity management service may be implemented as part of the TPE itself, or may be implemented as a plug-in, or as an external service. An identity management service provides methods for validating components of the TPE architecture to ensure that they have not been tampered with and that their use is authorized within a specific instance of a title expressed right processing environment. Such TPE functions can be provided using the techniques described herein and methods known to those having skill in the art, and may include such methods as PKI, multi-party authentication, and related components. The identity management services may also used to validate and establish the identity of specific users of one or more TPEs.

The Identity Provider can comprise a title-based Identity Provider or an external third party Identity Provider service. A plurality of identity providers services may be supported within an instance of a TPE. The Identity Provider can be required as part of the particular implementation if a Service Router needs to authenticate itself to the Identity Provider and include a SAML Artifact in messages to the endpoints (where specified by the service definition).

In some embodiments, a local instance of an identity management component is also provided. It is useful to have a local identity management component as part of the User interface for deployments where the User interface is not able to maintain regular communication with an external identity verification and authentication service. The identity management component that may be embedded within a TPE, such as provided by an AV (or provided as another component) is typically used to validate components and operating context specifications. In one example embodiment, such an identity management component would cache and validate SAML assertions related to the validity of well defined components and specifications. The SAML assertions would be pre-stored in the cache for use when the TPE is not able to make an online connection to an identity verification source. The local instance of the identity management component may also be used to validate an initial or default operating context specification during TPE startup.

6.4.2.1.6 Title Resolver

According to a set of embodiments exemplified in FIG. 6, a title resolver (6100) provides title resolution services to a TPE (e.g. 4140 of FIG. 4). A title resolver comprises a state server (6120), one or more authentication providers (6130), optional CODEC modules (6140*a/b/c*), optional interfaces to content providing services (6150*a/b/c*), one or more interfaces to service resolvers and registries (6170), optional interfaces to external identity providers (6160), and other external service interfaces (6180*a/b/c*).

A Title Resolver module 6100 performs the task of resolving all title materials presented. In some embodiments, a title resolver may be used to resolve a reference to a specific title or right. In other cases, a title resolver is used to expand incomplete title materials using caches or stored copies of common, well known title materials. The use of a title resolver to expand title materials presented to it enables the reuse of common title materials. This reduces the size of individual titles at the expense of having to include those referenced materials at use time. In some embodiments, these common materials are called templates. In other embodiments, they are managed as items to be included at resolution time. One example of this technique is the expansion of title materials to include specific content from a content store upon presentation of a title. Other examples include expanding a title to include common definitions for classes of rights. This permits the use of an "included by reference" capability in titles, which in turn supports the substantive reduction of the size of title objects.

FIG. 7 is a flowchart which illustrates an example of a process for resolving title materials.

In step 7110, a title resolver verifies the integrity of any provided title materials. This ensures that all title materials provided have not be tampered with, damaged, or are unintentionally incomplete.

In step 7120, a title resolver identifies, locates, and obtains copies of any referenced title materials (recursive). In each of these cases, if a title material is referenced using a unique ID, the title resolver may recognize the unique ID and use that unique ID to look up the title material using a database of title materials, a directory service, a title manager, or a service registry. This may be recursively repeated until there are no title materials or content left to identify, locate, or obtain.

In step 7130, a title resolver validates all title materials to ensure authenticity and validity.

In step 7140, a title resolver validates aspects of operating contexts and the title materials, to ensure that provided title materials are valid for operating within the specified operating context. A title resolver further checks to see if there are conflicts or ambiguities in the specifications within an operating context or within a title structure, the Title Resolver is responsible for resolving the conflicts or ambiguities in a manner that permits the processing of the title to continue.

In step 7150, a title resolver ensures or authenticates ownership of the title.

In step 7160, a title resolver effects the decoding and decrypting any title elements that are encoded or encrypted.

In step 7170, a title resolver effects the retrieving of any content or resource(s) requested by a title.

In alternate embodiments, a Title Resolver may be responsible for executing and acting upon rules and triggers that are applicable to the title materials presented. In various embodiments, the functions of a Title Resolver may be implemented as a separate service, either as a loadable component, as an external service, or combined with other services and components.

An additional function of the Title Resolver may be to refresh old titles. For example, if information contained within a title became outdated, this information could be automatically refreshed either by replacing the title completely or by adding a new stub object that updates the information. A Title Resolver may invoke additional processes as required to process and update title materials (6110) such as the CODEC module (6140*a/b/c*), a state server module (6120), a content interface module (6150*a/b/c*), an authentication provider (6130), a service resolver and registry (6170), an identity provider (6160), or other external service (6180*a/b/c*) as required.

A state server module (6120) maintains and verifies state associated with the use of titles throughout the ecosystem. The state server may work in conjunction with the Title Resolver in order to verify the validity of the title and may generate new stub objects associated with the title on every redemption and exchange. The state server may be a high-capacity, high-availability, and high-performance system that can be widely distributed and chained in order to perform fast validation for titles in use. The state server may perform functions and algorithms associated with the chained hash, one-time password, and key-splitting techniques.

A content interface module (6150*a/b/c*) performs the tasks associated with retrieving specified content from a particular content store. This module may generally be invoked by a Title Resolver to resolve a reference to external content. The content interface module may be extensible to support a variety of content and resource systems in use by content publishers.

A CODEC module (6140*a/b/c*) performs coding and decoding functions on the content retrieved by the Title Resolver. The primary purpose of this module is to encapsulate content in a secure package as determined by the security required of the title and established by the rules. For example, this module can perform digital watermarking of music and image content, and it can also be used to encrypt the content in a traditional digital rights management package. Additionally, the CODEC can be used by the Title Resolver to decode contents within the title before processing by the Title Resolver. The CODEC may provide mechanisms to support these functions as required within the ecosystem.

As described in U.S. patent application Ser. No. 11/741,952 filed Apr. 30, 2007, now U.S. Pat. No. 9,621,372, issued Apr. 11, 2017, the entire disclosure of which is incorporated herein by reference for all purposes, titles can be validated using a title resolver and/or a state server, both of which are components of a title management system. FIG. 8A is a flow chart depicting an example of such a title validation process. The title is submitted by a client to a title resolver service for authentication (8110). The title resolver service examines the title's digital signature (8120). If the digital signature is incorrect, the title resolver service rejects the title and the title validation process terminates with an "invalid title" result. If the digital signature is correct (8130), the title resolver service forwards the title to the state server process for further validation (8140) of the state value in the title's stub. The state server process uses the state value or other indicia that are part of the title (8150), computes a value from these item(s), and compares it against a value stored in a database (8160). If the two values match (8170), the title is validated by the state server (8180). A "title valid" response is returned to the title resolver service (8190), which in turn returns a "title valid" response the client (8200). If the state server cannot validate the title, it returns a "title invalid" response and the validation process terminates. The above example is one method of validating titles; additional methods of validating title materials include digital signatures, comparison of transaction indicia to transaction databases, and other methods well known to those skilled in the art.

As described in U.S. Patent Publication US 2006-0036548 A1, entire disclosure of which is incorporated herein by reference for all purposes, titles can be validated using a title resolver and/or a state server, both of which are components of a title management system. FIG. 8B is a flowchart depicting an alternative title validation process. In one embodiment, the consumer device is used to communicate the redemption request to the title manager (8210). The title manager performs title processing (8215) and returns a title command to the consumer device (8220) redirecting the consumer to the content. The consumer device communicates the title directly to the content proxy (8225), which subsequently makes a request to a trusted title resolver (8230) in order to validate and authenticate the title. In this embodiment, the title resolver is a separate component. In another embodiment, the resolver functionality may be incorporated directly into the content proxy.

The title resolver both validates the title (by ensuring that rules are properly executed) and also authenticates the title. In one embodiment, in order to properly authenticate the title, the title resolver communicates the title object to the state server (8240). The state server subsequently authenticates the title object (8245) using an authentication technique specified by the title and supported by state server. The authentication process (8250) may further involve security indicia included with the title object. The endorsement process is responsible for placing the security indicia in the title object (8260). In one embodiment, the state server returns the authentication response to the title resolver along with updated security indicia for the title (8270). If the title is authentic and valid, the title resolver communicates the updated security indicia to the title manager and responds to the original request by content proxy (8280).

Upon successful authentication, content proxy permits the request through to content which is then returned to consumer device (8290). If the transaction should substantially fail, and consumer device cannot communicate with content, an error message may be returned. In one embodiment, the error message is substantially communicated to all participating parties to ensure an orderly rollback of the transaction, if needed 6.4.2.1.7 Service Resolver and Registry The Service Resolver and Registry is intended to be a general business and service registry that can be used by all title enabled components to lookup essential business and service definitions, title materials, and workflows. One or more service resolvers and registries may be configured within a TPE configuration. Each Service Resolver and Registry component may be used to support one or more Service Routers and other title enabled applications, and provides a common location from which all requests for contexts, applications, title materials, and related services may be resolved. A Service Resolver and Registry further provides services to a TPE, TPE applications, and other title-enabled systems to assist in resolving one or more services referenced from title materials or processing workflows. Depending upon desired functionality, the resolver and registry portions of a Service Resolver and Registry component may be configured as separate modules. Alternatively, they may be configured in conjunction with each other (as presented herein), or as part of other components.

An authorized user may use a title publisher application to publish service and alias definitions to a Service Resolver and Registry. The publishing process is described below. Alternatively, a Service Resolver and Registry can also be configured using any other means known to those skilled in the art. Well known title materials, including templates, well known titles, and related materials also may be published to a Service Resolver and Registry in order to make them available to a TPE. In addition, service definitions used by specific rights may be published to a Service Resolver and Registry.

A Service Definition stored in the Service Resolver and Registry may be stored as title materials and can include common service specifications, such as those defined using UDDI data structures/elements. In other embodiments, due to the complexity involved in standard protocols such as UDDI, a simpler structure may be encapsulated in a title. In still other embodiments, a Service Resolver and Registry component uses service lookup techniques, including external service directories such as those provided by well known mechanisms such as UDDI and LDAP, service registries, and service lookup mechanisms provided by distributed component systems such as COM/DCOM and CORBA. The Service Resolver and Registry, in some additional embodiments, can be a service that simply accepts an ID for a service and returns a title object associated with the ID. The ID is a unique ID for the title object. For XML representations of a title, this is also called the document ID.

In a first embodiment, a Service Resolver and Registry requires the requesting application to know what record ID is being queried, and will only support lookups for service definitions (such as used by a Service Router). The Service Resolver and Registry will return the Title specified by the record identifier. The returned title contains the service definition or another service ID, which is the further resolved until an actual service definition is obtained. In an alternate embodiment, a Service Resolver and Registry supports lookups for arbitrary titles, including titles that define workflows and related title processing elements. In yet another alternate embodiment, a Service Resolver and Registry provides lookup services to well known title materials, such as templates, contexts, and templated subsets of rights. In still another alternate embodiment, a Service Resolver and Registry provides an alias lookup service, by which aliases for well known items are resolved to actual entries. Aliases are useful in that they permit the renaming of historical title materials and services without requiring regenerating of all titles that reference the title materials or services.

Basic and Advanced search features are available for service lookups performed by the Service Resolver and Registry. These features include lookup by ID, and structured queries using well known structured query mechanisms.

A user or application may query the Service Resolver and Registry by sending a message containing the query. A service lookup to the Service Resolver and Registry returns the service definition. In some embodiments, only Service Definitions are supported and the Service Resolver and Registry will only allow lookup requests for Service Definitions. In some embodiments, this query is structured as a SOAP request. In other embodiments, it may be an LDAP query or a database query. An example SOAP message for a Service Resolver and Registry Lookup request is shown below and includes both a LookupType and a RecordId element:

```
<soap-env:Envelope xmlns:soap-env="http://schemas.xmlsoap.org/soap/envelope/">
<soap-env:Header/>
<soap-env:Body>
<TtsRequest xmlns="http://aplaud.com/ns/0.1/tts/protocol">
<LookupType>http://daxweb.org/ns/1.0/service</LookupType>
<RecordId>a080847000001001b3eb63400000091</RecordId>
</TtsRequest>
</soap-env:Body>
</soap-env:Envelope>
```

The LookupType element indicates the type of definition being queried and can be specified as an XML namespace. Examples of namespaces includes :http://daxweb.org/ns/1.0/service for services, http://daxweb.org/ns/1.0/service/ota for OTA application definitions, and http://daxweb.org/ns/1.0/service/cdn for content delivery network definitions.

The RecordId element contains a unique identifier for the service definition being queried. This is the Document ID of the corresponding title object stored in the service registry.

The response to this example query from the Service Resolver and Registry is a SOAP message containing a copy of a title object that was loaded into the Service Resolver and Registry using a title publisher.

6.4.2.1.8 Service Router

According to a set of embodiments, a Service Router provides the function of a network-based aggregator and choreographer of service requests providing a single point for distributed applications to call. A Service Router simplifies the distributed application services by limiting the number of services that are available and reachable to a specific user at any given time. A Service Router can be deployed as part of a TPE configuration, as a stand-alone component on a network, as part of a network appliance or device (such as the network devices described above), or can be shared between multiple TPEs.

A Service Router provides a means by which a specific service, TPE, or TPE client communicates with one or more services. In some embodiments of the invention, a Service Router functions as more than a dispatch or broker service. In these embodiments although on the surface a Service Router can appear to have the same traits as other middleware tools, it goes far beyond these tools and defines the rights-based commerce approach to routing, coordinating, and integrating services. The rights-based commerce approach to service dispatch applies rights to the invocation of every service and the manner in which the service invocation is coordinated to form an activity. In these embodiments, a Service Router brokers the connections, gateways the connections, and applies the rules associated with each connection including going to the extent of handling the commerce obligations for each discrete service. In a more specific embodiment of the invention, protocol messages are sent to and from the Service Routers provided herein which in turn broker the many disparate services used to complete transactions, manage workflow, satisfy contract requirements, and implement additional value-add.

In another embodiment, a Service Router functions as a proxy service for title-enabled services. When operating as a proxy service, a Service Router provides a single point for authentication and authorization services associated with titles, as well as providing service redirection services. In a first use, a Service Router can isolate the authentication and authorization steps of ensuring that the title itself is valid and is provided in accordance with any specified requirements (e.g., on input data, on user credentials) before passing the title to an endpoint service. Alternatively, a Service Router can invoke one or more rights defined in the title. Further alternative embodiments can have a Service Router use the title to locate additional information provided externally from the user or the title itself, and use the title in conjunction with that additional information to invoke the network service or application desired.

Also when used as a proxy service, a Service Router is advantageous to blocking forged or otherwise invalid titles and for eliminating non-authenticated traffic from a network service. In this manner, a Service Router can act as a title-enabled firewall. When coupled with the network device capabilities described above, a title-enabled firewall network device can be constructed that limits the network traffic that crosses the firewall to authorized and authenticated network traffic.

In an alternative use as a proxy, a Service Router can redirect specific network service calls presented to it to a different network service. In this example use, a Service Router can redirect a service request from to an alternate service host on the basis of a table lookup, directory service lookup, a load balancing algorithm, or other network service. A Service Router accepts the service request, looks up the service request in a local or remote table, in a directory service, uses the result of an output of an alternative network service such as runtime, or applies a load-balancing algorithm to determine the network destination of the service. Alternatively, a Service Router can invoke one or more rights specified in a title to determine the routing of a specific service request.

In some embodiments, Service Routers are interconnect gateways that understand and apply rights-based commerce rules. Coordination of the various services is a flexible and powerful feature of a Service Router and is advantageous in that it is a simpler approach to Web services coordination than incorporating a full-fledged BPEL4WS engine (and grammar).

A Service Router provides a mechanism by which external third party services can easily and securely participate in a rights-based commerce network. In some embodiments, a Service Router provides a title-enablement front end to non-service enabled network applications and services. In this example user, a Service Router authorizes and authenticates the title-based request and calls a network-based service or application described in association with one or more rights defined in the title without passing the title to this service. An example of this type of use was given above in association with the ruptime call, in which an external service is called by the Service Router during the processing of a service request. Alternatively, a Service Router can use the title to access a profile that contains authentication materials to be used in conjunction with network services and devices.

In other embodiments, a Service Router is a generic handler for formatting and routing service requests to and from service endpoints. In some embodiments, a Service Router preferably sends synchronous Web service requests to service endpoints. The use of Web-based protocols is merely an example, and the protocol used can change as required on an implementation-required basis. In some embodiments, the SOAP over HTTP protocol is supported by a Service Router. Other protocols can be implemented by those skilled in the art.

In some embodiments, a plurality of Service Routers can operate together (e.g. clustered) to form a "virtual" service, in which any of the cooperating Service Routers can accept a message and process it. In other embodiments, Service Routers can be operated in "proxy" mode to inspect and then route each message to a subsidiary Service Router.

In still other example embodiments, a Service Router functions as an abstraction layer between a TPE and external Web services; and the Service Router serves as a coordinator for the services. In an example of such an embodiment, a Service Router is a simple abstraction layer that defines the interaction with TPE components and establishes a baseline for services, service descriptions, and service adapters. Other embodiments model service contracts described in titles, and provide enhanced services such as coordination. An embodiment used depends upon the implementation requirements.

In these embodiments, a request received by a Service Router can be directed to a plurality of network services or network applications, either in serial, parallel, or in combination, and the result of one or more of these requests is used to formulate the request to the requestor. Service Routers also can be implemented in-line to the traffic, as service endpoints, or as filters. In some embodiments of the invention, a Service Router can process message traffic inline by intercepting or proxying message traffic. In these embodiments, a Service Router receives a message, inspects its content, optionally processes the message in accordance with one or more specifications, and then optionally forwards the message to the same or different recipient. In one embodiment, a Service Router can implement a workflow that intercepts message traffic from a cell phone, inspect the content for the presence of rights managed content, replace said rights-managed content with a title-based offer for the rights-managed content, and forward the altered message to its intended recipient. Readers skilled in the art understand how a Service Router operating in this manner is valuable to limit the distribution of rights-managed content without locking the content to specific devices.

A Service Router can take many forms that include embedding in network switches, routers, gateways, and firewalls. Each of the embodiments of title enabled network devices described above can be implemented using inline code, or they can be implemented using a Service Router embedded within a network device.

A component schematic and Service Router interactions in accordance with one embodiment of the invention are depicted in FIG. 9. In this figure, the DCE component (9010) refers to any extant TPE, or a DCE, TTS, or AV component that can invoke a service call that can be fulfilled by a Service Router. These components can include DCE components such as Lockbox and Title Manager services, an AV Viewer, or any TPE that can interact with either a DCE or AV environment. Example external services are presented by the top set of boxes, labeled OTA service (9020), DRM service (9030), and Other Service (9040). These external services are destination services for requests processed by the Service Router (9100) and its components. Other services may also be referenced by a Service Router, including, for example, specific adapters, identity, title transaction, title managers, TTS, DCE, TPE, and the like.

6.4.2.1.8.1 Authentication and Authorization of the Service Router

Some embodiments described below assume that the Service Router has been validated and is authorized to provide the service routing function. Service router authentication and authorization is orthogonal to the functionality of the Service Router itself. The authentication and authorization steps described below apply equally to all implementations of a Service Router, and the authentication and authorization steps listed below can be performed by the Service Router before commencing operation, at any step of the example flow processes described herein, or can be performed during provisioning of a Service Router and preconfigured into the Service Router configuration.

In some embodiments, the Service Router verifies its own identity and authorizations with an identity provider by authenticating to the identity provider and obtaining proof of identity and optionally authorizations from that identity provider. The step of authenticating the Service Router can be performed in-line with the transaction when needed, or it can be performed as a precursor operation before the Service Router begins processing requests. An example of this type of authentication, performed in-line with the transaction as a precursor to processing the transaction, is shown in FIG. 10 as "2: Authenticate". The authentication and authorization mechanism can be performed at any step for which an authorization or authentication can be required. Alternatively, the authentication and authorization steps can be performed as a precursor to processing a transaction. In other embodiments, the authentication can be performed, at least in part, using cryptographic means, such as a cryptographic hash such as MD5, a digital signature, public/private key pair, digital certificate, or other means well known to those skilled in the art. Particularly, in some embodiments, a cryptographic hash or digital signature is used to validate the Service Router executable as part of the authorization and authentication process. In other embodiments, a challenge/response mechanism can be used.

In some embodiments, authorization and authentication can be provided using a SAML artifact from the identity provider to the Service Router itself is provided by the identity provider. In other embodiments, a SAML artifact is provided by the original requester, and the Service Router can either validate the artifact provided to it or can act as a proxy, with request authorizations and authentications being validated at the service endpoint. In non-SOAP/SAML embodiments, the request authentication is performed using techniques appropriate to the authentication technique described above. Thus, the Identify Provider is not required to support SOAP/SAML, but can support other authentication methods and techniques in addition to or in place of SOAP/SAML. If a Service Router fails to authenticate itself, it can continue processing but will not be able to invoke any endpoint requiring authentication or authorization of the Service Router.

6.4.2.1.8.2 Basic Process Flow

A basic process flow for a Service Router component is illustrated in FIG. 10. A client component sends a request (flow 1 of FIG. 10) to a Service Router. The client can be part of a TPE, a TPE application such as a DCE or TTS, AV, another Service Router, or other application component making a request to the Service Router. In some embodiments, the request is provided as a SOAP message. In other embodiments, alternate request message encoding can be used without loss of generality.

The request to a Service Router preferably includes authentication materials. In the example SOAP-based implementation, the authentication materials can take the form of a SAML artifact included in a SOAP Header and are used by the Service Router and/or endpoint to authenticate the request. Other message encoding and transport mechanisms can encode digital signatures in the request, or can establish a secure session using a challenge/response mechanism.

The request can specify at least one right to be processed by the Service Router. Each right can reference a title, service, or other title-enabled process capable of processing the request. If more than one right is specified, a processing order for rights can also be specified.

The rights specification parameters, if specified, identify an "action" to be performed by the service endpoint. If no rights specification parameters are provided, a default action can be identified, either explicitly or implicitly. The request generally contains sufficient information about at least one right, at least one Title, and the desired transaction information (part of request context) to support validation and fulfillment of the request. For example, a purchase transaction can include payment information suitable for use during message processing of the request at an endpoint. In some embodiments, a tf:Title element is sent in the request, in other embodiments, a tf:Title element and an authenticator stub is provided as part of the request.

A Service Router request can comprise the following optional elements either embodied within, or referenced by, the request message:

Right—A "right" element indicates to a Service Router the right being redeemed in a Title. A Service Router will interpret the contents of the specified right to retrieve the Service Resolver and Registry-based service identifier.

Title—At least one Title object is passed or referenced as the Title object contains information necessary for the Service Router to process the request. In XML-based embodiments, this is referenced as an instance of a tf:Title element.

RequestContext—The RequestContext element will contain additional information, as required, in order to invoke the endpoint. For example, at the end of a purchase process, the context in which the title is being redeemed is communicated with a Service Router. This contextual information is used by the Adapter to create the desired message(s) required to complete the transaction(s) at the specified endpoint(s). In another example, the user might be required to provide additional information at the point of redemption and this information is passed as part of the RequestContext. The format and structure of the RequestContext will vary depending upon the type of service endpoint the request is being sent to. In some embodiments, the RequestContext element is omitted as the context of the request is not relevant or available from other sources.

The Endpoint specification. For example, the request can specify the endpoint to be used. The endpoint specification can also specify additional elements to be returned by the endpoint to identify the request to the originator. For example, these parameters can be passed to an OTA service that is required to return them in any response. Examples of these types of elements can include:

TransactionId—A transaction ID used for tracking the transaction or for support.

Message—A user friendly message that is displayed to the user or included in the Active Voucher.

An example SOAP-XML embodiment of Service Router request fragment is shown below.

```
<soap-env:Envelope xmlns:soap-env="http://schemas.xmlsoap.org/soap/envelope/">
    <soap-env:Header/>
    <soap-env:Body>
        <tf:TitleDocument>
            <tf:Title id="title_id" xmlnsrtf="http://aplaud.com/ns/0.1/tts/format">
                <![CDATA[... title detail ...]]>
            </tf:Title>
            <tf:Stub type="protocol">
                <Binding type="method|">
                    <Title/>
                    <Method/>
                </Binding>
                <Message>
                    <![CDATA[... payload detail ...]]>
                </Message>
            </tf:Stub>
        </tf:TitleDocument>
    </soap-env:Body>
</soap-env:Envelope>
```

The diagram provides a sample of a SOAP message that is sent to a Service Router. Key points in this example are:

The TitleDocument element is a standard encapsulation of a Title object and will contain all data to be sent to a Service Router.

The Title continues to be sent to a Service Router and expresses the rights as well as the standard meta-data to be used by a Service Router.

The Stub element is new to the protocol but is a standard extension mechanism employed by Titles. In some embodiments, the Stub is used to contain the originating message (i.e. payload) sent by the requesting party.

The Stub uses a Binding element to indicate how it is bound to a Title (or set of Titles). In this example the Stub is bound directly to a Title and Right.

The Message element contains the payload.

Once a request has been received, there are several optional verifications that can take place.

The Service Router optionally verifies (flow 2 of FIG. 10) the authorization materials provided with the request. This verification can occur in several ways. In a SOAP/SAML embodiment, the Service Router passes the SAML artifact provided with the request to an identity provider for verification. The identity provider can be part of the Service Router, or can be separately instanced. The Identity provider validates the SAML artifact, and either authenticates the request(or), or fails the authentication by sending a failure message. In the SOAP/SAML embodiment, the failure indication can be returned using a SOAP fault message. Alternatively, other messages or messaging protocols can be used.

In some embodiments, the Identity Provider is acting as the trust authority for all DCE interactions and can be used to authenticate and authorize both the service provider and the sending client. Optionally, the service provider can be configured to not verify SAML artifacts. This option permits any component to call a Service Router, even if its not part of the DCE trust hierarchy.

There optionally can be an implicit trust established between a Service Router and the DCE components based upon the validity and authenticity of a title passed within a request. This implicit trust model can be implemented for simplicity when the deployed architecture permits. An assumption for this implementation decision is that the DCE is operated in a secure ASP environment (i.e. not federated), and that the Identity Provider is the trust authority for the transaction based on authentication (not authorization).

In some embodiments, a Service Router will not require authentication of the calling application or its request. This permits backwards compatibility with older versions of DCE implementations and helps ensure that all DCE components can call a Service Router. A Service Router is, in these embodiments, an unsecured service within the DCE and should not be exposed outside the firewall. In other embodiments, a Service Router can require authentication of the calling applications, using any of the support means known to those skilled in the art.

After the authorization materials are validated by the Identity Provider, a Service Router examines the redemption right being invoked, obtains the address of one or more Service Resolver and Registry components in which to look up the request, and well as the Service Identifier to be looked for. The service registry can be a Service Registry component, an external registry, part of the Service Router, or another service that provides services of a registry. In some embodiments, the service resolver and registry address can be defined within the Service Router, within the title, or can be defined within another service resolver and registry known to the Service Router.

A Service Router preferably uses service definitions stored in the service resolver and registry. The definitions include identification of parent and child services, whereby the parent service is described by the current definition and the child services are described in other service definitions. Child services are identified in the parent service definition and is tagged appropriately for processing. In some embodiments, the service definition is defined using a right specification embodied in a title. In other embodiments, a service definition in one or more industry standard formats can be used. For example, a UDDI registry can serve as a service registry. Alternatively, other directory services such as LDAP or Active Directory can act as a service registry.

The Service Router then performs a lookup (step 3 of FIG. 10) of the service identifier in the selected service resolver and registry. The registry and service ID provide sufficient information for a Service Router to look up the service definition in the service registry. In one embodiment, a service definition comprises at least one of:

A name, ID, and/or description of the destination service endpoint,

A description of the protocol used to communicate with the service endpoint,

A location or identity of a adapter for messages sent to the service endpoint,

A location or identity of a adapter for message received from the service endpoint, A location or identity of the component used to communicate between the Service Router and the service endpoint.

Parameters to the adapter. In some embodiments, this can take the form of a WSDL that defines the Web service data types, messages, operations, ports, and other attributes of the interface.

In some embodiments, each of the elements included in a service definition can include a URI or URL that describes a protocol, endpoint location, parameters, and other information required. In other embodiments, the element definitions can be defined using discrete fields. Additional information can be included in the service definition for use by different releases of the Service Router. In some embodiments, the service definition can also comprise some security indicia that can be used to verify the integrity of an adapter or endpoint, for example, a cryptographic hash value or other mechanisms for authentication and authorization as described above.

It will be appreciated by those having ordinary skill in the art that this step of the process provides a layer of abstraction between a Service Router and each endpoint implementation. It will be appreciated further by those having ordinary skill in the art that if a service endpoint name changes for any reason, then the definition need only change in the service resolver and registry and all issued Titles that use the changed endpoint can remain unchanged.

Using the service definition, a Service Router then obtains the identity of an adapter to be used in order to structure the request to the endpoint, optionally validates the adapter, and then invokes the adapter (step 4 of FIG. 10). An adapter, if specified, is used to transform the original request to a Service Router into a message in an appropriate format for use by the specified endpoint. This transform process can include data checks, calculations, replacements, configurations, and formatting changes to the original message, and can involve rewriting the original message to a new format or structure.

In some embodiments, the Service Router obtains information about the adapter from a service resolver and registry. In alternative embodiments, a Title returned from the service resolver and registry can contain a reference to the adapter(s) to be used to implement the service call. In other alternative embodiments, a NULL adapter can be specified. If security indicia for the adapter are available, the Service Router can optionally check the indicia and the adapter to ensure the integrity of the adapter. Adapters can be hard coded as stand-alone program executables, as scripts such as in embodiments where the protocol used is XML-based, be structured as XSLT stylesheets. SOAP-based embodiments can advantageously use an XSLT-based adapter to transform the message format.

The Service Router can have an independent trust relationship with a service endpoint, or the trust relationship is maintained between the request originator and the service endpoint. The Service Router can define an error handler to handle authentication, authorization, and service failures of an endpoint, and can define alternative service endpoints to process the request, or define the manner in which failure information is returned to the request originator. In some embodiments, the Service Router can have a plurality of failure handlers that provide different failure handling semantics.

In some embodiments, the Service Router caches adapter definitions and associations of adapters to endpoints. This improves performance (but can require an application reload if the adapters are changed). In more specific embodiments, the service owner can create adapters for each service endpoint that can called by a plurality of Service Routers. Each adapter also can be shared between a plurality of endpoints.

While there is generally an adapter specified for each endpoint, the use of an adapter is not required in embodiments where the initial message is already in the correct format for use by the service endpoint. In these embodiments, the initial message can be used without transformation. In other embodiments, distinct adapters are created for the Request and another, distinct, adapter created for processing the response from the endpoint to the Service Router.

This second type of adapter is called a Response Adapter, and is used to transform the response from the endpoint into a format understood by a Service Router. Alternatively, the same adapter can be used to process requests as is used to process responses. In some embodiments of the invention, Adapters transform a request message into the form required by the destination endpoint. This can involve at least one of a translation of format, structure, and transmission protocol, and can additionally require obtaining or creating new or additional security indicia to support the new format, structure, and transmission protocols. The format translation is represented as flow 5 in FIG. 10.

In some embodiments, the adapter can translate an original request message to a new message format using the SOAP format. The Service Router then sends the adapter translated message to a specified service endpoint using the adapter-provided message transport (flow 6 in FIG. 10). The sent message can optionally comprise a plurality of messages, and can further comprise additional elements including security indicia from the original message and/or the security indicia of at least one of the request originator, service resolver and registry, adapter, and/or other services associated with processing the sent message. Alternatively, the security indicia used can be provided from an alternative source such as a service resolver and registry. Which security indicia to use is configurable when the service router is configured.

It is assumed in this embodiment that some form of authentication is required in order to invoke the remote endpoint. The authentication can a simple username and password passed in a SOAP Header, as sophisticated and mutually authenticated SSL connections along with system identifiers and keys, a SAML artifact, or can be based upon other authentication technologies. Alternatively, the authentication can be based upon the sending Service Router component's ID, or other information. In other embodiments, no authentication is required and the authentication materials are omitted.

The endpoint processes the request (step 7 of FIG. 10) and returns a response (step 8 of FIG. 10) to the Service Router. In some embodiments, the response message is optionally processed by a Service Router using an optionally specified response adapter. The response adapter is functionally similar to the adapter described above, and is managed by the Service Router in the same manner as other adapters.

In some embodiments, the response adapter executes the post-processing logic (step 9 of FIG. 10) including data checks, calculations, replacements and formatting. The final objective of the response adapter is to generate a response message (step 10 of FIG. 10) to a Service Router that is consistent with all messages returned by a Service Router to client applications. The Service Router then processes the response and returns it to the client (step 11 of FIG. 10). In some cases, SOAP Fault messages are returned. This can occur when the original request was in SOAP format, and one or more processing steps were not successful. In some alternate embodiments, the response includes the storage of the Fault messages in the Active Voucher that was used to invoke the remote endpoint. In these cases, the fault message can comprise one or more of the elements related to the transactions, such as:

Transaction ID
User Message
Status
Last Updated Date/Time
Initiation Date/Time

In some embodiments, a response from the endpoint (or Service Router) is subsequently transformed into a message block that is used to update Active Vouchers or inform other server-side process. The response is a standard response from a Service Router and will include at least one message block that contains user friendly information about the status of the request and/or the results of the request. This serves the purpose of the original Download ID that was received from Mobile Streams and entered in the Active Voucher. The message block and other response details is placed in a content tf:Stub element attached to the Active Voucher. In some embodiments, other information can be placed in the tf:Stub element and attached to the Active Voucher.

The response from the Service Router is, in some embodiments, a standard DCE status along with a message block that can be processed by a DCE application. A DCE application can update the Title with the contents of the message block. For example, if an OTA service request was made, the response can include a transaction identifier. In this case, the transaction identifier can be placed in the resulting Title (e.g. users Active Voucher) for tracking purposes.

An example response fragment from an XML formatted message is shown below:

```
<xs:element name="TtsResponse" type="xs:anyType">
    <xs:complexType>
        <xs:sequence>
<xs:element name="TransactionId" type="xs:NMTOKEN" minOccurs="0" />
<xs:element name="TransactionIdLabel" type="xs:token" minOccurs="0" />
<xs:element name="Message" type="xs:string" />
<xs:element name="Method" type="xs:token" />
<xs:element name="TimeInitiated" type="xs:dateTime" />
<xs:element name="TimeCompleted" type="xs:dateTime" />
</xs:sequence>
```

```
        </xs:complexType>
      </xs:element>
      <xs:element name="System" type="tp:systemType" />
      <xs:element name="User" type="tp:userType" />
<xs:element name="Status" type="tp:statusType" />
    </xs:schema>
  </wsdl:types>
  <wsdl:message name="ServiceRouterRequest">
    <wsdl:part name="TtsRequest" element="tp:TtsRequest" />
  </wsdl:message>
  <wsdl:message name="ServiceRouterResponse">
    <wsdl:part name="TtsResponse" element="tp:TtsResponse" />
  </wsdl:message>
  <wsdl:message name="TtsSystem">
    <wsdl:part name="System" element="tp:System" />
    <wsdl:part name="User" element="tp:User" />
  </wsdl:message>
  <wsdl:message name="TtsStatus">
    <wsdl:part name="Status" element="tp:Status" />
  </wsdl:message>
  <wsdl:portType name="ServiceRouter_PortType">
    <wsdl:operation name="ServiceRouter">
      <wsdl:input message="tp:ServiceRouterRequest" />
      <wsdl:output message="tp:ServiceRouterResponse" />
    </wsdl:operation>
  </wsdl:portType>
  <wsdl:binding name="ServiceRouter_Binding" type="tp:ServiceRouter_PortType">
    <soap:binding style="document" transport="http://schemas.xmlsoap.org/soap/http" />
    <wsdl:operation name="ServiceRouter" >
      <soap:operation soapAction="ServiceRouter" />
      <wsdl:input>
        <soap:header message="tp:TtsSystem" part="System" use="literal" wsdl:required="false" />
        <soap:header message="tp:TtsSystem" part="User" use="literal" wsdl:required="false" />
        <soap:body encodingStyle="http://schemas.xmlsoap.org/soap/encoding/" use="literal" />
      </wsdl:input>
      <wsdl:output>
        <soap:header message="tp:TtsStatus" part="Status" use="literal" />
        <soap:body encodingStyle="http://schemas.xmlsoap.org/soap/encoding/" use="literal" />
      </wsdl:output>
    </wsdl:operation>
  </wsdl:binding>
  <wsdl:service name="ServiceRouter">
    <wsdl:port name="ServiceRouter_Port" binding="tp:ServiceRouter_Binding">
      <soap:address location="https://builder.navio.com/tts/service/ServiceRouter" />
    </wsdl:port>
    <wsdl:port name="NonSecureServiceRouter_Port" binding="tp:ServiceRouter_Binding">
      <soap:address location="http://builder.navio.com/tts/service/ServiceRouter" />
    </wsdl:port>
  </wsdl:service>
</wsdl:definitions>
```

In some embodiments, a plurality of responses can be processed by the Service Router in response to a single request message. It will be appreciated by the reader how a plurality of response messages can be processed using the scheme described above.

6.4.2.1.8.3 Multiple Services

The previous embodiment illustrated the basic flow supported by a Service Router. In such embodiments, the adapters are responsible for sending and receiving, and the flows can easily be extended to support more complex flows as well as coordinated activities. FIG. 11 depicts a slightly more complex flow for an alternative embodiment of the invention:

Flows (1) thru (9) proceed as described above for FIG. 10. After receiving the response back from a first endpoint and processing it (step 9 of FIG. 10 and FIG. 11), the Service Router or adapter can make additional calls to other endpoints. In this example, no additional adapters were selected, and the message(s) are forwarded from the Service Router/adapter to a second endpoint (step 10 of FIG. 11), where they are processed (step 11 of FIG. 11), and returned to the Service Router/adapter (step 12 of FIG. 11). In some embodiments, a pre-processing step is inserted between steps 9 and 10 of FIG. 11 in a manner consistent with step 5 of FIG. 11.

Processing continues with a post-processing step 13, an adapter response (step 14), and a response to the client (step 15). These steps are analogous to steps 9, 10, and 11 of FIG. 10.

It should be noted that the Service Router itself can make the further calls to additional endpoints after the response is received from the first adapter.

In each case, the decision as to which message(s) to send to the next processing step is made, at least in part, on the basis of the service definition contained within at least one of a request, title, service resolver and registry, or Service Router.

6.4.2.1.8.4 Cascading Services

Cascading services are a still more complex variation of a Service Router flows, and can be used to coordinate complex activities while abstracting the complexity into two or more "compartmentalized services". One embodiment of the invention using such Cascading Services is illustrated in FIG. 12. In FIG. 12, a Service Router is being called by itself. This can be a recursive call, or can be a call to invoke another service that is abstracted by a Service Router. In this particular example, the second Service Router involved in the activity is a completely separate instance operating in a distributed and federated environment. In other embodiments, the second Service Router is the same instance as the first Service Router.

Flows (1) thru (9) proceed as described above for FIG. 10. After receiving the response back from a first endpoint and processing it (step 9 of FIG. 10), the Service Router or adapter can make additional calls to other endpoints. In this example, no additional adapters were selected, and the message(s) are forwarded from the Service Router/adapter to a second endpoint (step 10 of FIG. 12). The second endpoint is, in this example, another Service Router, which processes the request as described in FIGS. 10 and 11, with a response being returned in step 18 of FIG. 12. In some embodiments, a pre-processing step is inserted between steps 9 and 10 of FIG. 12 in a manner consistent with step 5 of FIG. 11. Processing continues with a post-processing step 20 of FIG. 12, an adapter response (step 21), and a response to the client (step 22). These steps are analogous to steps 9, 10, and 11 of FIG. 10

In a more detailed embodiment the logic expressed either in the requesting Title, in the Service Definition, or a combination of the two is as follows. A Service Router makes calls to other Service Routers in order to complete an activity. Each service implemented and handled by a Service Router instance can be equally complex and can rely on subsequent cascading calls. At a high-level each Service Router instance encapsulates the processing logic for an activity and ultimately abstracts the complexity away from upstream implementations. In the simplest embodiment, someone who is deploying a new activity need only know what services to call and in what sequence and not how each service is implemented.

6.4.2.1.8.5 Adapters as Service Endpoints

In some embodiments, the adapter is used as the service endpoint rather than the adapter being used to invoke a remote endpoint. This is illustrated in FIG. 13. There, the adapter simply performs some processing logic in lieu of transforming the message and forwarding it to an external service. For example, the adapter can be used for information services such as delivering pretty-print versions of the Terms of Use or Privacy Policy statements.

6.4.2.1.8.6 Provisioning a Service Router

A Service Router may be provisioned as any other trusted service. The following steps can be used to provision a Service Router:

1. Setup an account for a Service Router. Since a Service Router uses an Identity Provider for authenticating itself to remote endpoints, a Service Router must first authenticate to a Identity Provider 2. Register an account for a Service Router using the Active Viewer or the Merchant Registration form. In some embodiments, this account is no different than any other account in the system. Other embodiments can distinguish "system" or "application" accounts from other accounts in the Identity Provider.

If no account is setup, or the configuration is wrong, a Service Router will still function but it will not be able to authenticate itself to endpoints that depend on the SAML Artifact and the Identity Provider.

3. Configure a Service Router's configuration materials. In some embodiments, these are stored in the web.xml file.

Configurations of each Service Router are implementation dependent. The following parameters are generally configured:

maxRetries—Used only when the remote endpoint supports SAML Artifact authentication. This parameter determines the maximum number of times a Service Router will retry a login to the Identity Provider and a subsequent endpoint request. The relogin attempt is done everytime the SAML Artifact (or session) expires. The default is 2.

createStubUrl—Specifies the URL endpoint for the Create Stub service. This is generally the CreateRecordStub servlet on the Title Manager.

identityProvider—Specifies the URL for the Identity Provider Login service where a Service Router can log itself into the system.

serviceAccount—Specifies the username (i.e. email address) for a Service Router account on the Identity Provider.

servicePassword—Specifies the password for a Service Router account on the Identity Provider.

A Service Router can interact with an external Web service if Adapters for that service are available. In some embodiments, these adapters are developed ahead of time and are defined in a Service Definition in the Service Resolver and Registry. In order embodiments, adapters can be dynamically generated. For example, an adapter reference can be to a Service Router or other Web service that generates the correct adapter on demand. This can be accomplished by a XSLT used to generate another XSLT based on logic embedded in the XSLT and information being passed in the source document.

In an embodiment using SOAP messaging, the Adapters (both Request and Response) are XSLT stylesheets that format the request to the endpoint, and format the response from the endpoint.

1. Create a Request Adapter as part of the DCE build. The Request Adapter must expect the initial request to a Service Router (SOAP Envelope) as the source document. A Service Router request generally comprises a tf:Title element containing the Title being redeemed and the Right element indicating what right is being redeemed. Optionally, the requesting application can provide a RequestContext element that contains request specific information that will vary from request to request. The adapters can use this information if it is anticipated/known ahead of time. As an example, the RequestContext element can contain purchase information if the Title is being redeemed as part of a purchase. The Request Adapter must handle authentication requirements for the external endpoint. If a username and password is required, then the adapter builds the correct elements in the SOAP Envelope to authenticate the request. For example, the adapter places the authenticating material in a SOAP Header. The exception to this is when the external service uses the DCE Identity Provider for authentication. In some embodiments, a Service Router automatically embeds a SAML Artifact in the SOAP Header. Adapters can also use extension mechanisms to make processing calls to external applications. For example, an adapter can be configured to call a java class/method of an external application. Other types of external calls can be similarly supported by an adapter.

2. Create a Response Adapter using the example provided as part of the DCE build. The Response Adapter takes the response from the endpoint and puts it into a normalized form for the DCE to understand and process. The response from the endpoint is handled by the requesting application.

Both the Request and Response Adapters must conform to the standards and guidelines established for these stylesheets, otherwise an error can occur and the stylesheets can be rejected by the system.

3. Once the Request and Response Adapters are created, they must be located in a repository accessible by the DCE.

4. A Service Router makes use of the Service Resolver and Registry service for looking up external Web services and retrieving service definitions. The Service Resolver and Registry entries must be setup prior to using a Service Router. To setup the Service Resolver and Registry entry or entries follow the steps outlined in the Service Resolver and Registry section. When the Service Resolver and Registry has been setup with the correct Service Definition, make note of the service definition (name, alias, or Document ID) that was assigned the service.

5. Ensure that all Titles that need to use a Service Router have the correct entries in their redemption rights. For example, Polyphonic Ringtone Products need to reference the correct Service Router URL and include a reference to the Service Definition (e.g. Document ID, service definition name, or service alias). In one embodiment, the following steps are used to setup the Titles:

Edit an existing, or create a new mapping template that is used for the title publisher batch load process. The mapping template will ensure that the published titles are constructed properly. A sample mapping template includes global variables for the RegistryUrl, ServiceDefinition, ServiceType and OnBuyMethod. These global variables refer to information that must be included in the Title and are used by the mapping template to create the 'issue' right of the Product. The 'issue' right is responsible for creating all Active Vouchers.

The ServiceRouterEndpoint points to the publicly available URL for a Service Router as this is used by client applications in order to invoke a remote service (for example, a redeliver). The URL will generally follow this pattern: http://builder.navio.com/tts/servlet/service/Router-Client.

The ServiceDefinition is the Document ID, service definition name, or service name alias from the service Product Title as indicated in the previous Service Resolver and Registry step.

The ServiceType is the type of service that this refers to and is also obtained from the Service Resolver and Registry. In XML-based embodiments, a service type is defined using a namespace. Examples of service type namespaces are provided above.

The OnBuyMethod variable is used to indicate what redemption right should be invoked when a purchase is complete. The Lockbox application will automatically invoke this right after a successful transaction. As an example, for ringtones, the OnBuyMethod should be 'redeliver'.

The mapping template also has a reference to the OnBuyComplete logic sheet. This logic sheet is used by the Lockbox at the end of the buy process to determine what should be executed and how it should be executed. An example of a default logic sheet is an XSL script.

With the mapping template complete, the Products are loaded using the title publisher or are updated with a modified mapping template. Ensure that every merchant that intends to use a Service Router with their titles has access to the mapping template.

Modify the Merchant Pass for the merchant and add access to the mapping template edited or created above. A Service Router approach can require additional setup and configuration but it is more extensible than the previous right of creating custom logic sheets for each type of Title, or action for each type of Title. There is preferably only one logic sheet shared by all Titles and the control logic is handled by adapters. Additionally, service definitions are used to indicate what endpoint needs to be invoked and what adapters need to be used. Since Titles refer to a service definition and not directly to a logic sheet, the merchant can easily change the definition in the Service Resolver and Registry and have the changes automatically propagated throughout the network. With the registry approach, there is no need to modify Titles that are in circulation, including Products and Offers. This feature provides an extensible and flexible environment by placing more control in the merchants and/or operators hands. If a service signature changes, or the service parameters are enhanced, or a new operator becomes involved, the definition in the registry is used to effect the change.

6.4.2.1.8.7 Adapters

As described above, Adapters can be hard coded or can be implemented as scripted transforms. The following embodiment details an XML-based description of an adapter transform. The base adapter framework imports descriptions of this type to manage the transformation and sending of messages. The base adapter XSLT(s) imported by the adapters can support a "send message" functionality and various message types such as SOAP, POST, GET, HTTP/XML, SMTP, etc.

As an example, the following basic SendMessage function supports sending SOAP messages directly from a Request Adapter:

```
<!--
    This template will build and send a ProcessMessage and return a nodeset.
    For this template to work correctly, the endpoint must return XML.   Note,
    since this template uses XALAN Java extension, it will only work on an
    Xalan processor.
    The Header and Footer passed to this template must be a String and not a
    node-set.
-->
<xsl:template name="SendMessage">
    <xsl:param name="endpoint" select="''"/>
    <xsl:param name="action" select="''"/>
    <xsl:param name="header" select="''"/>
    <xsl:param name="body" select="''"/>
    <xsl:variable name="message">
        <Message>
            <Endpoint type="url" method="post">
                <xsl:value-of select="$endpoint"/>
            </Endpoint>
```

```
            <SOAPAction>
                <xsl:value-of select="$action"/>
            </SOAPAction>
            <Body>
                <soap-env:Envelope xmlns:soap-env="http://schemas.xmlsoap.org/soap/envelope/">
                    <soap-env:Header>
                        <xsl:copy-of select="$header"/>
                    </soap-env:Header>
                    <soap-env:Body>
                        <xsl:copy-of select="$body"/>
                    </soap-env:Body>
                </soap-env:Envelope>
            </Body>
        </Message>
    </xsl:variable>
    <xsl:copy-of select="svc:sendDocumentMessage($message)"/>
</xsl:template>
```

As indicated in the example, a Xalan Java extension (svc:sendDocumentMessage($message)) is used to send the SOAP message and this particular example only supports SOAP calls. The Java call that is made is to a Service Router Utility method that calls the DCE's ProcessMessage class to handle and send the message. This basic capability must be extended to support the other ProcessMessage types (e.g. POST, GET, and SMTP) and to provide a cleaner integration with Xalan. Furthermore, the "send message" capability needs to be isolated from other base templates as it will have different implementations depending on the XSLT processor used (such as Datapower XS40 or Saxon).

A sample RouterTemplate.xsl stylesheet is provided to demonstrate the message building capabilities required by the base templates. This is for example purposes only and does not depict how the template should be written or implemented.

6.4.2.1.9 User Interfaces

A TPE may provide one or more instances of user interface (UI) applications and components. In some embodiments, the UI components are the application interface, such as the interface provided by a title-enabled merchant system or other title enabled application. In these cases, the user interface is provided by the application, and may be constructed using traditional user interface techniques such as web, thin client, or thick client interfaces.

In other embodiments, a TPE exposes titles to users and requires a title-specific user interface to be exposed. Two examples of TPE components, a "title helper" and an "Active Viewer" application, provide user interface components in various embodiments. A Title Helper provides a web-based interface for title-enabled applications that do not otherwise have a TPE interface, and provides an interface between the title-enabled applications and a TPE. An Active Viewer (AV) provides a distributed TPE and integrated user interface.

A user interface may be invoked in several ways. In a first embodiment, the user interface is invoked by the user when they select a user interface-enabled indicator on a web site or as part of an advertising banner. In other embodiments, the User interface may be invoked when the user selects an application link that identifies an instance of a user interface to be run. Alternatively, a user interface may be directly called by an external applications program or web site, or may be started based upon recognition of specific received content. Examples of the latter may include starting the User interface on the basis of a file type association, MIME type, or upon receipt and recognition of a title, upon receipt an out-of-band communications media such as e-mail or instant messaging containing a title. Another example is distribution of content on a network such as P2P in a format that can be recognized and invoked by client applications such as P2P applications. These files are distributed in a format recognized by the application. When opened, the application displays the contents, at least in part using User interface. Alternatively, the User interface may be invoked at device startup and may be always running. In implementations where User interface functionality is embedded in other applications or operating system components, the User interface and its components may be directly called by the applications (such as a media player licensing interface) or by operating system components within which the User interface is embedded. For example, a user interface may be invoked by the Microsoft Media Player license acquisition page. Alternatively, the User interface may be involved by a file browser such as Windows Explorer. Such User interfaces can be provided using the techniques described herein and methods known to those having skill in the art.

In some embodiments, a TPE's user interface may be integrated with web sites and accessed from computing devices using standard Internet protocols including HTTP, HTTPS, and WAP. In some embodiments, the User interface may be launched from an existing web site by naming the User interface in a link, or by naming a user interface operating context in a link (which loads the user interface by association), by specifying it using a scripting language such as JavaScript, or by other means well known to those skilled in the art.

In some embodiments, a Title Helper or Active Viewer may be partially deployed as a web browser plug-in that scans web pages and other content sources as they are loaded, watching for links that name a user interface, an operating context, or title. If an appropriate link is detected, the web browser plug-in rewrites the web page on the fly, adding the necessary scripting language (such as Javascript) to the web page to display the Title Helper or Active Viewer indicator shown in the accompanying screen shots. The Title Helper or Active User interface indicator provides a visual indication to the user that a page is title aware.

In one embodiment, the user interface is provisioned with a list of web sites from which it is authorized to be launched. The user interface may, depending upon configuration, choose to not launch, launch in "insecure mode" (e.g. the trust indicator is not set), or may display a popup window indicating that the user interface is being inappropriately launched. In one example embodiment, a user interface may require a title to launch, said title may alternatively specify a operating context to be used.

In other implementation strategies, a Title Helper or Active Viewer may respond to content being downloaded. This content is often identified by content meta-data, such as file type, file extension, and MIME extensions. The Title Helper, Active Viewer, browser, operating system, or other component may monitor downloaded content and start a user interface when content that matches a specific content type is downloaded. For example, the user interface may be started when a MIME type that identifies a title is downloaded. Alternatively, the user interface may be started when a file with a specific file extension is downloaded. Furthermore, MIME encoding may additionally describe one of: a user interface operating context associated with the downloaded content, a user interface title name associated with the downloaded content, or a mime-type that is used to identify content that may be managed using a Title Helper or Active Viewer. Some examples of the above-mentioned MIME-encoding techniques are provided below:

| | |
|---|---|
| X--Operating context: | 1234567890 |
| X--Title: | http://location-goes-here |
| X--Title: | (body of title follows here) |
| X--Protected: | (an example of a MIME flag) |
| Content type: | X-navio/X--subtype |

It should be understood by those skilled in the art that the names and values of the MIME entries may be configured as part of the implementation without affecting the scope of disclosure. The above examples describe responding to a wake-up message may be equally applied to SMS, IM, or other messaging protocols on other computing devices such as desktop computers. The above examples of monitoring downloaded content for MIME information may be applied equally well to any situation in which MIME-specified content is available, including file downloads from the Internet.

Another example of invocation is the invocation of a right to contact customer support via an online chat. In this case, the right allows the user to invoke the contact right and runs a supporting plug-in that provides a chat interface with the user. A title provides the underlying right for contacting customer support, and specifies a operating context that specifies the look and feel of a chat or IM system. Alternatively, the operating context may specify using a customer preference for chat or IM application.

6.4.2.1.10 Title Helper

The user's experience in effecting transactions on the Internet may be greatly enhanced by the Title Helper of the present invention which integrates seamlessly with title-enabled sites, e.g., e-commerce sites, and provides a consistent interface for all transactions with which the user is comfortable. According to one subset of functionality, the Title Helper provides a window into a user's rights portfolio (i.e., collection of titles) which may be stored remotely on one or more servers (e.g., at a title-based transaction site as described herein). As discussed elsewhere herein, the rights portfolio may actually include one or more portfolios which may be viewed individually or as a single portfolio. The Title Helper allows the user to manage, collect, trade, transfer, redeem, group, and share the titles in the portfolio.

A simple yet powerful user interface to the title manager, referred to herein as the Title Helper, is shown in FIG. 14 as an independent overlay window on the user's machine. The Title Helper is a service application which acts on behalf of the user in the electronic realm to effect title-based transactions. In facilitating such transactions, the Title Helper is operable to act as a proxy for the user to varying degrees. The Title Helper represents the user on the Web, becoming active when invoked by the user (or by a title-enabled site with which the user is interacting) to facilitate title-based transactions. When invoked, the Title Helper manages and controls access to the digital assets (in the form of titles) in the user's rights portfolio. It makes the terms of a proposed transaction visible to the user, and ensures that the parties to the transaction adhere to those terms. This capability is particularly valuable in view of the fact that the typical consumer on the Web is largely unaware of the underlying terms or the transfer of information associated with the many transactions in which they routinely take part.

In some embodiments, the Title Helper goes beyond proxying only the transactions on pages configured to use the Title Helper and adds additional functionality allowing it to act as a 'trust shield.' According to more specific embodiments, a trust shield functions to filter the web page a user is viewing, recognizing the purchasing page and html and javascript on the page, and reinterpreting it on behalf of the user. Thus a user would be 'shielded' from a web site that did not in any way specifically invoke the Title Helper. The Title Helper would act as a proxy to purchase on behalf of the user, and debit his account in any of a variety of ways such as, for example, from a credit card, or from digital cash or coupons.

In another example, the Title Helper can analyze and interpret web services that are referenced on a page and that can be invoked by the user. For instance, the Title Helper can recognize form elements and form submissions. In this case, the Title Helper can retrieve definitions for the web service including interface definitions and information to choreograph a transaction with the web service. The Title Helper can be used to invoke these services on behalf of the user. Web services can be defined and placed on a registry for discovery or can be interpreted by the DCE which the Title Helper communicates with directly. According to various embodiments, the Title Helper is operable to act as a privacy shield such that the user does not need to reveal their identity to the party or site with which they are transacting.

The interface on which the Title Helper is superimposed or overlaid may be a Web page generated by a conventional Web browser application. The following description assumes such an approach for illustrative purposes. However, it should be understood that the underlying interface may be generated by any of a variety of programs without departing from the scope of the invention. For example, the functionality of the Title Helper may be effected on a small device such as a credit card or ATM reader which is typically used to authenticate a user and drive a purchase via their credit card. The user would typically enter their user name and password on the device, a magnetic card, fingerprint reader or RFID, etc. and then various aspects of the web based functionality would be accessible via the device.

Referring now to FIG. 14, Title Helper interface 1401 has two states, dormant 1403 and active 1404. In the dormant state, Title Helper is almost entirely hidden with only a minimal amount of information displayed to indicate its presence, thus not interfering with the content on the web page 1402. When a predetermined event happens (e.g., the user browses a title-enabled merchant site), or the user affirmatively invokes the Title Helper (e.g., with a key stroke or by placing a pointer device over the dormant Title Helper), the Title Helper becomes active. In the active mode the Title Helper expands itself to a large enough area that it can display any relevant information, while still only obscuring a small part of the underlying application interface, e.g., a browser interface.

In this case the user never completely leaves their originating environment and transactional context is always maintained. This is a unique value proposition of the dormant and active states of the Title Helper since the user remains on the originating site. The user can resume exactly where they left off when the transaction completes and they are always visibly reassured. The merchant is also provided with an opportunity to present to the user additional information on the web page that can reassure them about the site they have visited and that transactional integrity will be maintained.

According to various embodiments, the Title Helper is a lightweight engine (e.g., an overlay, plug-in, or virus application) for processing titles on behalf of applications which are not themselves title-enabled. According to a specific embodiment, the Title Helper comprises a Macromedia Flash application. The Title Helper can integrate relatively easily with applications which are not operable by themselves to conduct transactions using titles, thereby enabling such applications to enjoy the advantages of title-based transactions with little or no alteration of the code of the underlying application. In some cases, and depending upon the degree of coupling between the two, the underlying application may not be aware of the existence of the title helper. In general, the title helper is a mechanism which allows any site or application to become title-enabled.

For example, the Title Helper could work in conjunction with an individual's Web site and a title-based architecture as described herein to enable the individual's site to engage in commercial transactions without having to incorporate sophisticated commercial capabilities into the site. In another example, the Title Helper could work with a digital music player to enable the user to browse, select, sample, and pay for music tracks. The range of applications and utility of the Title Helper allows the user to readily enjoy the security and efficiency of engaging in title-based transactions for virtually all their online transactions.

According to various embodiments, the Title Helper may be employed to facilitate virtually any application becoming title-enabled, and may have various degrees of coupling with the underlying application. For example, the Title Helper may be a tightly-coupled software module which is integrated directly into the code of the application. Alternatively, the Title Helper may be a plug-in which is more loosely coupled with the application, taking advantage of, for example, available exposed interfaces of the application.

According to other alternatives, the Title Helper may be very loosely coupled with the application. For example, hyperlinks associated with an application can be redirected to URLs associated with the Title Helper which may be stored locally or located on a remote device. Such a hyperlink might be a "buy" link which a user would select when he wants to purchase digital content. The link might then redirect the user's browser to a $3^{rd}$ party title-based architecture which transparently facilitates the transaction using titles. The $3^{rd}$ party site serves up the Title Helper interface which then appears on the user's screen to facilitate the transaction using, for example, payment or wallet functions as described herein. Those of skill in the art will appreciate that the degree and nature of coupling and the functionalities provided may vary considerably without departing from the scope of the invention.

Regardless of the degree of coupling and according to various embodiments, the Title Helper may facilitate many of the functionalities described elsewhere herein. For example, the Title Helper may facilitate payment and wallet functions, and title management functions (i.e., the intelligent presentation and management of titles). Specific Title Helper capabilities which enable the capture of user input (e.g., PIN entry and data entry) allow user information to be protected from the merchant or more importantly to explicitly define the type of information required by the merchant for the transaction to complete. For example, the Title Helper can accept a PIN obtained through a physical retail transaction to convey value during an online transaction. Additionally, the Title Helper can present a form detailing the information required by the merchant such as mobile information.

The Title Helper is also operable to facilitate synchronization between titles and data associated with any underlying application which the titles represent. For example, the Title Helper can facilitate transfer of titles to/from local devices for offline storage or for transport via external mechanisms. In this case, the Title Helper acts as a secure intermediary process between the DCE and the local machine, allowing transfer of titles to a local device such as a hard drive, secure flash drive, mobile device, or other device. Optionally, the Title Helper can print the titles to provide a hard copy version.

The Title Helper may also facilitate other functions relating to online transactions such as, for example, shopping cart functions, escrow control functions, privacy functions, etc. According to some embodiments, the container and plug-in capabilities of the Title Helper provides an operating platform for functionality that can be plugged in dynamically and during runtime. This allows the Title Helper to be extended and offer new functionality. For example, a video component can be added to the Title Helper for training and instruction, while an interactive audio-video component can be plugged in to allow transactions to occur over other channels and media.

According to specific embodiments, the Title Helper provides a single view and interface for a user's federated identity, where their profile information is spread among many parties. In this case, titles are used to refer to and grant rights to identity information stored and managed by the other parties. The Title Helper provides an interface to present the identity information, as well as use the information during a transaction. The Title Helper may also be an effective tool for provisioning or coordinating provisioning services. In this case, the Title Helper can be used to provision new accounts or new services that are required as part of, or in conjunction with the transaction. For example, if a Web site only accepts payment in euros, the Title Helper may employ a currency exchange service or mechanism to effect a translation between the user's funds in U.S. dollars (as represented by titles) and the currency required by the site. This may be effected with or without interaction by the user and does not require that the underlying site be a title-enabled site.

As mentioned above, the code for the Title Helper may reside in a variety of places. For example, the Title Helper may reside on the user's machine and be associated with or integrated to some degree with the user's Web browser. Alternatively, the Title Helper may be served up by a title transaction site, e.g., the site hosting the user's rights portfolio. Still another alternative involves the Title Helper being served up by the specific title-enabled site with which the user is transacting.

According to some embodiments, the integration of the Title Helper with a title-enabled e-commerce site is facilitated by a "shopping cart" functionality in the Title Helper. This functionality allows the user to collect offers for goods or services at, for example, an e-commerce site. Each offer is a title which represents the right to buy the corresponding goods or services. The shopping cart functionality of the Title Helper allows the user to see these titles representing the offers and the terms of each. Thus, the Title Helper provides a window on the terms of a proposed transaction, as well as the necessary functionalities to facilitate the transaction. This aspect of the Title Helper also removes the shopping cart functionality from the control of the merchant site to the control of the user.

As will be understood, the presentation of the actual terms of a proposed transaction to the user is beneficial to both the user and his transaction partners in a number of respects. For example, as mentioned above, it is relatively common for a consumer to be unaware of the actual terms of transactions in which they routinely engage on the Web. There is an inordinate (and oftentimes unjustified) amount of trust placed by consumers that the parties with whom they transact are, in fact, who they say they are, and are actually abiding by the terms they are proposing. Because the actual terms of the deal are made explicit by technology not under control of the other parties to the transaction, the user is able to make informed decisions about whether to proceed with particular transactions. Similarly, because the Title Helper provides the ability to monitor and control what titles are transferred during the course of a transaction, satisfaction of the actual terms of the transaction can be verified.

Because the Title Helper can contain a variety of monetary instruments, it can also translate between them and thus facilitate a purchase even if the merchant site does not accept the monetary instruments the user has at their disposal. If a user has, for example, digital cash, but the site does not specifically accept that cash, the AV might translate the user's cash into a credit on some other monetary instrument that is accepted by the merchant and thus make the transaction. Furthermore, since in some embodiments, for example the 'Trust Shield,' the Title Helper can act so as to proxy the entire purchase process, acting completely on behalf of the user such that the user's anonymity is maintained.

As discussed elsewhere herein, transactions involving the exchange of titles between or among multiple parties may be effected using a title-based escrow process, e.g., the digital lockbox into which each party to the transaction transfers titles to a lockbox to facilitate consummation of the transaction. According to some implementations, verification the contents of a lockbox may be achieved manually, i.e., by each party viewing the contents to the lockbox.

According to some embodiments, additional escrow guarantees can be expressed through the Title Helper. These may come at an additional cost (e.g., incurred by the merchant or passed through to the consumer). If the escrow is providing a higher degree of guarantee, this can be communicated by the Title Helper and interaction between consumer and escrow facilitated.

According to one such embodiment and as mentioned above, a site which is not by itself title enabled may become titled enabled quickly and easily with some relatively simple mechanisms. For example, an html link to a remote title transaction infrastructure such as those described herein may be embedded in one or more of the Web pages on the site. These links are directed to the Title Helper and cause the Title Helper to be displayed in the browsers of users navigating the site. In addition, offer titles, e.g., in the form of XML documents, may also be embedded in the pages of the site. These offer titles may be created by the site operator with reference to the appropriate specification, or may be created using a title creation/publishing mechanism hosted elsewhere, e.g., at the remote title transaction infrastructure. The Title Helper, as a web browser plug in, can act to fill in the information on behalf of the user with an Title Helper account which is, in turn, 'fed' by the user's stored titles.

In another embodiment, a title-enabled proxy server can be inserted between the user and the site which adds the code to the originating site's markup language (typically HTML) necessary to launch the Title Helper and may modify specific merchant specific purchasing associated mark up language.

In another embodiment the Title Helper can interpret the page of a participating merchant, and act upon user actions to purchase content. In this example, the Title Helper understands the actions the user takes, such as a click on a buy link on the page, and adds the item to the shopping cart. The Title Helper communicates the action to the DCE which in turn analyzes the action according to preset site context established by the participating merchant. The DCE can directly interpret the action or communicate with the merchant to understand the action. In this case, the action results in a generic offer being generated for the purchase action. The generic offer is a title that accepts purchase information, such as content name, price, and terms, at the time of purchase. The information is verified by the DCE and applied to the generic offer. The use of generic offers allows participating merchants to easily work with the Title Helper and escrow process without re-tooling their merchant sites and storefronts. Non-participating merchant transactions can also be accomplished with this mechanism and the level of transaction integrity and guarantee can be independently verified by the DCE operator and/or by a third party.

6.4.2.1.11 Active Viewer

An Active Viewer is a TPE application that provides a distributed TPE and user interface components. Its functionality follows that of a title helper. The Active Viewer extends the functionality of a Title Helper by enforcing TPE context semantics on the user interface. This enables a trusted user interface called an Active User Interface, in addition to local execution of one or more TPE components.

The Active User interface provide user interfaces for defined TPE applications and may additionally have third-party applications defined, either within the Active User interface or by use of an operating context specification and may link to these applications when so directed by a user. The linking and subsequent execution of these applications may be a title expressed right event, and be subject to a rights specification within a title object. An Active Viewer may be used to provide a TPE to enforce title-based access control to specific services and to mediate access to these services upon the basis of rights specified in one or more titles.

In an example embodiment, a merchant who has a right to run a user interface-Reporting service to generate a report of title-based usage of their electronic property may be provided this option upon the basis of a specific title or voucher they possess. The title object may identify the specific service, or may identify a specific TPE that includes the specified service. The user may specify the report they desire by making a service request within the specified TPE. In the specific example, the user would click a button linked to a "Report" service provided by a user interface-Reporting server associated with a specific DCE. The user's rights as defined in the title may be used to further define the rights over the report content itself.

Alternatively, a specific title or operating context specification may specify specific third party applications, such as a music player, chat, IM, or VoIP service that should be executed when a specific right has been selected.

In some wireless and mobile environments, an Active Viewer may be associated with a "wake-up" or other notification message. As one skilled in the art will recognize, wireless mobile environments may deliver a message to a mobile device as a "wake up" notification. These messages may be delivered using any of SMS or other messaging systems common to the wireless and mobile devices. The wake-up notification may include additional information, such as a specification for an application to respond to the notification using, a URI of a service to connect to, a operating context specification, and other information. The mobile device, upon receipt of the notification message, wakes up and uses a device specific application to connect to a network service in response to the notification. In an example embodiment, the mobile device may use a device-specific application, or an application specified in the wake-up message, to respond to the "wake up" message. In a particular example embodiment, the application used to respond to a wake-up message is the Active User interface. In an alterative example embodiment, the wake-up message may specify the Active User interface as the application to respond to the wake-up message.

In alternate embodiments, the 'wake-up' message may include a operating context specification, either embedded within the URI, or as an additional data element included in the message.

One method of implementing a plurality of wake-up message responders is described above, where the wake-up message specifies the desired responder. In other possible implementations, the device itself may make the wake-up responder determination. For example, the device may provide a selection mechanism in which the wake-up message responder application is determined upon the basis of at least one of: the sender of the wake-up message, at least some of the contents of the wake-up message, and device or user preferences stored in a profile in the device. Parameters to wake-up message responder application may be provided from the sender of the wake-up message, at least some of the contents of the wake-up message, and device or user preferences stored in a profile in the device. These parameters may include a operating context specification, a title, or other User interface recognized information.

An example implementation might include a device that starts an Active Viewer to respond to a wake-up request from a specific sender or group of senders. Alternate implementation examples include recognizing a specific URI, or part of a URI in the wake-up message and making the selection of a desired user interface on that basis. A part of a URI might include a operating context specification in the address specification or in the URL parameters, as illustrated below:

https://mysite.com/first-operating context-reference/web-service.asp?my-operating context-name In a further illustrative example, the identification of URI or sender information may be made on the basis of information stored in the device (e.g. a list of known trusted sites).

In various embodiments, the Active user interface manages at least one display pane that is used by the Active Viewer component, a TPE, its associated components, and external services to display service options to a user and to collect and process input from the user. A display pane is a unique portion of a display, including a window or portion of a window, used as part of an input-output operation supporting the interaction between a user and a component of a title expressed right processing environment. A screen of a display, a popup window, a slide-out or drawer display portion, and an application-defined form are all examples of a display pane. A display pane may be uniquely associated with a specific application, component, or service or it may be shared between one or more applications, components, or services. In one example implementation, the Active user interface may implement a display pane that provides an XForms compliant display. In other example implementations, other display technologies such as SMIL or XAML may be implemented as panes. Alternatively, the Active user interface may provide display panes that respond to a plurality of display technologies, and may provide a plurality of display panes that respond to one or more disparate display technologies. Such Active user interfaces can be provided using the techniques described herein and methods known to those having skill in the art.

6.4.2.1.11.1 Operating Contexts and the Active User Interface

The set of resources required and/or desired to provide an aspect of a specific title expressed right processing environment, including but not limited to services, directories, components, applications, display panes, and user interface is called an operating context of the User interface architecture. A operating context is an alternate embodiment of a subset of the elements named by an operating context and describes at least one aspect of an operating context, and names, describes, references, or includes services, directories, applications, components, and user interface components required to provide the desired operating context and user interface.

The operating context that the Active user interface should use for a specific title expressed right processing environment or operating context may be defined by the Active User interface configuration, by embedded operating context, by the location from which the Active User interface is invoked, or by a title requesting User interface services.

One or more operating contexts may be simultaneously referenced by and/or used by an Active User Interface. A user interface that references a operating context may locate and load a operating context in a variety of ways. First, it may have a well-known storage location from which it loads a operating context. For example, a user interface may load a operating context from a local disk or memory store, an external disk or memory store, including an external repository site, or the User interface may look up the location of a operating context using a directory service, and then obtain a operating context either from the directory service, or from a third party source by using information provided by the directory service. Operating contexts that are loaded from locations external to a user interface where they may be subject to tampering may be optionally verified and validated using techniques similar to those described above for verifying and validating User interface title expressed right processing environment components.

In some embodiments, a plurality of operating contexts may be loaded and simultaneously operate within a Active User interface, each used to define a disparate title expressed right processing environment. In other embodiments, the User interface operates on a single operating context at a time. A single operating context may be used to define a specific operating context, or a plurality of operating contexts may be combined to define an operating context. The User interface optionally may have a default operating context associated with it. If such a default operating context is specified, the User interface uses the specified default operating context in the absence of other operating context specifications.

An operating context may be specifically associated with a collection of services that comprise at least part of a title expressed right processing environment. A specific operating context may be associated with a specific service, a TPE, a TPE applications like the Digital Commerce Engine (DCE), a specific DCE component, or with an external service. The association between a specific service or services and a specific operating context may be made on the basis of a configuration specification, a service specification, specified by the service, or based upon the information returned from an external service. One example of such an external service that may provide information describing a required operating context is an identity provider. The Active User interface, and attendant operating context specifications, defines the binding between backend services, UI and customer-facing application components, and binds these services and components with a specific look-and-feel. This binding facilitates a unified and homogonous user experience.

6.4.2.1.11.2 UI Specifications

An operating context specification of the view portion of a UI specification comprises one or more optional properties. Each optional property describes an attribute of the operating context, such as an identifier, a version, a unique name, a rights specification, a localization specification, and a unique location reference such as a URL. Some or all of these properties may be present in a specific instance of a operating context. A operating context may also reference one or more additional operating contexts in order to specify additional portions of a title expressed right processing environment. Alternatively, the operating context may specify one or more name aliases. In some embodiments, a operating context may specify a property that provides for the cryptographic authentication of the operating context itself. Such a property may comprise a cryptographic hash or digest, such as those produced by well known algorithms such as MD5, or may embody a SAML artifact, or a reference to a service that can provide the authentication materials.

Each operating context optionally comprises specification of, reference to a view specification, or reference to a hierarchical definition that taken together, comprise the specification for one or more views. Each view specification optionally specifies at least one style sheet to use, at least one skins definition, an optional task map, including the optional specification of at least one component to be loaded, and optionally defines permitted process flows. Additional materials related to user interface specifications, including views, skins, style sheets, and class maps are described in U.S. patent application Ser. No. 11/645,139 incorporated herein by reference above.

6.4.2.1.11.3 Display Panes

In a preferred embodiment, the User interface provides one or more display resources, called panes, to application components. In one embodiment, a pane may comprise a window in a windowing operating system. In an alternate embodiment, a pane may be part of a screen, or may comprise a drawing area of a larger window.

Figure 15A:
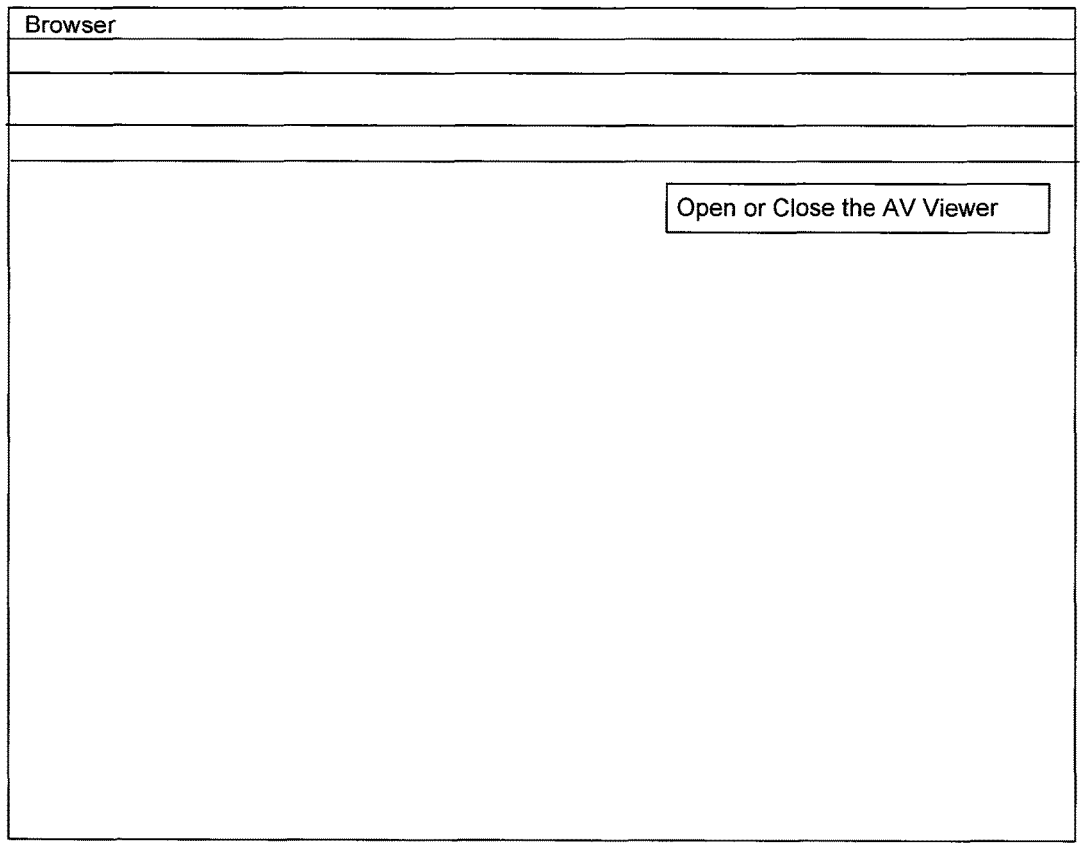
Figure 15B:
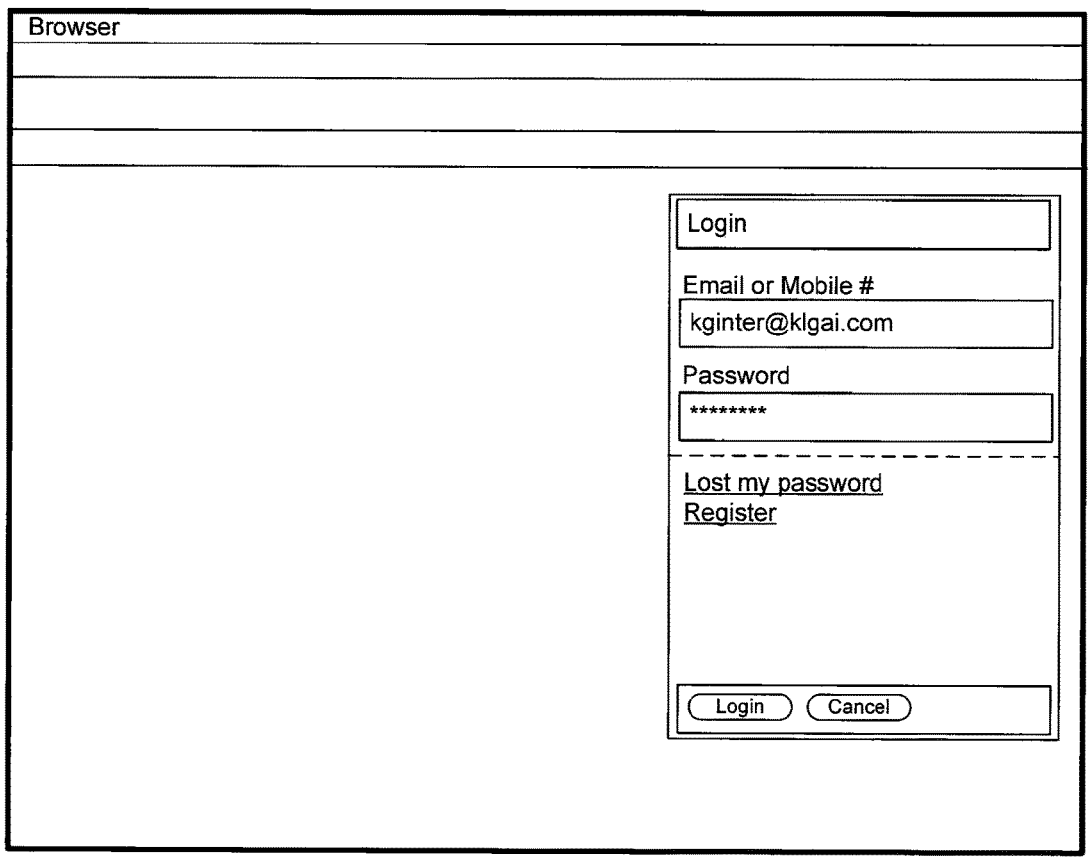
Figure 15C:
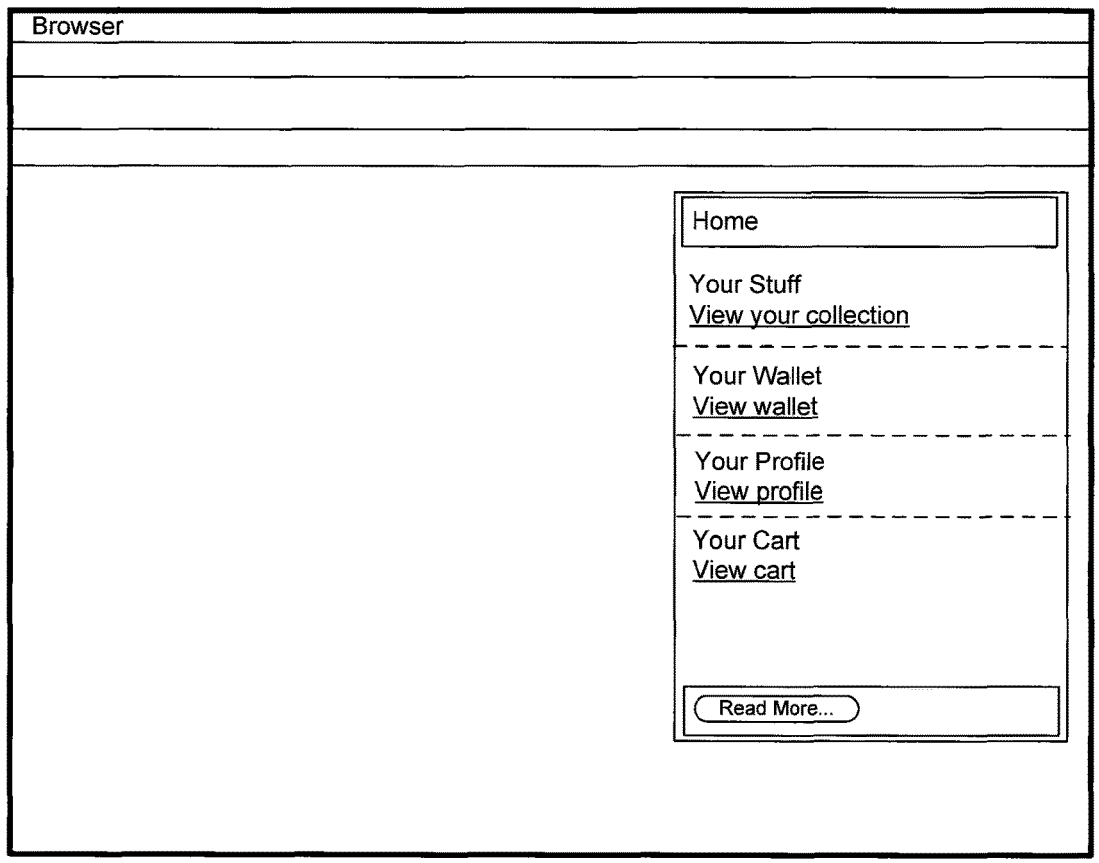
Figure 15D:
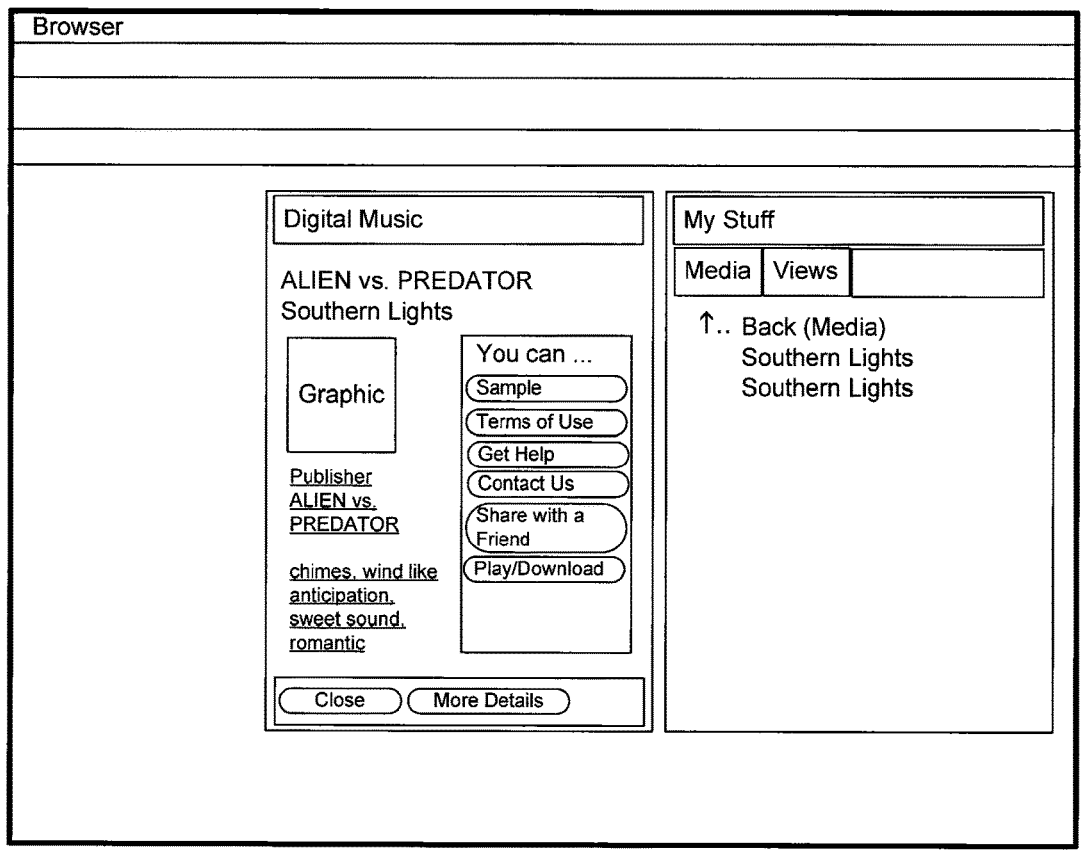

FIGS. 15a, 15b, 15c, and 15d illustrate an example of the user interface, comprising multiple panes, a first pane which is displayed when the User interface user accesses the User interface (FIGS. 15b, 15c), and a second pane which is made visible when the User interface user "pulls out" the drawer to expose additional content referenced by the first pane (FIG. 15d). The "drawer" may be "pulled out" or "pushed in" by the user, or may be optionally "pulled out" or "pushed in" under control of the User interface.

An operating context specification maps components, applications, the desired user interface look-and-feel (e.g. a skin), services, and service outputs to a specific display panes. In some embodiments, a controller component may be used to assist with mapping of these elements. In some cases, the controller component may be used to transform service outputs into a format usable within a operating context specification.

Extensible features of the User interface also include the ability to define an operating context's look and feel using "skins" and to develop branded versions of the Active User interface that enable and/or disable specific features and component capabilities within each specific operating context.

Furthermore, a user interface may have its "look and feel" bound to it, so that it provides a specific look and feel when operating, or when operating within a specific web site and/or service. Alternatively, the look and feel may be bound when User interface is operating as a component in conjunction with a third party applications such as a music user interface. Alternatively, the User interface may take at least part of its look and feel from the configuration of the web site, service, or third party application to which it is bound. These bindings are effective either for the entire instance of the User interface, or for a specific display pane of the User interface.

For web sites, services, and third-party applications (collectively, a source) that are "User interface" aware, the source(s) may provide a specification (e.g. a operating context), a reference to a specification (e.g., a link to the operating context, skin, or style sheet), or the identification information of a specification (e.g. a operating context, skin, or style sheet search specification, or parameters to a search service) that specifies the desired components, bindings, and look and feel. Alternatively, a source may provide a unique identifier that the Active User interface maps to a defined configuration (e.g., an identifier for a provider of child content that defines a specific operating context, skin, or style sheet).

Finally, a title may provide a specification (e.g. a operating context), a reference to a specification (e.g., a link to the operating context, skin, or style sheet), or the identification information of a specification (e.g. a operating context, skin, or style sheet search specification, or parameters to a search service) that specifies the desired components, bindings, and look and feel desired. Alternatively, a title may provide a unique identifier that the Active User interface maps to a defined configuration (e.g., an identifier for a provider of child content that defines a specific operating context, skin, or style sheet) to be used when processing rights associated with that specific title.

In an example embodiment, the User interface provides an application user interface that comprises two panes. A first pane is provided as the main screen for the User interface, as shown in the accompanying screen shots. A second pane is provided for use with task-specific details. In one embodiment, the pane is displayed using a metaphor of a "pull out drawer". An example of the second pane in an extended pull-out drawer is shown in the accompanying screen shots. The pull-out drawer metaphor shows how the screen real estate may be changed based upon the amount and type of information to be displayed. The pull-out drawer is shown as pulling to the side, but may be alternately configured to pull out below, above, or to the right of the first pane's display. Additionally, a plurality of drawers may be provided, optionally pulling out on the same or different sides of the first pane.

In an example embodiment, plurality of panes may be used to display information related to specific content. In the example shown in the accompanying screen shots, a second pane in a pullout drawer is used as part of a title manager interface to display the workflow actions embodied within a specific title and to provide the user interface for the actions described within that title.

The User interface provides a "trust indication" that indicates that the User interface is in secure communication with its underlying services, and that the loaded display components have been verified and validated. The trust indicator preferably will take the form of a lock symbol, as is common on web browsers to indicate a secure connection, but may be any symbol that the user understands indicates that the processing is trusted.

As shown in the accompanying screen shots, a title's rights are presented to the user as a set of buttons that permit the exercise of each right in the "drawer" display pane. The user interface presented on this pane is dynamically generated from information present in a title and within the title expressed right operating environment.

In such embodiments, the User interface associates specific rights present in the title with features of the UI. For example, a "Buy" right may specify a specific input that must be gathered, have specific prerequisites, and identifies a service that should be invoked in order to process the right. For example, a operating contexts style sheet may specify one or more style and layout elements that the right will be displayed in. In one example, the operating context may specify that rights described in a title are displayed in the "drawer" pane. The rights specification provides optional additional display guidance with its attributes, which includes positioning and display guidance. The User interface uses these attributes, along with UI specifications from the operating context, to construct portions of the user interface, including the name, description, layout, text, underlying User interface component, application component, or service to be called when this UI component is accessed for each portion of the UI. In some cases, these functions are handled by the Controller application component, or an external service. The resulting user interface may thus be dependent upon the specification contained within a specific title, as well as the specific title expressed right operating environment in use at a specific time. In some title expressed right operating environments, not all rights for a title may be displayed. Optionally, some rights may be displayed on alternate screens, or they may be hidden in scrolling areas of the UI.

An advantage of this approach is that the User interface provides improved support for rights-based commerce, where a user can operate within a specific rights-based operating environment. The operating environment may convey the desired look-and-feel to the user, down to providing mouse-over and context-sensitive help, and merge this information with the information provided for specific titles and rights.

The User interface, operating within the context of its title expressed right operating environment, may process at title by:

a. selecting one or more rights from the title.
b. optionally combining the rights information present in the title with additional information from the title
c. optionally combining the above information with additional information from external sources.
d. Using the combined information to render a user interface
e. Processing the user interface by interacting with a user
f. Executing a specified distributed workflow step on the basis of the interactions with the user.

Step a may be performed by selecting one or more rights from a specific title, and selecting some or all of them to be included in the UI. The selection may be based, in part, upon information provided with the rights in the title.

Step b may be performed by combining the selected rights information with additional information provided in the title, or using information referenced by the title. For example, the title may include a copy of approved graphics and description of the work represented by a title, or it may include a link to that information.

Step c may be performed by combining the aggregated information from external sources, such as information provided by a storefront, from the title expressed right operating environment, or from third-party sources.

Step d may be performed by applying the user interface specifications defined in a operating context, view, or stylesheet, and rendering a user interface on a specified display pane.

Step e may be performed by processing the user interface, collecting information that the user enters, and optionally verifying at least part of the information.

Step f may be performed by the User interface calling one or more specified User interface components or external services in accordance with a specified distributed workflow. An example of a specified distributed workflow is provided by the service element in a right specification, alternative distributed workflow specifications may be provided within the title expressed right operating environment specified by a operating context.

In one embodiment, the user selects a right they wish by clicking on a button presented in the user interface. The mapping between a user interface component, application component, or external service and a specific button, as well as the button label, help definitions, and mouse-over text, is performed as described above.

6.4.2.2 Title Publishing Application

A title publisher is a TPE application that performs the tasks associated with publishing (that is, creating new titles) and optionally makes those titles available to users using a title manager, service registry, title enabled storefront, wallet, or other title based storage location. Typically, alternate storage mechanisms are managed using a title manager application. The title publisher provides an easy to use interface for a user to identify, organize, and group new content (or services and resources), and then generate a new title object, title template, or other title materials that enable access the specified content, services, or other resources. Specific implementations of a title publishing application may be produced, each optimized for creating and publishing specific types of title materials without distracting from the scope of the description.

Using a title publisher, title materials can be generated on the fly and immediately by the title publisher which would then invoke the title manager to store the newly generated titles. Alternatively, the title publisher can generate new title templates that would describe the contents of the title but would not immediately generate a title. Title templates could be used in a variety of ways by the content publisher, for example by the content publisher's online shopping site to automatically generate titles when a buyer purchases new content. The content publisher stores work in progress (such as grouped publishing efforts) in a data repository using the data abstraction portion. Title publishers may provide sophisticated functionality to enhance the online experience for content publishers such as organizing content and title publishing into projects, sharing projects, and allowing community projects. Workgroup and workflow capabilities can be built into the title publisher as well as creating single-user and multi-user versions. As an example, a multi-user version can be implemented by a consumer aggregator or service provider in order to perform title publishing activities on behalf of a user community. Enhanced features may provide additional value to people using the title publisher such as verifying pointers to content files and resources, automatically obtaining icons, and even pushing titles and content out to servers.

An authorized user may use a title publisher application to publish service definitions to a Service Resolver and Registry. When this occurs, user uses a service mapping template (e.g. (/tts/src/xslt/tps/merchant/Services/ServicesCatalogToProducts.xsl), a service definition XML file that and describe one or all services that are to be loaded into the Service Resolver and Registry. This includes the name of the service, and other specific details such as calling parameters that is used by the Service Router and other applications. The title publisher creates titles that describe each service, and makes these titles available in the Service Resolver and Registry.

An authorized user may use a title publisher application to publish an operating context definitions to a Service Resolver and Registry. When this occurs, user uses a mapping template that defines the operating context, a definition XML file that and describe one or all operating contexts, components, external services, configuration information, and other materials that are to be loaded as part of the operating context. The title publisher creates an operating context that describes these materials, and makes the operating context available in the Service Resolver and Registry.

An authorized user may use a title publisher application to publish one or more alias associations between a defined alias and another definition in a Service Resolver and Registry. When this occurs, user uses a mapping template that defines an alias, a definition XML file that and describe one or all operating contexts, components, external services, configuration information, and other materials that are to be loaded as part of the operating context. The title publisher creates an alias that describes these materials, and makes the alias available in the Service Resolver and Registry.

6.4.2.2.1 Rules Builder

A rules builder module performs the task of building rules to be associated with the titles and processing of the titles. The rules builder module may provide an easy to use interface for the user to create and build rules that can be embedded within a title or used during the processing of a title. Rules that are not embedded within a title may be stored in a data repository using the data abstraction portion. The rules builder may provide an extension capability to apply rules developed external to the rules builder ensuring the adaptability of title processing.

The rules associated to the title are developed and applied by the content publisher and by the user (or someone acting on behalf of the user). The title management and title publisher modules may provide an application and interface to easily develop and apply rules to the titles. For example, a content publisher may apply usage rules applicable to the title and the digital content and/or resource it provides evidence of rights to. In turn, a user may apply default rules within the title management module to assist in controlling and protecting their actions related to certain titles (for example, to prevent from accidentally trading a valuable title). In another example, a parent may establish restrictions on the type of content their child may access and use in their title management module.

Specialized rules, called triggers, may also be used. Triggers are rules that invoke actions that are external to the title management apparatus. For instance, a parent can be notified by email that a child wishes to redeem a digital content file for which there is some age restriction.

Specialized rules, called timers, may also be used. Timers are rules that invoke actions based on a specific time or based on a spent amount of time. For example a title may only be good for twenty four hours, or an exchange may only be valid for one week. Timers maybe combined with triggers in rule processing.

6.4.2.2.2 Rating System

The content rating system can be used by publishers to determine appropriate ratings for their content, and these ratings can be enforced by title management and resolver apparatus to ensure guardian approval. Content rating is an element within the content element to convey a rating regarding the suitability of the content. The rating system is dependent on the type of content and the regulatory factors involved (e.g. music, video, movie, etc.).

6.4.2.3 Title Transaction System (TTS) Application

The title transaction application is a TPE application that verifies the ownership of the titles by the users and selectively permits the titles to be transferred if such rights are allowed. Among the modules that may be contained within a TTS application are the following:

6.4.2.3.1 Title Manager

A title manager module performs management functions on titles such as organizing, deleting, adding, transferring, trading, copying, backing up, viewing, and redeeming. In addition to basic title functionality, the title manager module can provide sophisticated and value-add features to allow the user a better online experience such as chat where real-time redemption and trading are available during the chat session. Furthermore, features such as sorting categorizing, searching and notify can be made available to the user. As an example, a sophisticated search capability can be implemented whereby the user can search the network for other users, titles available for bid, transaction makers, or even a secure and trusted third party lockbox with which to conduct a trade. This sophisticated discovery process may be an integral part of the TTS ecosystem. The title manager module is the primary application component that the user may interact with on a regular basis. The title manager module maybe designed to be a single-user or multi-user application depending on the specific use of the module. A single-user version can be used in a peer-to-peer network, whereas a multi-user version can be deployed with consumer aggregators.

The title manager implements a lockbox feature that is responsible for securely executing trades between two parties. The lockbox provides storage for titles being traded and provides a secure environment where users can verify trades, view samples, and accept a trade. Upon acceptance of the trade by all parties involved, the lockbox may execute the trade and provide each party with an updated title and stub object-pair that evidences their new rights. The lockbox feature of the title manager can be implemented as a standalone service so that a trusted third party can provide secure execution of trades.

6.4.2.3.2 Digital Lockbox

Title trading is supported by the title technology and the applications that process titles. Trading between parties can be accomplished in many different ways and involve any number of technologies and techniques. According to one example, a digital lockbox component is used as a secure container for the title objects that are being traded between a party A and a party B. The digital lockbox component includes two secure areas that contain the title objects for trade, party A's title objects are stored in a first "drawer," while party B's title objects are stored in second "drawer." The digital lockbox component further permits inspection by either party into the contents of the lockbox in order for each to verify the title objects and approve or cancel the trade. The digital lockbox component would not permit ownership to be transferred and only permits viewing of sample content, or of the content permitted by a redemption method (e.g. content legally shared). When both parties have confirmed the trade and approved of the title objects, the digital lockbox component claims ownership over all title objects in the lockbox, and then transfers ownership to the respective party. Transferring ownership involves delivering the title objects to the appropriate title managers and subsequently having the title managers claim ownership for their respective party. The digital lockbox component in this case is similar to a $3^{rd}$ party escrow system by providing a substantial level of guarantee to both parties involved in the trade. For instance, if any part of the trade failed during the claim process, the digital lockbox can rollback the entire trade. The digital lockbox can also provide a legal record of the trade to all parties involved in the trade. It should be noted that, the contents of the trade can be one or multiple title objects.

In another embodiment, a digital lockbox component supports a transfer in which party A intends to give party B the title objects with nothing expected in return. For example, party B could sample the content and review it before accepting the transfer. The claim process for the title objects would remain the same and the digital lockbox component can provide a record of the transaction. In yet another embodiment, the digital lockbox component can support: multi-party, dependent trades, nested-trades. In yet another embodiment, the digital lockbox component may support complex trades involving service level agreements, insurance, legal recourse, guarantees, and content introspection. For example, a highly confidential trade can be implemented with special content inspection rights provided through the digital lockbox component. This would provide both parties with the ability to view the confidential content for the duration of the trade negotiations under special circumstances, such as viewing directly using a controlled application similar to that provided by digital rights management software.

In another embodiment, a simplified trade can be executed directly between two parties by having the title managers simply transfer the title objects and subsequently have the receiving title managers claim ownership over the respective title objects. In yet another embodiment, a trade can be executed directly by the title managers acting as secure agents. An established protocol can be used by the title managers to securely trade the title objects. For example, a Boolean circuit can be utilized by the title managers. In another embodiment, security ownership indicia associated with each title object can be updated according to specific title authentication techniques employed by each respective title object.

6.4.2.3.3 Transaction Tracker

A transaction tracker module performs the basic task of tracking all inbound and outbound transactions whether successful or not. The tracker module is configurable by the user to determine the level of tracking to be performed based on the user's requirements. The tracker may be used to provide a record of all transactions performed by the user such as trades and transfers. The tracker may be used by all core TTS components for creating a record of all transactions (for example, those performed by the title resolver and content publisher). The tracker may record transactions in a data repository using the data abstraction portion.

A component of the title system is the transaction tracker. The transaction tracker is a module that can track all aspects of title processing. As the transaction tracker "sees" titles being processed during the course of a transaction it can invoke system rights embedded within the titles to activate additional tracking logic, e.g., generation of specific reports. The publisher or issuer of a title can put tracking rights in the titles they publish which can be picked up by the transaction tracker, thus allowing remote monitoring and notification. Such implementations involve the processing of titles which include rights, some of which are system rights which enable the tracking function.

According to some implementations, the transaction tracker system interacts with all the components of the system that process titles. In this embodiment it would be a title publishing system, a title resolver system, a title based payment system, and the title manager; in other embodiments it could be other title enabled systems, for example the title helper, the market maker, or the title search engine. In other embodiments of the invention the transaction tracker system may not be a centralized solution, but an additional functionality of the individual title processing component, or it maybe a combination of both a centralized and distributed system. The transaction tracker system is responsible for tracking and recording the events that occur on the title. These events could include publishing a title, redeeming a title, sharing a title, or storing a title in the title manager. The transactions and the information that is recorded are dependent upon the implementation and requirements of the system.

In another embodiment, the transaction tracker system can monitor the processing of all titles and execute tracking and monitoring rules as expressed by the titles. In this example, the tracker can invoke certain tracking rights (redemption methods) in the title as the title is processed or communicated. This allows the issuer of the title to provide additional monitoring over the use of the titles they have issued. As a further embodiment, the rules processing can be executed as a background task or even as an asynchronous task on a separated and connected system, without impeding the processing of the title.

A report generation system is responsible for taking the collected transactions and processing that information to generate the reports. The mechanism for generating these reports will be dependent on the actual implementation, but they could be a function of the database that stores the transaction records, a report generation tool, or as a function of the title system itself.

According to one embodiment, the title tracking system records any information that is stored in the titles that are processed by the title system. Depending upon the configuration of the title tracking system, the information for a title may be recorded in its entirety in a distinct data record, or as part of the information in a distinct record; in other embodiments, the recording method for the title tracking system may process the tracking information directly, and update a summary record.

In another embodiment, the title tracking system may use information within a title, to cross reference other information held within the title system. For example when a title is purchased, it could be cross referenced to information that is held within the system, such that purchases of items could be cross matched to demographic information.

In yet another embodiment, the title tracking system, the information that is available from a particular user's title account can be used to reflect the information that is presented to the user. Of course privacy concerns may have to be addressed in such an embodiment and mechanisms could be provided to protect privacy. These mechanisms could be simple policy based systems such as opt in/out policies, or the user could have a marketing profile title. The marketing profile title would be a title that allows the user to see and control the information that is sent to third parties.

as providing an identifier for "free" use. Strong authentication may be required for other instances and may be enforced by the ecosystem components. Strong authentication can take the form of two-factor such as Smartcard and PIN, or via mobile phone using a SIM card and a PIN, or via any other supported method such as a SecurID token card. In basic form, authentication may be a username and password. Authorization may provide fine-grained access control to core TTS applications as well as to use titles within the ecosystem. Authorization may be based on rules established within titles and configured as part of the implementation of core TTS applications.

A payment interface A rating system module performs rating tasks on transaction records to support billing requirements. The rating system may be flexible to support the variety of billing options required within the ecosystem. The rating system may act on transaction data but may maintain separation between the data sets to ensure integrity of the transaction log.

A billing interface module provides an interface to the billing system operated by the user or entity running any of the core TTS components or modules.

A transaction viewer module provides an interface for the user to view transactions recorded by the transaction tracker.

A synchronization & replication module performs synchronization and replication across components and modules within the TTS system. This is required for a number of functions including (but not limited to) synchronization and replication of transaction log entries, synchronization of titles across title management modules in a highly distributed environment, and replication of title databases to support redundancy and high-availability. Synchronization and replication techniques are well understood by those skilled in the art and will not be discussed further.

A cryptographic interface module performs symmetric and asymmetric cryptographic functions as required within the TTS ecosystem.

An authentication and authorization module performs the type authentication and authorization required by (and specified by) the title or other ecosystem configurations. Authentication may not be required in certain instances, or can be as simplemodule provides an interface to a payment system operated by a user or entity of the core TTS components and modules. This permits real-time and batch processing of payment requests as configured by the user or entity.

A cache management module performs basic caching functions of the content or resources retrieved by the title system. This function may provide performance benefits using cached content versus retrieving new content on every request for the same content.

A user registration module performs registration of new users into the core TTS components and modules. This may be used to establish new users in a single user environment such as peer-to-peer, as well as establish new users in a multi-user environment such as that hosted by a consumer aggregator. A consumer aggregator is an entity that provides services to a consumer base (i.e., ISP, mobile operator, etc.).

A transaction maker module performs transaction maker functions such as operating an exchange for the sale of titles, perform licensing of content represented by the titles, maintaining a book of trades, closing and clearing trade transactions, and performing additional value add as determined by the market.

An intelligent data retrieval and query module integrated with the data abstraction portion in order to perform intelligent searches and queries on a variety of data in a variety of disparate locations. The IDRQ module can combine, map, and match data before presenting it to requesting applications through the data abstraction portion. Persistence and caching can be developed into the IDRQ module to enhance performance on multiple and frequent queries/searches.

A web crawler module performs searches on the web to catalog content and provide a mechanism to automatically generate titles that represent the content that has been discovered. The web crawler module can be used statically or dynamically executed based on configuration of the implementation and/or on inbound requests. The web crawler module could interface with the intelligent data retrieval and query system attached to the data abstraction layer for intelligent searches and retrieval of web content.

A discovery mechanism that can be used by all appropriate modules for discovering TTS resources that may be available on the network. The discovery mechanism may allow TTS modules to participate in a peer-to-peer environment as well as collaborate on activities. The discovery process can ensure that trust third parties are available for conducting secure transactions and well as simplifying the user and content publisher experience for clearing titles through the ecosystem.

While the invention has been particularly shown and described with reference to specific embodiments thereof, it will be understood by those skilled in the art that changes in the form and details of the disclosed embodiments may be made without departing from the spirit or scope of the invention. For example, reference has been made herein to various types of computing platforms, network configurations, protocols, and processes which may be employed to implement various aspects of specific embodiments of the invention. It will be understood that such reference should not be used to narrow the scope of the invention. Rather, such references will be understood to be made by way of example, and it will be further understood that any of a wide variety of computing platforms, network configurations, protocols, processes, computing models, and the like, may be employed to implement embodiments of the invention without departing from the scope of the invention. For example, embodiments of the invention are not limited to specific types of computing platforms or network devices referred to herein. To the contrary, virtually any type of computing device having at least one interface for receiving or transmitting data (e.g., packets, frames, etc.), and at least one processor (e.g., CPU, processing cores, processor clusters, etc.) to facilitate processing of such data may be employed to implement various aspects of the invention as will be apparent to those of skill in the art.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed:

1. A computer-implemented method, comprising:
receiving a first title object that encodes one or more references to one or more rights and a reference to a title object template, the first title object also including a state value, the first title object being a digital bearer instrument;
validating the first title object by determining that the state value included in the first title object corresponds to a stored value for the first title object maintained by a state server;
identifying the title object template based on the reference to the title object template included in the first title object;
retrieving the title object template;
selecting a first right of the one or more rights to which the first title object refers;
assembling a second title object using the identified title object template, the second title object being a digital bearer instrument configured to effect redemption of the first right referred to by the first title object when the second title object is processed by a title processing environment, the second title object including a state value that corresponds to a stored value for the second title object maintained by the state server; and
providing the second title object to a title manager process.

2. The computer-implemented method recited in claim 1, wherein the second title object comprises a service definition, the service definition comprising a description of a service, the description identifying a name of the service and one or more calling parameters configured to access the service.

3. The computer-implemented method recited in claim 2, the method further comprising:
publishing the second title object in a services directory, the services directory identifying a plurality of services accessible via a network.

4. The computer-implemented method recited in claim 1, wherein the second title object is associated with one or more rules governing processing of the second title object and capable of being evaluated by a computing device configured to redeem the at least one right upon presentation of the second title object.

5. The computer-implemented method recited in claim 4, wherein the one or more rules include a first rule identifying a prohibited or permitted use of the second title object.

6. The computer-implemented method recited in claim 4, wherein the one or more rules include a first rule identifying an action to be performed when a designated trigger condition is detected.

7. The computer-implemented method recited in claim 1, the method further comprising:
transmitting the second title object to a computing device in conjunction with a purchase of the second title object.

8. The computer-implemented method recited in claim 1, wherein the title object template comprises an operating context definition, the operating context definition identifying information designated for loading in a title processing environment on a computing device, the title processing environment configured to redeem the at least one right upon presentation of the second title object.

9. The computer-implemented method recited in claim 1, wherein the second title object comprises a pointer to a content file or resource, the method further comprising:
verifying the pointer to the content file or resource.

10. A system, comprising:
an interface implemented on one or more computing devices and configured to receive a first title object that encodes one or more references to one or more rights and a reference to a title object template, the first title object also including a state value, the first title object being a digital bearer instrument; and
at least one processor of the one or more computing devices configured to:
validate the first title object by determining that the state value included in the first title object corresponds to a stored value for the first title object maintained by a state server;
identify the title object template from among a plurality of title object templates based on the reference to the title object template included in the first title object;
retrieve the title object template;
select a first right of the one or more rights to which the first title object refers;
assemble a second title object using the identified title object template, the second title object being a digital bearer instrument configured to effect redemption of the first right referred to by the first title object when the second title object is processed by a title processing environment, the second title object including a state value that corresponds to a stored value for the second title object maintained by the state server; and
provide the second title object to a title manager process.

11. The system of claim 10, wherein the second title object comprises a service definition, the service definition comprising a description of a service, the description identifying a name of the service and one or more calling parameters configured to access the service.

12. The system of claim 11, wherein the at least one processor is further configured to publish the second title object in a services directory, the services directory identifying a plurality of services accessible via a network.

13. The system of claim 10, wherein the second title object is associated with one or more rules governing processing of the second title object and capable of being evaluated by the title resolver that is configured to redeem the at least one right upon presentation of the second title object.

14. The system of claim 13, wherein the one or more rules include a first rule identifying a prohibited or permitted use of the second title object.

15. The system of claim 13, wherein the one or more rules include a first rule identifying an action to be performed when a designated trigger condition is detected.

16. The system of claim 10, wherein the at least one processor is further configured to transmit the second title object to a computing device in conjunction with a purchase of the second title object.

17. The system of claim 10, wherein the title object template comprises an operating context definition, the operating context definition identifying information designated for loading in a title processing environment on a computing device, the title processing environment configured to redeem the at least one right upon presentation of the second title object.

18. The system of claim 10, wherein the second title object comprises a pointer to a content file or resource, and wherein the at least one processor is further configured to verify the pointer to the content file or resource.

19. One or more non-transitory computer-readable media having instructions stored thereon for performing a computer-implemented method, the method comprising:
   receiving a first title object that encodes one or more references to one or more rights and a reference to a title object template, the first title object also including a state value, the first title object being a digital bearer instrument;
   validating the first title object by determining that the state value included in the first title object corresponds to a stored value for the first title object maintained by a state server;
   identifying the title object template based on the reference to the title object template included in the first title object;
   retrieving the title object template;
   selecting a first right of the one or more rights to which the first title object refers;
   assembling a second title object using the identified title object template, the second title object being a digital bearer instrument configured to effect redemption of the first right referred to by the first title object when the second title object is processed by a title processing environment, the second title object including a state value that corresponds to a stored value for the second title object maintained by the state server; and
   providing the second title object to a title manager process.

20. The one or more computer-readable media recited in claim 19, wherein the second title object comprises a service definition, the service definition comprising a description of a service, the description identifying a name of the service and one or more calling parameters configured to access the service.

21. The one or more computer-readable media recited in claim 20, the method further comprising:
   publishing the second title object in a services directory, the services directory identifying a plurality of services accessible via a network.

22. The one or more computer-readable media recited in claim 19, wherein the second title object is associated with one or more rules governing processing of the second title object and capable of being evaluated by a computing device configured to redeem the at least one right upon presentation of the second title object.

23. The one or more computer-readable media recited in claim 22, wherein the one or more rules include a first rule identifying a prohibited or permitted use of the second title object.

24. The one or more computer-readable media recited in claim 22, wherein the one or more rules include a first rule identifying an action to be performed when a designated trigger condition is detected.

25. The one or more computer-readable media recited in claim 19, the method further comprising:
   transmitting the second title object to a computing device in conjunction with a purchase of the second title object.

26. The one or more computer-readable media recited in claim 19, wherein the title object template comprises an operating context definition, the operating context definition identifying information designated for loading in a title processing environment on a computing device, the title processing environment configured to redeem the at least one right upon presentation of the second title object.

27. The one or more computer-readable media recited in claim 19, wherein the second title object comprises a pointer to a content file or resource, the method further comprising:
   verifying the pointer to the content file or resource.

* * * * *